US008296209B2

(12) United States Patent
Uehara et al.

(10) Patent No.: US 8,296,209 B2
(45) Date of Patent: *Oct. 23, 2012

(54) METHOD FOR MANAGING BUYER TRANSACTIONS AND SETTLEMENTS USING COMMUNICATION NETWORK BETWEEN COMPUTERS, AND METHOD FOR RELAYING INFORMATION FOLLOWING BUYER CONSUMPTION TRENDS TO THE BUYER

(75) Inventors: Tsuyoshi Uehara, Tokyo (JP); Masaharu Murakami, Tokyo (JP)

(73) Assignee: Computer Applications Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,362

(22) Filed: Apr. 12, 2012

(65) Prior Publication Data

US 2012/0226584 A1   Sep. 6, 2012

Related U.S. Application Data

(60) Continuation of application No. 12/977,691, filed on Dec. 23, 2010, which is a continuation-in-part of application No. 10/694,269, filed on Oct. 29, 2003, now Pat. No. 7,885,869, which is a division of application No. 10/258,734, filed as application No. PCT/JP01/03568 on Apr. 25, 2001, now abandoned.

(30) Foreign Application Priority Data

Apr. 26, 2000 (JP) ................................ 2000-125934
Jul. 6, 2000 (JP) ................................ 2000-205305

(51) Int. Cl.
*G06Q 40/00* (2012.01)

(52) U.S. Cl. ......................................................... 705/35
(58) Field of Classification Search ..................... 705/35
See application file for complete search history.

(56) References Cited

U.S. PATENT DOCUMENTS

| 5,671,279 | A | | 9/1997 | Elgamal |
| 5,732,400 | A | | 3/1998 | Mandler et al. |
| 5,809,144 | A | | 9/1998 | Sirbu et al. |
| 5,832,460 | A | * | 11/1998 | Bednar et al. ................ 705/27.2 |

(Continued)

FOREIGN PATENT DOCUMENTS

CA    2217739    10/1996

(Continued)

OTHER PUBLICATIONS

Buel, "Get a Web-Organized life" San Jose Mercury News (Apr. 5, 1999).

(Continued)

*Primary Examiner* — Jessica Lemieux
(74) *Attorney, Agent, or Firm* — Volpe and Koenig, P.C.

(57) ABSTRACT

Described herein are methods and apparatus for the processing of electronic invoices. A server for processing invoices communicates with computing systems such as a supplier system (used by a supplier), a buyer system (used by a buyer), and finance systems (which manage bank accounts of the supplier and buyer). The server communicates with the supplier system and the buyer system regarding an electronic invoice that relates to a transaction between the supplier and the buyer, and that includes an identification code. When the buyer has approved the electronic invoice, the supplier system and/or the server is able to settle the invoice using the identification code.

16 Claims, 37 Drawing Sheets

U.S. PATENT DOCUMENTS

| | | | |
|---|---|---|---|
| 5,838,300 A | 11/1998 | Takagi et al. | |
| 5,884,288 A | 3/1999 | Chang et al. | |
| 5,903,878 A | 5/1999 | Talati et al. | |
| 5,920,847 A * | 7/1999 | Kolling et al. | 705/40 |
| 5,960,406 A | 9/1999 | Rasansky et al. | |
| 5,970,475 A | 10/1999 | Barnes et al. | |
| 6,052,671 A | 4/2000 | Crooks et al. | |
| 6,055,567 A | 4/2000 | Ganesan et al. | |
| 6,115,690 A | 9/2000 | Wong | |
| 6,128,603 A | 10/2000 | Dent et al. | |
| 6,289,322 B1 | 9/2001 | Kitchen et al. | |
| 6,343,275 B1 | 1/2002 | Wong | |
| 6,704,714 B1 | 3/2004 | O'Leary et al. | |
| 6,721,716 B1 | 4/2004 | Gross | |

FOREIGN PATENT DOCUMENTS

| | | |
|---|---|---|
| CN | 1141454 A | 1/1997 |
| CN | 1213915 | 4/1999 |
| CN | 1271449 | 10/2000 |
| EP | 745947 | 12/1996 |
| EP | 1049983 | 11/2000 |
| JP | 04-073496 | 3/1992 |
| JP | 04-294655 | 10/1992 |
| JP | 04-303258 | 10/1992 |
| JP | 05-290064 | 11/1993 |
| JP | 05-298342 | 11/1993 |
| JP | 06-282728 | 10/1994 |
| JP | 07-121619 | 5/1995 |
| JP | 08-297709 | 11/1996 |
| JP | 08-315022 | 11/1996 |
| JP | 08-329144 | 12/1996 |
| JP | 09-034950 | 2/1997 |
| JP | 09-073496 | 3/1997 |
| JP | 10-021166 | 1/1998 |
| JP | 10-040318 | 2/1998 |
| JP | 10-040320 | 2/1998 |
| JP | 10-078993 | 3/1998 |
| JP | 10-198840 | 7/1998 |
| JP | 10-222579 | 8/1998 |
| JP | 10-224394 | 8/1998 |
| JP | 10-240816 | 9/1998 |
| JP | 10-320471 | 12/1998 |
| JP | 11-031170 | 2/1999 |
| JP | 11-045298 | 2/1999 |
| JP | 11-053612 | 2/1999 |
| JP | 11-161722 | 6/1999 |
| JP | 11-213083 | 8/1999 |
| JP | 11-272765 | 10/1999 |
| JP | 11-282904 | 10/1999 |
| JP | 11-316779 | 11/1999 |
| JP | 2000-057234 | 2/2000 |
| JP | 2000-057237 | 2/2000 |
| JP | 2000-113079 | 4/2000 |
| JP | 2001-028026 | 1/2001 |
| JP | 2001-076001 | 3/2001 |
| JP | 2001-092913 | 4/2001 |
| JP | 2001-134703 | 5/2001 |
| JP | 2001-229301 | 8/2001 |
| JP | 2001-229317 | 8/2001 |
| JP | 2001-511567 | 8/2001 |
| JP | 2001-243382 | 9/2001 |
| JP | 2001-243403 | 9/2001 |
| JP | 2001-250030 | 9/2001 |
| JP | 2001-250069 | 9/2001 |
| JP | 2001-250074 | 9/2001 |
| JP | 2001-516105 | 9/2001 |
| JP | 2001-283116 | 10/2001 |
| JP | 2001-306963 | 11/2001 |
| WO | 95/12859 | 5/1995 |
| WO | WO 98/49658 | 11/1998 |
| WO | 99/05628 | 2/1999 |
| WO | 99/13422 | 3/1999 |
| WO | 99/16029 | 4/1999 |
| WO | 99/38079 | 7/1999 |

OTHER PUBLICATIONS

H. Kato, Check free "Electronic Commerce no Zentaizo; Nichibei Saizensen 80sya no Business Model Bunseki," Kabushiki Kaisha Advanced Management, p. 69 (Apr. 23, 1999).

T. Asakura et al., "Internet Information Filter Based on Personal Interests," Kabushiki Kaisha NEC creative, pp. 17-23, NEC Gihou, vol. 49, No. 7 (Jul. 30, 1996) (Partial English translation enclosed).

An overview of Electronic Gill Presentment and Payment Operating Models, Prepared by the Business Practices Task Force of NACHA's XP002940352 (Apr. 9, 1999).

Y. Watanabe, "NTT data 'Anser-SPC' promise for infrastructure of future net-banking, realization for cooperation with financial-accounting/household-account software, pp. 58-65," Nikkei Digital Money Systems, Nikkei Business Publications, Inc. ISBN4-8222-2252-7 (Dec. 31, 1998) (Partial English translation enclosed).

Y. Tashiro, Presentation of electronic billing statement/payment service (I), Actual situation in the U.S. and realization system, p. 13-15, No. 52 Nikkei digital money system, Nikkei Business Publications, Inc. (Oct. 15, 1999).

Y. Tashiro, Presentation of electronic billing statement/payment service (II), Actual situation in the U.S. and realization system, p. 14-15, No. 53 Nikkei digital money system, Nikkei Business Publications, Inc. (Nov. 1, 1999).

Y. Tashiro, Presentation of electronic billing statement/payment service (III), Actual situation in the U.S. and realization system, p. 14-15, No. 54 Nikkei digital money system, Nikkei Business Publications, Inc. (Nov. 15, 1999) (Partial English translation enclosed).

H. Noguchi, Virtual Corporations are sure to be major corporations in EC-AGE, pp. 10-13, CardWave Nov. 1996 C. Media Co., Ltd. (Oct. 10, 1996) (Partial English translation enclosed).

SAP System R/3, Release 4.0, "Certification of the FEDI Interface", Oct. 1998, pp. 1-11.

[Financial transaction published report and ISO8583], [Chinese financial computer] 1996, 8th edition, pp. 14 and 16; English Translation provided.

S. Buel, "Get a Web-Organized life" San Jose Mercury News (Apr. 5, 1999).

K. Yakal, "Money 98 VS. Quicken 98," PC Magazine, vol. 17, No. 424, pp. 103-112.

N. Ohinori et al., Discussion of an Event matching calendar service on an Internet portal site, pp. 4-121 to 4-122, NTT cyber solutions labs (Sep. 28, 1999) (Partial English translation enclosed).

Gude Udo et al., "E-commerce in USA", Philippes University Margurg (Mar. 29, 2000).

* cited by examiner

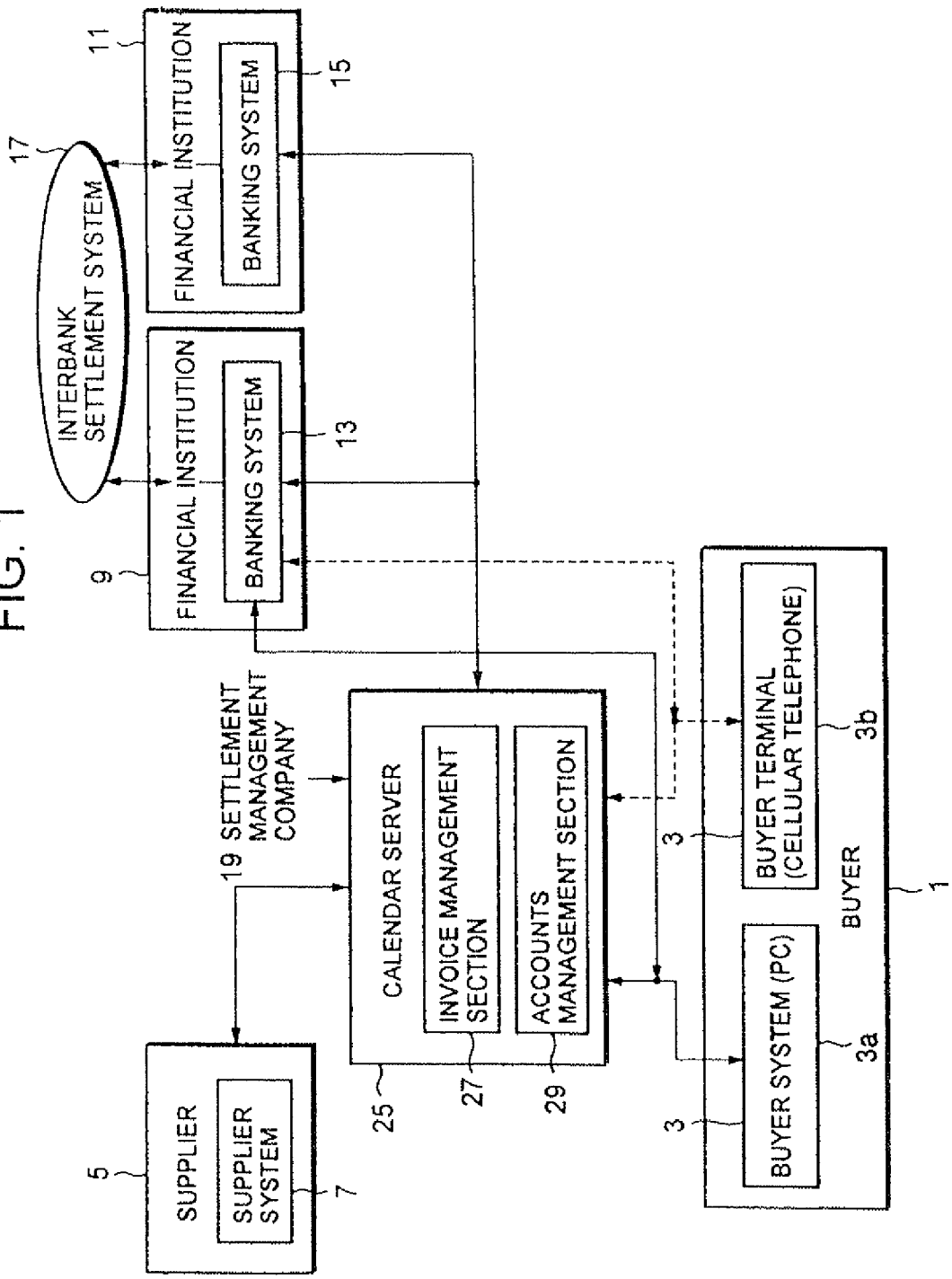

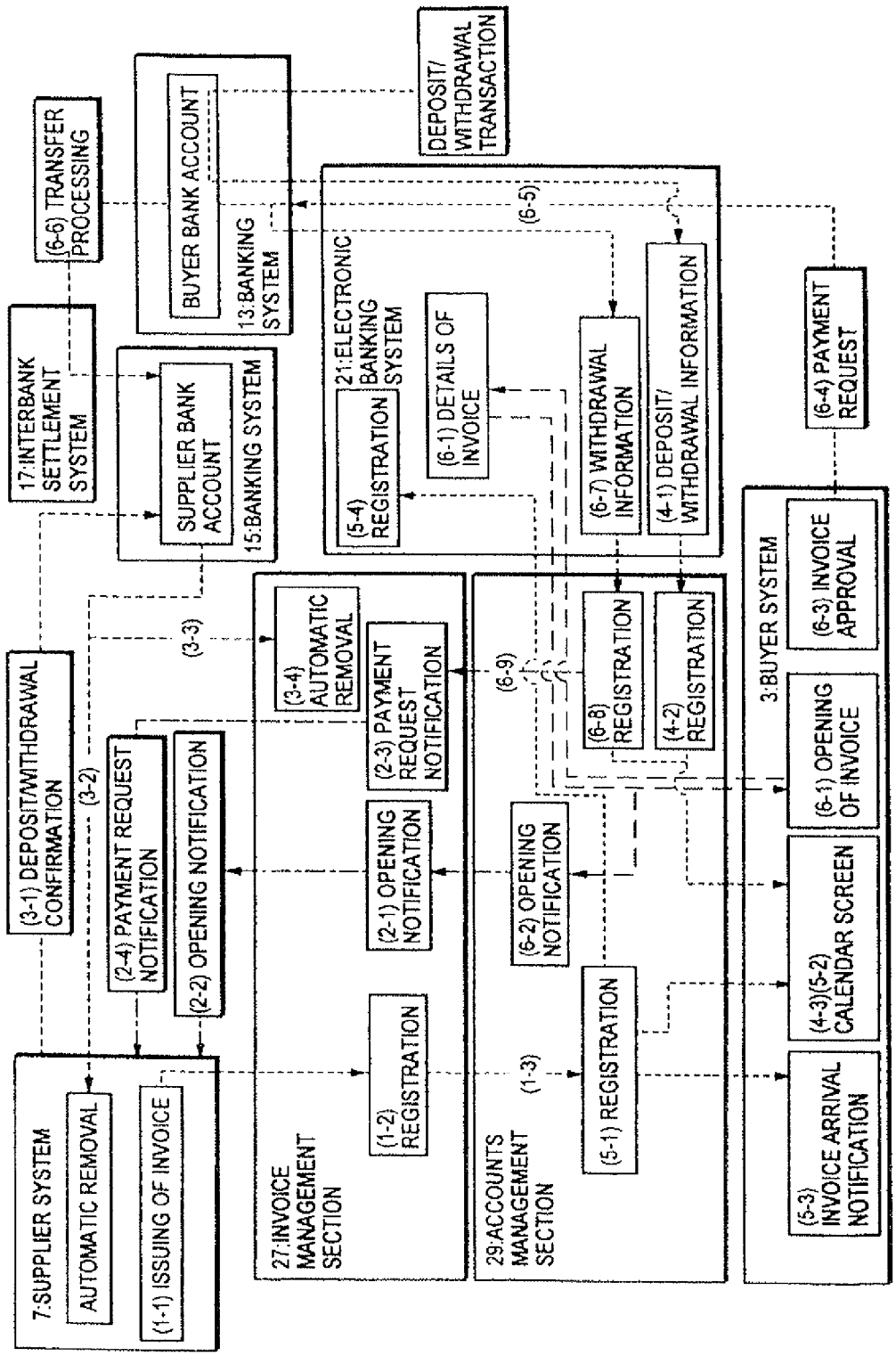

FIG. 3

35 (Menu Panel)

| CALENDAR | HOUSEHOLD BUDGET/ACCOUNTS MANAGEMENT | | |

35a — MENU
- ■ THIS WEEK
- ■ SCHEDULE INPUT
- ■ MONTH DISPLAY
- ■ WEEK DISPLAY
- ■ DAY DISPLAY
- ■ INVOICE LIST
- ■ ELECTRONIC PASSBOOK DISPLAY
- ■ DETAILS DISPLAY

35b — SEARCH
- ■ KEYWORD [    ] [SEARCH]

35c — CALENDAR <FEB. 2000>
```
SU MO TU WE TH FR SA
       1  2  3  4  5
 6  7  8  9 10 11 12
13 14 15 16 17 18 19
20 21 22 23 24 25 26
27 28 29
```

35d — [RETURN TO THIS MONTH]

37 (Calendar Panel)

| CALENDAR | HOUSEHOLD BUDGET/ACCOUNTS MANAGEMENT | ⓒ JANUARY 2000 ⓒ |

≤1999 JAN. FEB. MAR. APR. MAY JUN. JUL. AUG. SEP. OCT. NOV. DEC. 2001≥

| SU. | MO. | TU. | WE. | TH. | FR. | SA. |
|---|---|---|---|---|---|---|
| DEC.26 ⊕ | 27 ⊕ | 28 ⊕ | 29 ⊕ | 30 ⊕ | 31 ⊕ | JAN.01 ⊕ NEW YEAR |
| 02 ⊕ | 03 ⊕ | 04 ⊕ | 05 ⊕ ☐ ELECTRICITY RATE ☐ C DAMAGE INSURANCE | 06 ⊕ ☐ WATER RATE ☐ CELLULAR PHONE | 07 ⊕ | 08 ⊕ |
| 09 ⊕ | 10 ⊕ ADULTS DAY | 11 ⊕ ☐ TELEPHONE RATE | 12 ⊕ | 13 ⊕ ☐ CASH WITHDRAWAL | 14 ⊕ | 15 ⊕ |
| 16 ⊕ | 17 ⊕ | 18 ⊕ | 19 ⊕ | 20 ⊕ ☐ XY SHOP | 21 ⊠ Z COMPANY | 22 ⊕ |
| 23 ⊕ | 24 ⊕ ☐ FUNDS TRANSFER | 25 ⊕ ☐ ALLOWANCE | 26 ⊕ | 27 ⊕ ☐ GAS RATE | 28 ⊕ | 29 ⊕ |
| 30 ⊕ | 31 ⊕ ☐ ×× CARD ☐ ○○ LOAN | FEB.01 ⊕ | 02 ⊕ | 03 ⊕ | 04 ⊕ | 05 ⊕ |

FIG. 4

| | DAY, DATE | DEPOSIT/WITHDRAWAL SCHEDULE · PERFORMANCE |
|---|---|---|
| | ≦1999 JAN. FEB. MAR. APR. MAY JUN. JUL. AUG. SEP. OCT. NOV. DEC. 2001≧ | |
| | ⊙2 JANUARY-8, JANUARY, 2000 ⊙ | |
| | 02 (SUNDAY) | |
| | 03 (MONDAY) | |
| | 04 (TUESDAY) | |
| | 05 (WEDNESDAY) | ☒ ELECTRICITY RATE (WITHDRAWAL) 6,900YEN<br>☐ C DAMAGE INSURANCE |
| | 06 (THURSDAY) | ☒ WATER RATE (WITHDRAWAL) 4,420YEN |
| | 07 (FRIDAY) | ☒ CELLULAR PHONE (WITHDRAWAL) 8,000YEN |
| | 08 (SATURDAY) | |

CALENDAR HOUSEHOLD BUDGET/ACCOUNTS MANAGEMENT

MENU (35a)
- THIS WEEK
- SCHEDULE INPUT
- MONTH DISPLAY
- WEEK DISPLAY
- DAY DISPLAY
- INVOICE LIST
- ELECTRONIC PASSBOOK DISPLAY
- DETAILS DISPLAY

SEARCH (35b)
- KEYWORD [    ] [SEARCH]

CALENDAR <FEB. 2000> (35c)

| SU | MO | TU | WE | TH | FR | SA |
|---|---|---|---|---|---|---|
| | | 1 | 2 | 3 | 4 | 5 |
| 6 | 7 | 8 | 9 | 10 | 11 | 12 |
| 13 | 14 | 15 | 16 | 17 | 18 | 19 |
| 20 | 21 | 22 | 23 | 24 | 25 | 26 |
| 27 | 28 | 29 | 1 | 2 | 3 | 4 |

RETURN TO THIS MONTH (35d)

FIG. 5

35
- CALENDAR HOUSEHOLD BUDGET/ACCOUNTS MANAGEMENT

35a
- MENU
  - ■ THIS WEEK
  - ■ SCHEDULE INPUT
  - ■ MONTH DISPLAY
  - ■ WEEK DISPLAY
  - ■ DAY DISPLAY
  - ■ INVOICE LIST
  - ■ ELECTRONIC PASSBOOK DISPLAY
  - ■ DETAILS DISPLAY

35b
- SEARCH
  - ■ KEYWORD [ ] [SEARCH]

35c
- CALENDAR <FEB.,2000>
  - SU.MO.TU.WE.TH.FR.SA.
  -        1 2 3 4 5
  - 6 7 8 9 10 11 12
  - 13 14 15 16 17 18 19
  - 20 21 22 23 24 25 26
  - 27 28 29 1 2 3 4

35d
- RETURN TO THIS MONTH

37
- CALENDAR HOUSEHOLD BUDGET/ACCOUNTS MANAGEMENT
- ⊙ 5, JANUARY, 2000 ⊙

DEPOSIT/WITHDRAWAL DETAILED STATEMENT

BANK A   BRANCH B   ORDINARY DEPOSIT ACCOUNT   BANK ACCOUNT NO.: 1234567

| ITEM NAME | TRANSACTION AMOUNT |
|---|---|
| ELECTRICITY RATE | 6,900 YEN |
| TOTAL | 6,900 YEN |
| BALANCE | 543,210 YEN |

INVOICE

C DAMAGE INSURANCE (STOCK)   [PAYMENT] [DETAILS]

| PAYMENT DEADLINE | INVOICE AMOUNT | STATUS | INQUIRY NUMBER | ISSUE DATE |
|---|---|---|---|---|
| 15, FEBRUARY, 2000 | 34,000 YEN | OPENED | 1212123 | 5, JANUARY, 2000 |

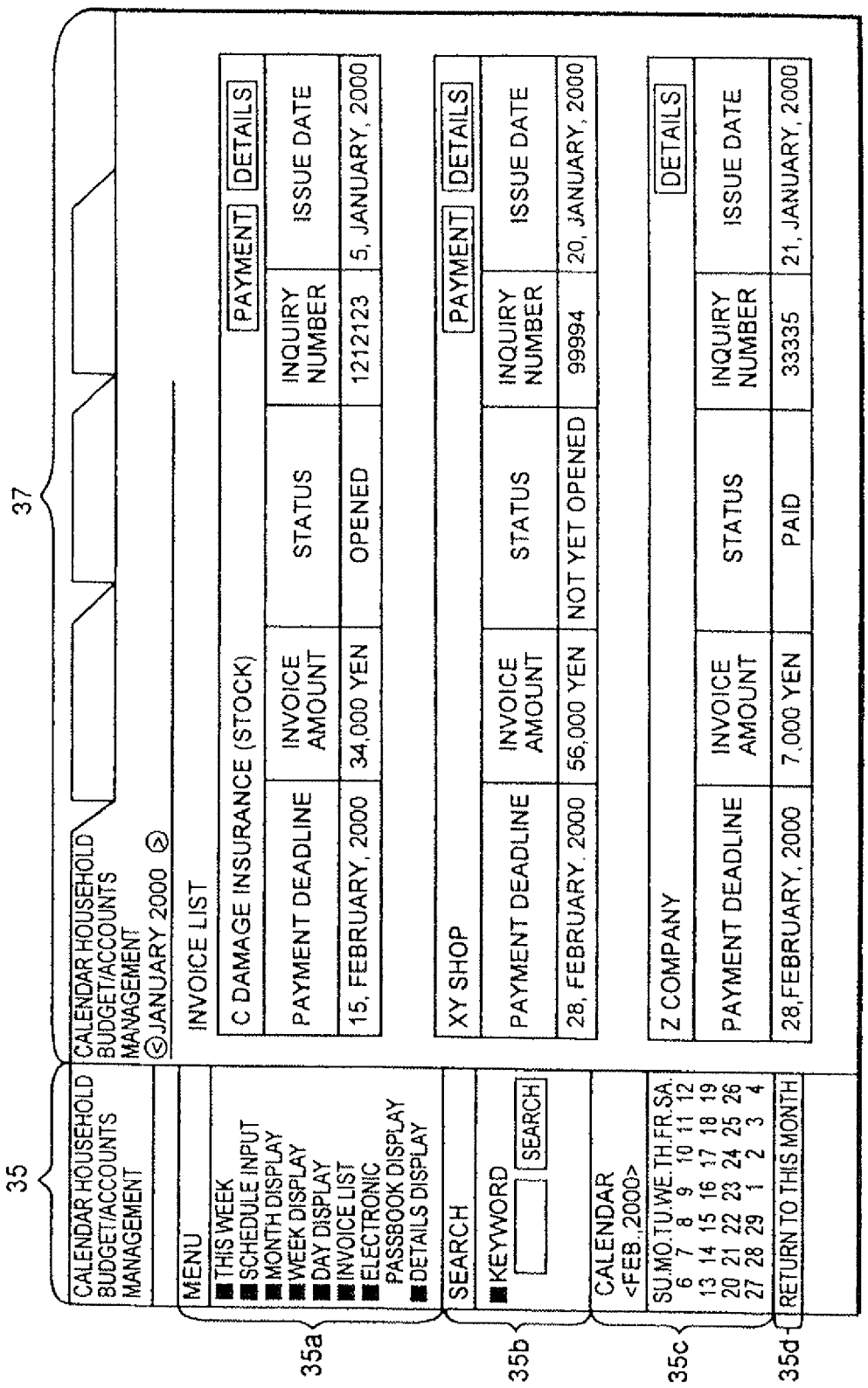

| INVOICE | | |
|---|---|---|
| AA MOBILE COMMUNICATIONS NETWORK | PAYMENT | |

| AA MOBILE COMMUNICATIONS NETWORK | |
|---|---|
| COMPANY NAME | AA MOBILE COMMUNICATIONS NETWORK |
| SERVICE NAME | abcd |
| INVOICE NUMBER | 012345 |
| INVOICE DEADLINE | 30, JUNE, 2000 |
| INVOICE AMOUNT | 11,915 YEN |

| INVOICE AMOUNT BREAKDOWN | TAX CLASSIFICATION | NOTIFICATION REGARDING USAGE PERIOD AND SO FORTH |
|---|---|---|
| BASIC USING CHARGE (DIGITAL 800/PLAN A) | 4,500YEN 合算 | 1,MAY~31, MAY |
| CONTINUOUS USING DISCOUNT CHARGE | -680YEN 合算 | 1,MAY~31, MAY, 割引率15%(10円未満四捨五入) |
| BASIC USING CHARGE | 200YEN 合算 | 1,MAY~31, MAY |
| ADDITION USING CHARGE | 100YEN 合算 | 1,MAY~31, MAY |
| DIAL TELEPHONE CALL CHARGE | 6,930YEN 合算 | 1,MAY~31, MAY |
| VOLUME DISCOUNT SAVING CHARGE | -347YEN 合算 | 1,MAY~31, MAY, 割引率5% |
| PACKET TELEPHONE CALL CHARGE | 621YEN 合算 | 1,MAY~31, MAY |
| CONSUMPTION TAX | 591YEN 合算 | 1,MAY~31, MAY |
| TOTAL | 11,915YEN 合算 | |
| REMARKS | | 合算表示金額を合計した金額に5%を乗じて算出しています |

FIG. 8

JANUARY 2000

51 — ELECTRONIC PASSBOOK OF KAWASAKI, TAROU

| DATE | ITEM | PAYMENT AMOUNT | DEPOSIT AMOUNT | BALANCE AFTER WITHDRAWAL | REMARKS |
|---|---|---|---|---|---|
| 5, JAN. | ELECTRICITY RATE | 6,900YEN | | 1,700,000YEN | |
| 6, JAN. | WATER RATE | 4,420YEN | | 1,695,580YEN | |
| 6, JAN. | CELLULAR PHONE | 8,000YEN | | 1,687,580YEN | DISPARITY FROM SCHEDULED AMOUNT |
| 11, JAN. | TELEPHONE RATE | 12,000YEN | | 1,675,580YEN | |
| 13, JAN. | CASH WITHDRAWAL | 30,000YEN | | 1,645,580YEN | |
| 24, JAN. | FUNDS TRANSFER | 54,000YEN | | 1,591,580YEN | |
| 25, JAN. | ALLOWANCE | | 250,000YEN | 1,841,580YEN | |
| 27, JAN. | GAS RATE | 3,210YEN | | 1,838,370YEN | |
| 31, JAN. | ×× CARD | 20,000YEN | | 1,818,370YEN | |
| 31, JAN. | ○○ LOAN | 15,000YEN | | 1,803,370YEN | |

53  55  57  59  61  63

65 —
THERE IS A DISPARITY BETWEEN THE AMOUNT SCHEDULED FOR THE TRANSACTION AND THE RECORD TRANSACTION AMOUNT. PLEASE CONFIRM.
SCHEDULED AMOUNT : 6,500 YEN
RECORD AMOUNT    : 8,000 YEN

FIG. 9

| | | | | | |
|---|---|---|---|---|---|
| JANUARY 2000 | | | | | |
| ITEM NAME | CELLULAR TELEPHONE SERVICE COMPANY | | | | |
| TRANSACTION TYPE | ⊙ WITHDRAWAL TRANSACTION<br>○ DEPOSIT TRANSACTION | AUTOMATIC WITHDRAWAL ▼ | | | |
| | | ▼ | | | |
| ITEM GROUP | DEPOSIT/WITHDRAWAL ITEM | UTILITY RATE ▼ | | | |
| | ○ WATER SUPPLY ○ ELECTRICITY ○ GAS ○ TELEPHONE<br>○ PHS ○ CELLULAR TELEPHONE<br>○ OTHER | | | | |
| TRANSACTION DATE | 2000 ▼ YEAR JAN. ▼ MONTH 6 ▼ DAY | | | | |
| | SETTING WHEN THE TRANSACTION DATE IS A HOLIDAY: | OVERNIGHT ▼ SETTING | | | |
| AMOUNT | SCHEDULED AMOUNT 6500 YEN | | | | |
| AUTOMATIC NOTIFICATION | ADVANCE NOTIFICATION (49a) | ○ PERFORM | ☐ ON THE DAY | ☐ THE DAY BEFORE | ☐ TWO DAYS BEFORE |
| | | ○ DO NOT PERFORM | | | |
| | SUBSEQUENT NOTIFICATION (49b) | ○ PERFORM | SCHEDULED TRANSACTION SUCCESSFUL | ☐ NOTIFICATION WHEN AMOUNTS MATCH<br>NOTIFICATION WILL BE PERFORMED WHEN THERE IS A MATCH BETWEEN THE SCHEDULE TRANSACTION AMOUNT AND THE DEPOSIT/WITHDRAWAL DETAILS AMOUNT<br>☐ NOTIFICATION WHEN AMOUNTS DO NOT MATCH<br>NOTIFICATION WILL BE PERFORMED WHEN THERE IS NO MATCH BETWEEN THE SCHEDULE TRANSACTION AMOUNT AND THE DEPOSIT/WITHDRAWAL DETAILS AMOUNT | |
| | | | SCHEDULED TRANSACTION NOT SUCCESSFUL | ☐ NOTIFICATION OF THE DEPOSIT/WITHDRAWAL DETAILS AMOUNT AND THE CURRENT BALANCE (WHEN INSUFFICIENT FUNDS REMAIN)<br>☐ NOTIFICATION OF SCHEDULED TRANSACTION (WHEN SCHEDULED TRANSACTION HAS NOT YET BEEN EXECUTED) | |
| | | | ☐ NOTIFICATION WHEN AN UNSCHEDULED TRANSACTION IS PRESENT | | |
| | | ○ DO NOT PERFORM | | | |
| REMARKS (DETAILS) | | | | | |

39 — ITEM NAME
41 — TRANSACTION TYPE
43 — ITEM GROUP
45 — TRANSACTION DATE
47 — AMOUNT
49 — AUTOMATIC NOTIFICATION
51 — REMARKS (DETAILS)

FIG. 11

INVOICE SEARCH/ EDITING

| INVOICE COMPANY NAME | COMPANY CODE | CUSTOMER NAME | CUSTOMER BANK ACCOUNT | INVOICE AMOUNT | STATUS | STATUS UPDATE TIME | ISSUE DATE | PAYMENT DEADLINE |
|---|---|---|---|---|---|---|---|---|
| A COMPANY | 1111 | TARO SATO | BANK C BRANCH D (ORDINARY) 121212 | 5,000YEN | NOTIFIED/ PAYMENT REQUEST MADE | 25,JAN.,2000 10:13:58 | 3,JAN.,2000 | 31,JAN.,2000 |
| B COMPANY | 1234 | TOM | BANK E BRANCH F (ORDINARY) 787878 | 14,000YEN | NOTIFIED/ UNOPENED | 8,JAN.,2000 11:32:45 | 3,JAN.,2000 | 3,FEB.,2000 |
| C COMPANY | 4321 | ANN | BANK G BRANCH H (ORDINARY) 909090 | 53,000YEN | NOTIFIED/ OPENED | 15,JAN.,2000 12:25:34 | 4,JAN.,2000 | 4,FEB.,2000 |

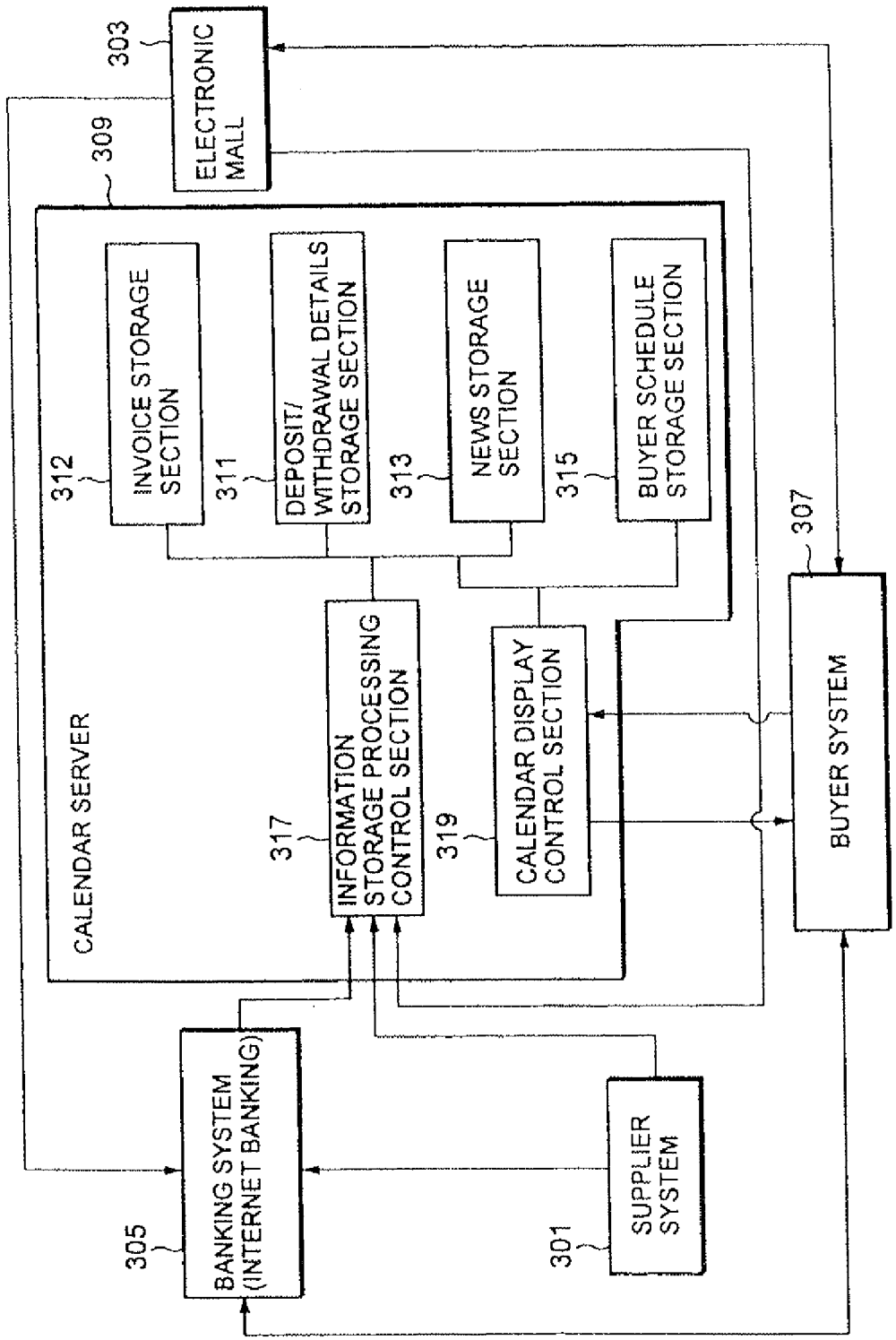

FIG. 25

ACCOUNT MANAGEMENT CALENDAR

6, JUNE, 2000
PREVIOUS YEAR JAN. FEB. MAR. APR. MAY [JUN] JUL. AUG. SEP. OCT. NOV. DEC. FOLLOWING YEAR

| | SU. | MO. | TU. | WE. | TH. | FR. | SA. |
|---|---|---|---|---|---|---|---|
| CALENDAR FOR:○○ ⇨MONTH DISPLAY WEEK DISPLAY DAY DISPLAY ELECTRONIC PASSBOOK | 28 | 29 | 30 | 31 | 01 ☐WATER RATE ☐ELECTRICITY RATE | 02 ☐CASH WITHDRAWAL | 03 |
| >WEEK DISPLAY | 04 | 05 ☐GAS RATE ☐DEPOSIT | 06 ☐CELLULAR PHONE RATE ☐TELEVISION RECEPTION FEE | 07 ☐CASH WITHDRAWAL | 08 | 09 ☐ALLOWANCE | 10 |
| >WEEK DISPLAY | 11 | 12 ☐ABC CARD LOAN | 13 | 14 | 15 | 16 | 17 |
| >WEEK DISPLAY | 18 FATHER'S DAY | 19 | 20 | 21 [DONE] ELECTRONIC MALL SETTLE UP(T-SHIRT) | 22 | 23 | 24 |
| >WEEK DISPLAY | 25 | 26 | 27 | 28 [UNDONE] ELECTRONIC MALL SETTLE UP (SNEAKERS) | 29 | 30 | 01 |

Tabs: ACCOUNT MANAGEMENT CALENDAR | NEWS CALENDAR

FIG. 26

ACCOUNT MANAGEMENT CALENDAR

CALENDAR FOR:OO

329 → MONTH DISPLAY
331 → WEEK DISPLAY
333 → DAY DISPLAY
335 → ELECTRONIC PASSBOOK

6,JUNE, 2000  4,JUNE~10,JUNE
28,MAY~3,JUNE  4,JUNE~10,JUNE  11,JUNE~17,JUNE  18,JUNE~24,JUNE  25,JUNE~1,JULY

| ACCOUNT MANAGEMENT CALENDAR | NEWS CALENDAR | |
|---|---|---|
| DATE AND DAY | ITEM NAME | TRANSACTION AMOUNT/INVOICE AMOUNT |
| 04 SU. | | |
| 05 MO. | GAS RATE | 4,000YEN |
| | DEPOSIT | 7,200YEN |
| 06 TU. | CELLULAR PHONE RATE | 11,915YEN |
| | TELEVISION RECEPTION FEE | 2,640YEN |
| 07 WE. | CASH WITHDRAWAL | 7,200YEN |
| 08 TH. | | |
| 09 FR. | ALLOWANCE | 243,400YEN |
| 10 SA. | | |

FIG. 27

6, JUNE, 2000

PREVIOUS YEAR JAN. FEB. MAR. APR. MAY [JUN.] JUL. AUG. SEP. OCT. NOV. DEC. FOLLOWING YEAR →

[ACCOUNT MANAGEMENT CALENDAR] [NEWS CALENDAR]

ACCOUNT MANAGEMENT CALENDAR

- CALENDAR FOR:○○
  - MONTH DISPLAY
  - WEEK DISPLAY
  - ⇔ DAY DISPLAY
- ELECTRONIC PASSBOOK

○DEPOSIT/WITHDRAWAL DETAILED STATEMENT

○ × BANK   TOYOSU BRANCH   ORDINARY DEPOSIT ACCOUNT   ACCOUNT NUMBER:0960012

| ITEM NAME | TRANSACTION AMOUNT |
|---|---|
| TELEVISION RECEPTION TOTAL; | 2,640 YEN / 2,640 YEN |
| BALANCE | 348,240 YEN |

☐INVOICE

AA MOBILE COMMUNICATIONS NETWORK [PAYMENT]

| | AA MOBILE COMMUNICATIONS NETWORK |
|---|---|
| COMPANY NAME | abcd |
| SERVICE NAME | 012345 |
| INVOICE NUMBER | 30, JUNE, 2000 |
| INVOICE DEADLINE | 11,915 YEN |
| INVOICE AMOUNT | |

FIG. 28

6, JUNE, 2000
← PREVIOUS YEAR JAN. FEB. MAR. APR. MAY [JUN] JUL. AUG. SEP. OCT. NOV. DEC. FOLLOWING YEAR →

ACCOUNT MANAGEMENT CALENDAR | NEWS CALENDAR

ACCOUNT MANAGEMENT CALENDAR
CALENDAR FOR:○○
MONTH DISPLAY
WEEK DISPLAY
DAY DISPLAY
ELECTRONIC PASSBOOK

☐ INVOICE

AA MOBILE COMMUNICATIONS NETWORK | PAYMENT

| | |
|---|---|
| COMPANY NAME | AA MOBILE COMMUNICATIONS NETWORK |
| SERVICE NAME | abcd |
| INVOICE NUMBER | 012345 |
| INVOICE DEADLINE | 30, JUNE, 2000 |
| INVOICE AMOUNT | 11,915 YEN |

INVOICE AMOUNT BREAKDOWN | TAX CLASSIFICATION | NOTIFICATION REGARDING USAGE PERIOD AND SO FORTH

| | | |
|---|---|---|
| BASIC USING CHARGE (DIGITAL 800/PLAN A) | 4,500YEN 合算 | 1,MAY~31, MAY |
| CONTINUOUS USING DISCOUNT CHARGE | -680YEN 合算 | 1,MAY~31, MAY. 割引率15%(10円未満四捨五入) |
| BASIC USING CHARGE | 200YEN 合算 | 1,MAY~31, MAY |
| ADDITION USING CHARGE | 100YEN 合算 | 1,MAY~31, MAY |
| DIAL TELEPHONE CALL CHARGE | 6,930YEN 合算 | 1,MAY~31, MAY |
| VOLUME DISCOUNT SAVING CHARGE | -347YEN 合算 | 1,MAY~31, MAY. 割引率5%です |
| PACKET TELEPHONE CALL CHARGE | 621YEN 合算 | 1,MAY~31, MAY |
| CONSUMPTION TAX | 591YEN 合算 | 1,MAY~31, MAY |
| TOTAL | 11,915YEN | |
| REMARKS | | 合算表示金額を合計した金額に5%を乗じて算出しています |

FIG. 29

6, JUNE, 2000
PREVIOUS YEAR JAN. FEB. MAR. APR. MAY [JUN] JUL. AUG. SEP. OCT. NOV. DEC. FOLLOWING YEAR →

ACCOUNT MANAGEMENT CALENDAR | NEWS CALENDAR

PAYMENT ACCOUNT SELECTION

PLEASE SELECT ONE OF THE FOLLOWING ACCOUNTS FOR A PAYMENT TRANSFER OF THE INVOICE AMOUNT
O×BANK

| SELECT | BRANCH NAME | ITEM | ACCOUNT NUMBER | OUTSTANDING BALANCE | OUTSTANDING DETERMINATION DATE AND TIME |
|---|---|---|---|---|---|
| ● | TOYOSU BRANCH | | 0960012 | 120,012YEN | JUNE 26 0:00 |
| ○ | SENGAKUJI BRANCH | | 1234567 | 5,400YEN | JUNE 26 0:00 |
| ○ | GOTANDA BRANCH | | 1234567 | 3,300YEN | JUNE 26 0:00 |
| ○ | MITA BRANCH | | 1234567 | 9,400YEN | JUNE 26 0:00 |
| ○ | SENGAKUJI BRANCH | | 1234567 | 5,100YEN | JUNE 26 0:00 |

PAYMENT

ACCOUNT MANAGEMENT CALENDAR
CALENDAR FOR:○○
MONTH DISPLAY
WEEK DISPLAY
DAY DISPLAY
ELECTRONIC PASSBOOK

ACCOUNT MANAGEMENT CALENDAR

CALENDAR FOR ○○
MONTH DISPLAY ⇔ WEEK DISPLAY ⇔ DAY DISPLAY
ELECTRONIC PASSBOOK

6, JUNE, 2000
(28,MAY~3,JUNE) (4,JUNE~10,JUNE) (11,JUNE~17,JUNE) [18,JUNE~24,JUNE] (25,JUNE~1,JULY)

ACCOUNT MANAGEMENT CALENDAR | NEWS CALENDAR

18,JUNE (SUNDAY)

19,JUNE (MONDAY)
● ○×LOAN
[https://www.○×ban]
● NEW CARS INFORM
[https://www.kuruma.c]
● DISCOUNT USED C
[https://www.tyu-kosy]

20,JUNE (TUESDAY)
21,JUNE (WEDNESDAY)
22,JUNE (THURSDAY)
23,JUNE (FRIDAY)
24,JUNE (SATURDAY)

CHOOSE A LOAN TO CHOOSE A CAR!
A ○×LOAN
SOLID SUPPORT FOR YOUR CAR LOAN
● OF UP TO A MAXIMUM OF 3,000,000 YEN
● MAXIMUM REPAYMENT TERM OF 5 YEARS

APPLY

SCHEDULE OF 2000 YR ⊠
JAN. | OLDEST DAUGHTER BLOOMING (15,JAN.)
FEB. | HOT SPRING (10,FEB.~14,FEB.)
MAR. |
APR. | SECOND DAUGHTER ENROLLMENT CEREMONY OF JUNIOR HIGH SCHOOL (3,APR.)
MAY | BUSINESS JOURNEY (20,MAY~23,MAY)
JUN. | MOT TEST (19,JUN.) LEASE AGREEMENT REGENESIS (9,JUN.) REFORM (29,JUN.)
JUL. | THE SECOND DAUGHTER'S BIRTHDAY (12,JUL.) MARRIAGE (4,JUL.)
AUG. |
SEP. |
OCT. |
NOV. |
DEC. | CHRISTMAS (25,DEC.)

SCHEDULE REGISTRATION

FIG. 35

SCHEDULE (EVENT) REGISTRATION

DATE [2000] YEAR [JUNE] MONTH [19] DAY TO [ ] YEAR [ ] MONTH [ ] DAY
TITLE [MOT TEST]
SCHEDULE (EVENT) ⦿MAIN PARTY ○FAMILY MEMBER ○OTHER  GENDER ⦿MALE ○FEMALE  AGE [30] YEARS
EVENT AREA
(MORE THAN ONE CAN BE SELECTED)
○BUSINESS ○LEISURE ○SPORT ○INTERESTS
○TRAVEL ⦿CAR/MOTORBIKE ○RESIDENCE ○CELEBRATION

[OK] — 375

☑ VEHICLE SAFETY INSPECTION (CAR)         ☐ REPAIRS (MOTORBIKE)
☐ VEHICLE SAFETY INSPECTION (MOTORBIKE)   ☐ DRIVE
☐ PURCHASE (CAR)                          ☐ CYLINDER   KEYWORD — 377
☐ PURCHASE (MOTORBIKE)                    ☐ OTHER      [       ]
☐ REPAIRS (CAR)

374

379 — [REGISTRATION]   [CANCEL]

SCHEDULE (EVENT) REGISTRATION

DATE [2000] YEAR [JULY] MONTH [12] DAY TO [ ] YEAR [ ] MONTH [ ] DAY

TITLE [THE SECOND DAUGHTERS BIRTHDAY]

SCHEDULE (EVENT) ○MAIN PARTY ◉FAMILY MEMBER ○OTHER  GENDER ○MALE ◉FEMALE  AGE [12] YEARS

EVENT AREA ○BUSINESS ○LEISURE ○SPORT ○INTERESTS
(MORE THAN ONE CAN BE SELECTED) ○TRAVEL ○CAR/MOTORBIKE ○RESIDENCE ◉CELEBRATION

[OK] — 375

- ☑ BIRTHDAY
- ☐ EXAMINATION PASS (HIGH SCHOOL ENTRANCE EXAMINATION, UNIVERSITY ENTRANCE EXAMINATION)
- ☐ EXAMINATION PASS (QUALIFYING EXAMINATION)
- ☐ WEDDING
- ☐ HOUSE-MOVING

- ☐ BIRTH
- ☐ WEDDING ANNIVERSARY
- ☐ SCHOOL ENTRANCE CEREMONY
- ☐ GRADUATION CEREMONY
- ☐ OTHER

KEYWORD [ ] — 377

379 — [REGISTRATION]   [CANCEL]

374, 373

METHOD FOR MANAGING BUYER TRANSACTIONS AND SETTLEMENTS USING COMMUNICATION NETWORK BETWEEN COMPUTERS, AND METHOD FOR RELAYING INFORMATION FOLLOWING BUYER CONSUMPTION TRENDS TO THE BUYER

CROSS REFERENCE TO RELATED APPLICATIONS

This application is a continuation of U.S. patent application Ser. No. 12/977,691 (filed Dec. 23, 2010), which is a continuation of U.S. patent application Ser. No. 10/694,269 (filed Oct. 29, 2003 and issued as U.S. Pat. No. 7,885,869 on Feb. 8, 2011), which is a divisional of U.S. patent application Ser. No. 10/258,734 (filed on Oct. 28, 2002 and now abandoned), which is a National Stage of International Patent Application Serial No. PCT/JP01/03568 (filed on Apr. 25, 2001), which claims the benefit of Japanese Patent Application No. 2000-205305, filed on Jul. 6, 2000 and Japanese Patent Application No. 2000-125934, filed on Apr. 26, 2000, the entire contents of each of which are hereby incorporated by reference.

FIELD OF INVENTION

The present invention relates to a technology for automatically performing commercial or non-commercial transactions, settlements relating to these transactions, and information processing relating to commercial or non-commercial advertisements, using the computer systems of the parties involved in these transactions, and of a bank, and so forth, as well as a communication network between computers.

BACKGROUND

Systems are in use in which electronic data is exchanged, over a communication network, between the computer system of a supplier (company or government administration office) that supplies a product or service and the computer system of a buyer (individual or corporation) that purchases the product or service, such that information processing of the various transactions performed between the supplier and buyer, as well as settlements relating to such transactions (such as a payment of the charge for the product or service, a payment of a public utilities charge, or a tax payment, for example) are automatically executed in accordance with this exchange of information.

According to the prior art, the buyer is not provided with automation means serving to automatically collectively manage information relating to the arrival of invoices (information) from the supplier to the buyer, to the times for payment by the buyer, and to the deposits and withdrawals to and from the bank account of the buyer, and so forth. Consequently, the buyer is required to store and arrange this information by himself so as to not forget this information.

Further, transaction detailed statements and invoices are commonly sent from the supplier to the buyer by electronic mail. However, it is a pain for the buyer to have to search through a great variety of electronic mails received from various people in order to find the detailed statement(s) and/or invoice(s), of a specific transaction.

Also, according to the prior art, when the buyer approves an invoice, money is automatically paid out from the buyer's bank account to the supplier, meaning that the approval of the invoice and the corresponding settlement processing do not progress together in real time or with the appropriate timing.

Meanwhile also, based on the prior art, the supplier is not provided with automation means for automatically confirming, in real-time or with the appropriate timing information relating to whether or not the buyer has seen the invoice, the time by which the buyer should make the payment, whether or not the buyer has approved the detailed statement of the invoice, whether or not the buyer has made the payment, and the time the payment was made. Hence, the supplier must divide up the substantial labor involved in order to manage and arrange a multiplicity of transaction information to thereby ascertain the cash flow.

The supplier also sends commercial or non-commercial advertisements to an unspecified multiplicity of buyers through the medium of newspaper and magazine space, and so forth, leaflets in trains and stations, direct mail, Internet home pages, and other media. However, the proportion of buyers that show an interest in such advertising is not particularly high. Thus, in advertising, the fact that better results require proportionally high costs is also a problem.

SUMMARY

It is an object of the present invention to enable a buyer to collectively manage various information relating to a variety of commercial transactions performed by the buyer as well as to the corresponding settlements, on a GUI (Graphical User Interface) screen of the buyer's computer system.

It is another object of the present invention to enable the buyer to automatically perform settlement of an invoice in real-time or with the appropriate timing by approving an invoice sent from a supplier on the GUI screen of the buyer's computer system.

It is yet another object of the present invention to enable the supplier to collectively manage various information relating to a variety of commercial transactions performed by the supplier as well as to the corresponding settlements, on a GUI screen of the supplier's computer system, to thereby make a contribution toward facilitating an understanding of the cash flow.

It is yet another object of the present invention to enable a financial institution that handles the bank account of the buyer or supplier to collectively manage various information relating to settlements concerning a variety of commercial transactions performed by the supplier or buyer, on a GUI screen of the computer system of the financial institution, to thereby make a contribution toward facilitating the management of settlement processing.

It is yet another object of the present invention to make it possible to provide the buyer with commercial or non-commercial advertisements by choosing an appropriate time at which there is a high probability of the buyer being interested in these advertisements.

The method for managing buyer transactions and settlements according to a first aspect of the present invention comprises the steps of: receiving an electronic invoice for a buyer from a supplier system; receiving electronic deposit/withdrawal detailed statement relating to the funds of the buyer, from a banking system; preparing a GUI screen displaying a calendar; pasting a mark indicating the electronic invoice from the supplier system, and a mark indicating the electronic deposit/withdrawal detailed statement from the banking system, on the calendar of the GUI screen; and supplying the GUI screen, which displays the calendar that has the marks of the invoice and the deposit/withdrawal detailed statement pasted thereon, to a buyer system.

The computer system for managing buyer transactions and settlements according to a second aspect of the present invention comprises: a computer program for performing processing to receive an electronic invoice for a buyer from a supplier system; a computer program for performing processing to receive electronic deposit/withdrawal detailed statement relating to the funds of the buyer, from a banking system; a computer program for performing processing to prepare a GUI screen displaying a calendar; a computer program for performing processing to paste a mark indicating the electronic invoice from the supplier system, and a mark indicating the electronic deposit/withdrawal detailed statement from the banking system, on the calendar of the GUI screen; and a computer program for performing processing to transmit the GUI screen, which displays the calendar that has the marks of the invoice and the deposit/withdrawal detailed statement pasted thereon, to a buyer system.

The method for supplying news to a buyer in accordance with a third aspect of the present invention comprises the steps of: preparing a buyer schedule having dates; receiving news from a supplier system; selecting news relating to the buyer schedule thus prepared from the news received; determining a notification date for the selected news on the basis of the dates of the buyer schedule to which the selected news relates; preparing a GUI screen displaying a calendar; pasting a mark, which indicates the selected news, in the space for the notification date on the calendar of the GUI screen; and supplying the GUI screen, which displays the calendar that has the mark for the selected news pasted thereon, to a buyer system.

The computer system for supplying news to the buyer according to a fourth aspect of the present invention comprises: a computer program for performing processing to prepare a buyer schedule having dates; a computer program for performing processing to receive news from a supplier system; a computer program for performing processing to select news related to the buyer schedule thus prepared, from the news received; a computer program for performing processing to determine a notification date for the selected news on the basis of the dates of the buyer schedule to which the selected news relates; a computer program for performing processing to prepare a GUI screen displaying a calendar; a computer program for performing processing to paste a mark, which indicates the selected news, in the space for the notification date on the calendar of the GUI screen; and a computer program for performing processing to transmit the GUI screen, which displays the calendar that has the mark for the selected news pasted thereon, to a buyer system.

According to the present invention, the term "invoice" is used to mean not only an invoice but also a document that are not an invoice but whose a invoice detailed statement(s), such as each of the invoice amount, can be read therefrom, namely a transaction statement, a statement of account, or statement of delivery, and the like, for example. The invoice amount can be positive (when the buyer pays out money) or negative (when the buyer receives money).

According to the present invention, the term "deposit/withdrawal detailed statement" is used to mean a document from which facts regarding a deposit or withdrawal to or from a bank account, as well as the corresponding invoice amount, can be read.

According to the present invention, the term "buyer" is used in a broad sense, that is, to mean not only a subject that purchases a product or service, but also subjects that perform by themselves financial acts of any kind that involve monetary movements, as well as the recipients of such financial acts by another company.

According to the present invention, the term "supplier" is used in a broad sense, that is, to mean not only a subject that supplies a product or service to the "buyer", but also subjects that perform by themselves financial acts of any kind that involve monetary movements, with respect to the "buyer", as well as the recipients of such financial acts by the "buyer".

According to the present invention, the term "bank" is used in a broad sense, that is, to mean not only a bank, but also organizations that are not banks but are capable of handling the movements of funds of the supplier or buyer. "Bank", as used in the present invention, may also indicate a securities company or post office, or similar, for example.

BRIEF DESCRIPTION OF THE DRAWINGS

FIG. 1 is a block diagram showing the overall constitution of the management system for information relating to transactions and settlements, according to an embodiment of the present invention;

FIG. 2 is a block diagram showing the flow of electronic data in the processing performed by the invoice management section 27 and the accounts management section 29 of the calendar server 25;

FIG. 3 shows an example of a monthly calendar screen which the calendar server 25 supplies to the buyer system 3;

FIG. 4 shows an example of a weekly calendar screen which the calendar server 25 supplies to the buyer system 3;

FIG. 5 shows an example of a daily calendar screen which the calendar server 25 supplies to the buyer system 3;

FIG. 6 shows an example of an invoice list screen which the calendar server 25 supplies to the buyer system 3;

FIG. 7 shows an example of an invoice detailed statement screen displayed by the buyer system 3;

FIG. 8 shows an example of a bank account electronic passbook screen which the calendar server 25 supplies to the buyer system 3;

FIG. 9 shows an example of a deposit/withdrawal schedule setting screen which the calendar server 25 supplies to the buyer system 3;

FIG. 11 shows an example of an invoice list screen which the calendar server 25 supplies to a banking system 13 or 15;

FIG. 24 is a block diagram showing the overall constitution of the transaction, settlement, and news management system according to this embodiment;

FIG. 25 shows an example of a main screen displayed by the monthly account management calendar, which a calendar display control section 319 supplies to a buyer system 307;

FIG. 26 shows an example of a main screen displayed by the weekly account management calendar;

FIG. 27 shows an example of a main screen displayed by the daily account management calendar;

FIG. 28 shows an example of a main screen that shows the detailed statement of a certain invoice;

FIG. 29 shows an example of a main screen for the selection of a payment account;

FIG. 32 shows an example of a main screen displaying a news calendar;

FIG. 34 is an example of a main screen displaying a home page which is related to certain news on the news calendar;

FIG. 35 shows an example of an event schedule registration screen;

FIG. 36 shows another example of an event schedule registration screen; and

DETAILED DESCRIPTION OF THE PREFERRED EMBODIMENTS

Figure 10:
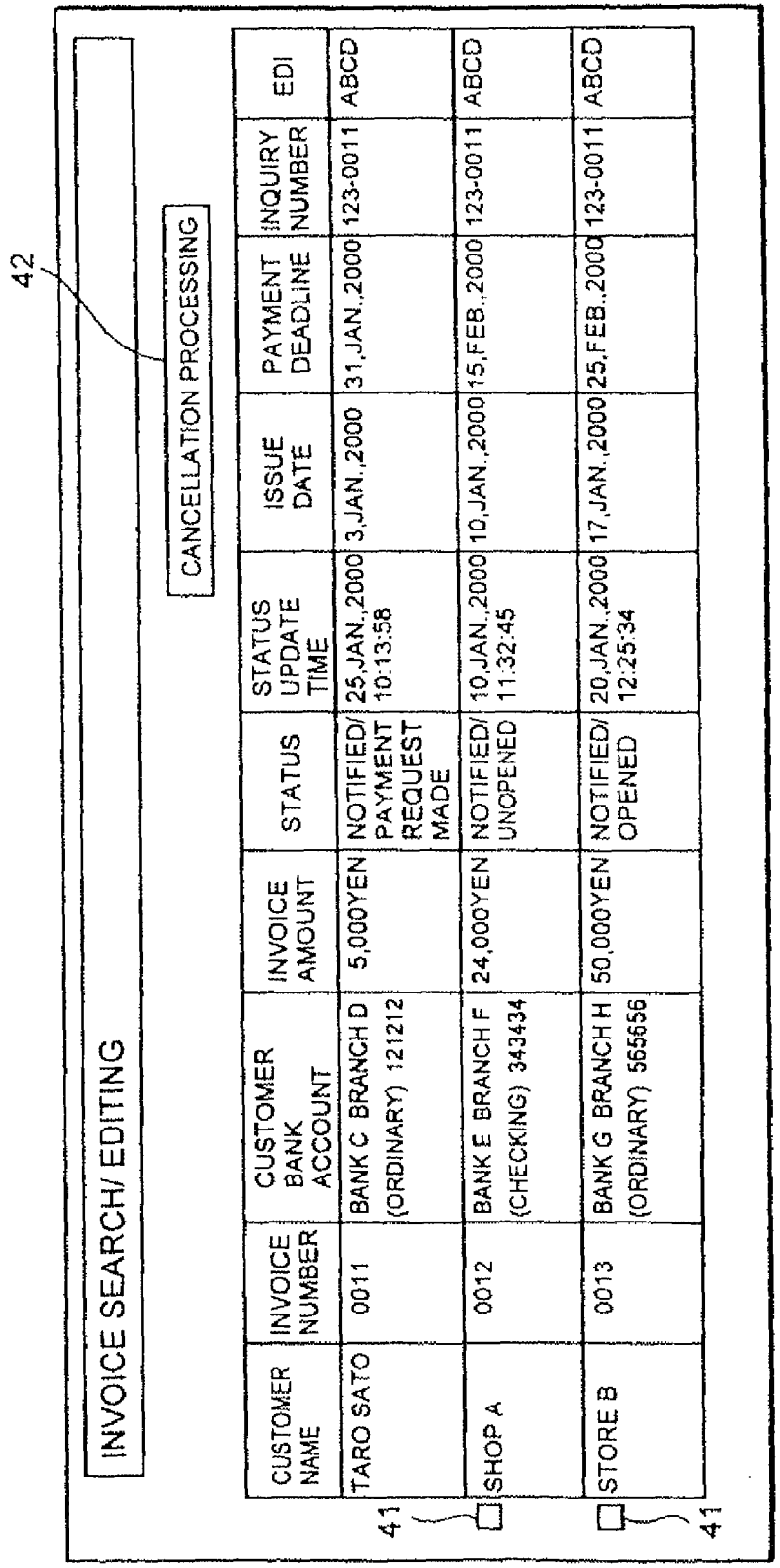
FIG. 10 shows an example of an invoice list screen which the calendar server 25 supplies to the supplier system 7.

FIG. 1 is a block diagram showing the overall constitution of the transaction and settlement management system, according to an embodiment of the present invention.

As shown in FIG. 1, there is a buyer system 3, which is a computer system used by a buyer (individual or corporation) 1 purchasing a product or service, and a supplier system 7, which is a computer system used by a supplier (such as a private company or government administration office) 5 supplying a product or service. There is also a banking system 13, which is a computer system used by a financial institution 9 that handles the deposit account of the buyer 1 and a banking system 15, which is a computer system used by a financial institution 11 that handles the deposit account of the supplier 5. The banking systems 13 and 15 can perform communications such as those for movements of funds (account transfers) between the deposit account of the buyer 1 and the deposit account of the supplier 5, via an interbank settlement system 17. The buyer system 3 and supplier system 7 are both able to communicate with the banking systems 13 and 15 via an electronic banking system such as an Internet banking system, for example.

There is also a server system 25 which is managed by a settlement management company 19, as shown in FIG. 1. The role of the server system 25 is to automatically manage and process commercial or non-commercial transactions, which are performed between the buyer 1 and supplier 5, and settlements pertaining to these transactions. This server system 25 is capable of communicating with the buyer system 1, supplier system 5 and banking systems 13, 15, via the Internet, a public switched telephone network, a dedicated communication network, or an electronic banking system, or similar.

The server system 25 functions as a WWW server, for example, and supplies a GUI screen (referred to as "calendar screen" hereinafter) (See FIGS. 3 and 4) displaying a calendar (a monthly or weekly all-date schedule) to the buyer system 3. This calendar screen has functions to collectively manage information on itemized statements of usage or on invoices (referred to generically below as "invoices") relating to a variety of commercial or non-commercial transactions performed by the buyer 1, as well as to settlements (account deposits and withdrawals) pertaining to these transactions, and to automatically execute, in real-time or with the appropriate timing, settlements for these transactions in accordance with the consent of the buyer 1. In the description that follows, the server system 25 is termed the "calendar server", as shown in FIG. 1.

The calendar server 25 supplies a GUI screen (See FIG. 10) and a function to collectively manage information on invoices for a variety of commercial or non-commercial transactions performed by the supplier 5 and on settlements pertaining to these transactions to thereby facilitate understanding of the cash flow, to the supplier system 7. The calendar server 25 supplies a GUI screen (See FIG. 11) and a function to collectively manage information relating to invoices which are settled using the bank accounts handled by the financial institutions 9, 11, respectively, to the banking systems 13 and 15 respectively.

In reality, a multiplicity of buyers, a multiplicity of suppliers, and a multiplicity of financial institutions can utilize the calendar server 25. However, in FIG. 1, in order to simplify the description, one buyer 1, one supplier 5, one financial institution 9, which handles one bank account of the buyer 1, and one financial institution 11, which handles one bank account of the supplier 5, are illustrated representatively.

The buyer 1 can be an individual or corporation. In the present specification, the term "buyer" is used generically to mean not only a party that purchases a product or service, but also parties performing a variety of financial acts such as a party that pays taxes, a party that purchases or sells securities such as shares, a party that takes out a loan, or a party that repays a loan. An individual buyer is one example of the buyer 1. Examples for the buyer system 3 which can be used include a personal computer 3a, cellular telephone 3b or a handheld terminal, which has an Internet connection function and has a WWW browser installed thereon, so as to be capable of accessing the calendar server 25, accessing an electronic banking system, and so forth.

The supplier 5 can be an individual, a private company, or a government administration office. In the present specification, the term "supplier" is used to mean not only a party that sells a product or service, but also a subject performing financial acts of any kind with respect to the buyer, such as a government administration office that levies taxes, an agency for various transactions, a loans company, or a factoring company. Examples of suppliers include: a retail outlet or restaurant selling products to the buyer, a securities company that supplies various financial services to the buyer, an insurance company, a credit company (credit card company or similar) and a loans company, a factoring company collecting payments from the buyer, the company or government administration office which is the buyer's place of work, a telephone company and cellular telephone company supplying communication services to the buyer, a gas company supplying town gas and an electricity company supplying electricity. Examples of the supplier also include a municipal public management company that runs water and sewage services, an administrative facility that collects domestic taxes, municipal taxes and penalties, and a government administration office (such as a post office, for example) that performs a variety of public services.

The buyer 1 first makes an application to a settlement management company 19 for a "settlement management service" agreement and, in so doing, is then able to connect the buyer system 3 to the calendar server 25 via the Internet As a result, the buyer 1 is then able to download invoices (that is, itemized statements of transactions or invoices) from the supplier 5 and deposit account deposit/withdrawal detailed statement from the financial institution 9 from the calendar server 25 to the buyer system 3, collectively in the form of electronic data, and is able to display a calendar screen (See FIGS. 3 and 4) which has this information pasted thereon on the display apparatus of the buyer system 3. In addition, when the buyer 1 inputs their approval of an invoice that has been received by the buyer system 3, to the buyer system 3, a payment (account transfer) telegraphic message for this invoice is immediately generated and sent to the banking system 13, whereby it is possible to execute a settlement of this invoice in real-time or with the appropriate timing. The buyer 1 pays a usage charge for a "settlement management service" to the settlement management company 19. The buyer 1 is able to designate a specific supplier 5 and specific financial institution 9 for which the "settlement management service" is adopted.

The buyer 1 uses the WWW browser installed on the buyer system 3 in order to communicate with the calendar server 25 over the Internet As a result of individual identification information for the buyer 1 (ID, password, and the like) being sent from the buyer system 3 to the calendar server 25, the calendar server 25 authorizes the buyer system 3 to access data in a storage region for the buyer 1 which is in a database possessed by the calendar server 25. The database for the buyer 1 stores invoices addressed to the buyer 1 which are received from the supplier 5 and deposit/withdrawal detailed statement of the bank account of the buyer 1 which are received from the financial institution 9. The calendar server 25 sends a specific monthly or weekly calendar screen (See FIGS. 3 and 4), which is selected by the buyer 1, to the WWW browser of the buyer system 3, such that this calendar screen is displayed thereby. In this calendar screen (See FIGS. 3 and 4), marks (icons or character strings) indicating invoices from the supplier 5 as well as deposit/withdrawal detailed statement from the financial institution 9 are displayed in date fields that correspond to the dates of usage itemized statements or of invoices (receipt dates, for example) and to dates of deposit/withdrawal detailed statement (dates on which deposits and withdrawals are made, for example). In accordance with a request from the buyer 1, the calendar server 25 is also capable of sending a screen (See FIG. 7) that displays the detailed statement of an individual invoice, or a screen (See FIG. 8) that displays the detailed statement of the deposit passbook of the buyer 1, or similar, to the buyer system 3, such that same is displayed thereby. When the buyer 1 inputs their approval of an individual invoice displayed by the buyer system 3, an account transfer telegraphic message requesting payment of this invoice is created and sent to the banking system 13 in real-time or with the appropriate timing, whereby the banking system 13 executes a settlement of this invoice.

The supplier system 7 is capable of communicating with the calendar server 25 via a predetermined communication network. When a transaction with the buyer 1 is successfully performed, the supplier system 7 transmits an electronic invoice addressed to the buyer 1 relating to this transaction to the calendar server 25, in real-time or with the appropriate timing. This electronic invoice contains, in a predetermined format, the customer's (buyer's) name, invoice number, customer's (buyer's) bank account number, invoice amount, status, payment deadline, inquiry number, the account to which the payment transfer is to be made, and EDI information (additional information required to issue and receive this electronic invoice, such as a unique identification code, for example), and the like.

The calendar server 25 stores an electronic invoice addressed to the buyer 1, which is received from the supplier system 7, in the database, and then performs processing, with respect to this electronic invoice, for: notification (the buyer 1 is notified as a result of the pasting of a mark on the calendar screen), opening (the buyer 1 views a screen which has the detailed statement of the invoice), a payment request (notification from the banking system 13 to the effect that account transfer processing for payment of the invoice is to be performed (or a request (notification) to the banking system 13 to the effect that account transfer processing for payment of the invoice is to be performed)), a payment completion confirmation (notification from the banking system 13 to the effect that a deposit of the invoice amount has been made to the supplier's bank account). When the calendar server 25 performs processing such as that for the above-mentioned notification, opening, payment request, or payment completion confirmation, with respect to the electronic invoice, the status of this electronic invoice is updated to a "notified" status, "opened" status, "payment request in progress" status, or "paid" status, or similar, in real-time or with predetermined timing.

The supplier system 7 is capable of sending a request to the calendar server 25 to search for electronic invoices by designating a given invoice issue period and status. The calendar server 25 then searches among the electronic invoices from the supplier system 7 managed by the calendar server 25 for those invoices whose issue dates lie within the designated issue period and which currently have the designated status, and sends an invoice list screen (See FIG. 10) displaying the aforementioned invoices in the form of a list, to the supplier system 7 such that these invoices are displayed thereby. This invoice list screen (See FIG. 10) displays, for each electronic invoice, the customer's name, the invoice number, the customer's bank account number, the invoice amount, the status, the status update time, the payment deadline, the inquiry number, EDI identification information, and so forth. The "status" of each electronic invoice displayed by the invoice list screen indicates the latest status of each electronic invoice ("notified", "opened", "payment request in progress", or "payment request made", and so forth), and "status update time" indicates the date on which the status was updated to the latest status.

The supplier system 7 is capable of requesting, in advance, that the calendar server 25 notify the supplier system 7 of an update of the electronic invoice status automatically and in real time. When a request has been made in this manner, even if the supplier system 7 is not actively connected to the calendar server 25, the calendar server 25 automatically notifies the supplier system 7 of an update of the status of the electronic invoice automatically and in real time. In either case, when the status of an invoice becomes the "payment complete" status, the supplier system 7 receives notification to that effect from the calendar server 25 in real time or with predetermined timing.

Because the banking systems 13, 15 communicate with the calendar server 25, buyer system 3, or the supplier system 7, or similar, via an electronic banking system, the calendar server 25 is capable of performing banking business tasks in accordance with a request from the buyer system 3 or the supplier system 7. When the banking system 13, which handles the deposit account of the buyer 1, receives a telegraphic message from the supplier 7 to the buyer 1 requesting payment of an invoice (an account transfer), this banking system uses the interbank settlement system 17 to perform, in real time or with predetermined timing, processing to transfer money corresponding to the invoice amount from the deposit account of the buyer 1 to the deposit account of the supplier 7 possessed by the banking system 15.

When the banking system 13, which handles the deposit account of the buyer 1, makes the invoice payment described above or, on different grounds, makes a withdrawal from or deposit to the deposit account of the buyer 1, this banking system 13 transmits an electronic deposit/withdrawal itemized statement showing the detailed statement(s) of this deposit or withdrawal to the calendar server 25, in real-time or with predetermined timing. These deposit/withdrawal detailed statement contain, in a predetermined format, the customer's (buyer 1) name, the customer's bank account, the deposit/withdrawal date, the deposit/withdrawal amount, item, summary, and EDI information (additional information required for sending and receiving these electronic deposit/withdrawal detailed statement such as a code identifying the paid invoice, for example). When the deposit/withdrawal detailed statement indicate that payment of the invoice is complete, the calendar server 25 is capable of specifying which invoice is the paid invoice in accordance with the EDI information contained in the deposit/withdrawal detailed statement, and of updating the status of the specified invoice to "paid".

The banking system 15, which handles the deposit account of the supplier 5, is capable of issuing a request to the calendar server 25 to search for electronic invoices by designating an issue period and status, and the like. The calendar server 25 then retrieves those electronic invoices which designate the deposit account of the supplier a handled by the banking system (the banking system actually handles a plurality of deposit accounts of a plurality of suppliers) as the account to which the payment transfer is to be made, whose issue dates lie within the designated issue period, and which currently have the designated status. The calendar server 25 then sends an invoice list screen displaying the aforementioned electronic invoices in the form of a list (See FIG. 11) to the banking system 15 such that this invoice list screen is displayed thereby. This invoice list screen displays (See FIG. 11), for each electronic invoice, the name of the invoicing company (supplier), the company code, the customer's (buyer's) name, the customer's bank account, the invoice amount, the status, the issue date, and the invoice (payment) deadline, and so forth. The respective "status" of the electronic invoices that are displayed in this screen indicates the latest state of the electronic invoices ("notified", "opened", "payment request in progress", or "paid"), and the "status update time" indicates the day on which the "status" was updated to the latest status.

The calendar server 25 comprises a database that contains a storage region for the buyer 1. The storage region for the buyer 1 stores electronic invoices addressed to the buyer 1 which are received from the supplier system 7, and deposit/withdrawal information for the deposit account of the buyer 1 which is received from the banking system 13, and so forth. Upon receiving electronic invoices or deposit/withdrawal detailed statement, the calendar server 25 pastes the invoice(s) or deposit/withdrawal detailed statement on the above-described calendar screen (FIGS. 3 and 4) and, in addition to it being possible for the buyer 1 to read the invoice or deposit/withdrawal detailed statement, same can be relayed to the buyer 1 using electronic mail.

As shown in FIG. 1, the calendar server 25 comprises an invoice management section 27 and an accounts management section 29. The invoice management section 27 communicates with the supplier system 7 and the banking system 15 that handles the bank account of the supplier 5, and principally performs information processing with respect to electronic invoices from the supplier 5. The accounts management section 29 principally communicates with the buyer system 3 and the banking system 13 that handles the bank account of the buyer 1, and principally performs information processing with respect to deposits and withdrawals to and from the bank account of the buyer 1.

FIG. 2 shows the flow of electronic data in the processing performed by the invoice management section 27 and the accounts management section 29. This processing will be described with reference to FIG. 2. Such processing is typically performed by running a computer program installed on the calendar server 25.

The processing which is performed by the invoice management section 27 includes (1) invoice registration processing, (2) invoice opening and payment request notification processing, and (3) settlement invoice removal processing.

(1) Invoice Registration Processing

When an electronic invoice addressed to the buyer 1 is issued by the supplier system 7 (1-1), the invoice management section 27 receives this electronic invoice, registers same in the database of the invoice management section 27 as an unsettled invoice (1-2), and manages the status of this electronic invoice as well as the payment deadline thereof, and so forth. The invoice management section 27 transfers this electronic invoice to the accounts management section 29 (1-3).

(2) Invoice Opening and Payment Request Notification Processing

When the buyer 1 reads (opens) the detailed statement of a given electronic invoice, an opening notification is sent from the accounts management section 29 to the invoice management section 27 (6-2). Upon receiving this opening notification, the invoice management section 27 updates the status of the electronic invoice to "opened" (2-1). When the invoice management section 27 is requested by the supplier system 7 to search for this electronic invoice (or, in a case where an automatic notification has been pre-requested, when the status of this electronic invoice is updated to "opened"), the status of the electronic invoice (namely, "opened") is communicated to the supplier system 7 (2-2). When the fact that the buyer 1 has opened the electronic invoice is thus communicated to the supplier 5, this provides the supplier 5 with the legal basis for adopting a legal summary debt collection procedure for a buyer 1 who appears unlikely to make payment.

When the banking system 13, which handles the bank account of the buyer 1, is requested to pay a certain electronic invoice, notification with regard to the payment request for this electronic invoice is sent from the accounts management section 29 to the invoice management section 27 (6-9). Upon receiving this payment request notification, the invoice management section 27 updates the status of the electronic invoice to "payment request in progress" (2-3). When the invoice management section 27 is requested by the supplier system 7 to search for this electronic invoice (or, in a case where an automatic notification has been pre-requested, when the status of this electronic invoice is updated to "payment request in progress"), the status of the electronic invoice (namely, "payment request in progress") is communicated to the supplier system 7 (2-4).

(3) Settlement Invoice Removal Processing

Upon receiving notification of the fact that the status of a certain electronic invoice is now "payment request in progress", the supplier 5 issues an inquiry to the banking system 15 to inquire whether or not the invoice amount of this invoice has been deposited in the deposit account of the supplier 5 (3-1) (or the fact that the deposit has been made is relayed automatically from the banking system 15 to the supplier system 7). The detailed statement of a deposit to the bank account of the supplier 5, as confirmed by the banking system 15 through this inquiry, are transferred not only from the banking system 15 to the supplier system 7 (3-2) but also to the invoice management section 27 (3-3). Upon receiving deposit detailed statement from the banking system 15, the invoice management section 27 specifies the electronic invoice which corresponds to these deposit detailed statement, and, by updating the state of the electronic invoice thus specified to "paid", this electronic invoice is automatically removed from the unsettled invoices (3-4). Then the status of this invoice ("paid") is relayed to the supplier system 7. By means of the above-described "paid" notification, the supplier 5 is able to retire a settled invoice in a straightforward manner and easily determine cash flow arising therefrom, facilitating integration with processing in connection with post-settlement actions such as shipping of product or the like.

The processing which is performed by the accounts management section 29 of the calendar server 25 includes (4) deposit/withdrawal detailed statement automatic pasting processing, (5) invoice automatic pasting processing, (6) invoice opening and payment request notification processing, (7) deposit/withdrawal detailed statement automatic classification processing, (8) deposit/withdrawal schedule automatic setting processing, (9) settlement deposit/withdrawal schedule automatic removal processing, (10) deposit/withdrawal detailed statement automatic notification processing, and (11) bank account electronic passbook processing.

(4) Deposit/Withdrawal Detailed Statement Automatic Pasting Processing

The accounts management section 29 receives deposit/withdrawal information on the bank account of the buyer 1 which is sent from the banking system 13 via an electronic banking system 21 (4-1), and then registers data which this deposit/withdrawal information comprises (such as the withdrawal date, invoice amount, payment deadline, issue date, EDI information, and a summary) in the database of the accounts management section 29 (4-2). Then, upon displaying a monthly or weekly calendar screen (See FIGS. 3 and 4) on the buyer system 3, the accounts management section 29 pastes registered deposit/withdrawal detailed statement data on the calendar screen (4-3). The buyer is thus able to ascertain the records of deposits and withdrawals to and from his/her own bank account for each month or each week, from this calendar screen.

(5) Invoice Automatic Pasting Processing

The accounts management section 29 receives an electronic invoice which is sent from the supplier system 7 via the invoice management section 27 (1-1), acquires data from this electronic invoice with regard to the deposit/withdrawal schedule (such as the withdrawal date, invoice amount, payment deadline, issue date, EDI information, and a summary), and then registers the data thus acquired in the database of the accounts management section 29 (5-1). The accounts management section 29 transfers this electronic invoice to the electronic banking system 21 such that this electronic invoice is registered by the electronic banking system 21 (5-4). Then, upon displaying a monthly or weekly calendar screen (See FIGS. 3 and 4) on the buyer system 3, the accounts management section 29 pastes registered data relating to the deposit/withdrawal schedule for this electronic invoice on the calendar screen (5-2). The buyer is able to ascertain the schedule for deposits and withdrawals to and from his/her own bank account for each month or each week, from this calendar screen. Data relating to the deposit/withdrawal schedules based on these electronic invoices, and data relating to the deposit/withdrawal records based on the above-described deposit/withdrawal detailed statement, are displayed together in this calendar screen (See FIGS. 3 and 4). The buyer is thus able to collectively manage a variety of invoices and the payment procedures with respect to these invoices.

Furthermore, when an electronic invoice reaches the accounts management section 29 (5-1), the accounts management section 29 quickly notifies the buyer system 3 of the arrival of this invoice (5-3). In addition, the accounts management section 29 transfers this electronic invoice to the electronic banking system 21, whereupon the electronic banking system 21 registers this electronic invoice (5-4).

(6) Invoice Opening and Payment Request Notification Processing

When requested by the buyer system 3 to read a certain electronic invoice, the accounts management section 29 sends a screen displaying the detailed statement of an electronic invoice registered in the electronic banking system 21 (See FIG. 7) to the buyer system 3 (6-1). As a result, the buyer opens the electronic invoice and the accounts management section 29 notifies the invoice management section 27 in real time that the electronic invoice has been opened (6-2). As described above, notification of the opening of the invoice is sent from the invoice management section 27 to the supplier system 7 (2-1, 2-2).

Further, when a certain electronic invoice in the buyer system 3 is approved by the buyer (6-3), an account transfer telegraphic message for payment of this invoice is automatically created (6-4) and this account transfer telegraphic message is sent to the banking system 13 that handles the buyer's bank account (6-5). The banking system 13 performs account transfer processing upon receiving this account transfer telegraphic message (6-6). Then, in this account transfer processing, withdrawal detailed statement, which indicate the invoice amount withdrawn from the bank account of the buyer 1, are sent to the accounts management section 29 (6-7). The accounts management section 29 registers these withdrawal detailed statement in the database of the accounts management section 29 (6-8), and sends notification with regard to the payment request of this invoice to the invoice management section 27 (6-9). As described above, this invoice payment request notification is sent from the invoice management section 27 to the supplier system 7 (2-3, 2-4).

The above-mentioned registered withdrawal detailed statement (6-8) are displayed by the buyer system 3 so as to be pasted on the calendar screen by means of the above-described deposit/withdrawal information automatic pasting processing (5-2).

(7) Deposit/Withdrawal Detailed Statement Automatic Classification Processing

The accounts management section 29 reads deposit/withdrawal detailed statement for the past month or past week from the database of the accounts management section 29, and, based on optional items included in these deposit/withdrawal detailed statement (such as the item, summary, or EDI information, for example), automatically classifies these deposit/withdrawal detailed statement, and then displays the deposit/withdrawal detailed statement thus classified on the buyer system 3.

(8) Deposit/Withdrawal Schedule Automatic Setting Processing

The accounts management section 29 uses the variety of items included in the deposit/withdrawal detailed statement classified in the above deposit/withdrawal detailed statement automatic classification processing (such as the date of the deposit/withdrawal, the amount, the item, the summary and EDI information) to automatically set subsequent (the following month and subsequent months) deposit/withdrawal schedules (or semi-automatically in accordance with information supplementation as a result of manual inputs by the buyer). Further, the accounts management section 29 registers the set deposit/withdrawal schedules for the following month and subsequent months in the database of the accounts management section 29, and, when displaying calendar screens for the following month and subsequent months on the buyer system 3, pastes the deposit/withdrawal schedules for the following month and subsequent months on these calendar screens. The schedules for deposits and withdrawals which are performed every month on the dates elected for the automatic debiting of electricity charges and telephone charges are therefore automatically set in the calendar screen on the basis of past records.

Future deposit/withdrawal schedules can also be set entirely by manual inputs by the buyer.

(9) Settlement Deposit/Withdrawal Schedule Automatic Removal Processing

Upon receiving deposit/withdrawal detailed statement from the banking system 13 or 15 via the electronic banking system 21, the accounts management section 29 retrieves the deposit/withdrawal schedule that corresponds to the received deposit/withdrawal detailed statement (such as the deposit/withdrawal date, item, summary, and EDI information) from the database of the accounts management section 29 (which schedule is a deposit/withdrawal schedule registered on the basis of the invoice in the above-described invoice automatic pasting processing, or a deposit/withdrawal schedule registered on the basis of past deposit/withdrawal detailed statement in the above-described deposit/withdrawal schedule automatic setting processing). Then, if the corresponding deposit/withdrawal schedule is found, the accounts management section 29 automatically removes the corresponding deposit/withdrawal schedule by updating the status of the deposit/withdrawal schedule to "paid".

(10) Deposit/Withdrawal Detailed Statement Automatic Notification Processing

When performing the removing of the deposit/withdrawal schedule by means of the settlement deposit/withdrawal schedule automatic removal processing, the accounts management section 29 automatically notifies the buyer system 3 of this removal. In cases where the deposit/withdrawal detailed statement corresponding to the deposit/withdrawal schedule do not arrive even when the scheduled settlement date has passed, and in cases where unexpected deposit/withdrawal detailed statement arrive (deposit/withdrawal detailed statement not corresponding to any deposit/withdrawal schedule), the accounts management section 29 automatically notifies the buyer system 3. The buyer is able to designate, via the screen displayed by the buyer system 3, a condition such as whether or not the above automatic notification is performed, or whether automatic notification is performed in cases where any given kind of deposit/withdrawal detailed statement is received.

(11) Bank Account Electronic Passbook Processing

The accounts management section 29 reads deposit/withdrawal detailed statement of the buyer's bank account from the database of the accounts management section 29, creates a bank account electronic passbook screen (See FIG. 8) that displays these deposit/withdrawal detailed statement as a list in which deposit/withdrawal dates are arranged in order, and then sends this bank account electronic passbook screen to the buyer system 3 such that this screen is displayed thereby. The buyer system 3 downloads a data file, which is in a predetermined format, for the bank account electronic passbook screen, and is capable of incorporating this data file in an accounting application program.

The functions and operations of the system according to the present embodiment will be described more specifically hereinbelow.

FIG. 3 shows an example of a monthly calendar screen which the calendar server 25 supplies to the buyer system 3.

As shown in FIG. 3, the calendar screen is divided into a secondary window 35 and a main window 37. Established in the secondary window 35 are: a menu region 35a provided with "This week", "Schedule input", "Month display", "Week display", "Day display", "Invoice list", and "Electronic passbook display", and other menus; a search region 35b, which is used at the time of conducting a keyword search; a region 35c displaying the calendar screen for the following month; and a "Return to this month" menu 35d.

A calendar having spaces for all the dates in the month which is designated by the buyer arranged therein is displayed in the main window 37. This calendar displays invoices addressed to the buyer 1 which are issued by the supplier system 7, as well as deposit/withdrawal detailed statement of the bank account of the buyer 1 which are sent by the banking system 13; and marks (icons and character strings) indicating deposit/withdrawal schedules created automatically from past deposit/withdrawal records for the bank account of the buyer 1.

In FIG. 3, marks such as "C damage insurance", "XY shop", and "Z company", for example, indicate invoices from the C damage insurance", invoices from the XY shop, and invoices from the Z company respectively, and these marks are pasted in the spaces for dates received by the calendar server 25. An icon (a vertical line in a square frame) that precedes the marks "C damage insurance" and "XY shop" indicates that the payment has not yet been made, for example, and an icon (an X in a square frame) that precedes the mark "Z shop" indicates that a payment request is in progress or that the payment has been made, for example.

Also in FIG. 3, the mark "payment transfer" indicates that a payment (account transfer) has been performed for a certain invoice (an invoice from the Z company, for example), and the corresponding icon (a minus sign in a square frame) signifies a withdrawal. This mark is pasted in the space for the date on which the payment (account transfer) is made. An additional mark that indicates the invoice to which this payment transfer corresponds can also be added to this "payment transfer" mark.

Also, in FIG. 3, the marks "electricity charges", "water supply charges", "cellular telephone service charges", "telephone charges" and "gas charges", for example, each indicate the withdrawal schedules according to which these charges are paid, or a "paid" withdrawal record, for example. The icon (minus sign in a square frame) of these marks signifies a withdrawal. Also in FIG. 3, the marks "XX card" and "OO loan", for example, represent a withdrawal schedule according to which a card usage fee and loan repayments are paid to the XX card company and OO loans company respectively, or a "paid" withdrawal record. This withdrawal schedule or withdrawal detailed statement mark is pasted in the space for the date scheduled for performing the withdrawal or for the date on which the withdrawal is performed. The icon (minus sign in a square frame) for this withdrawal schedule or withdrawal record signifies a withdrawal. A distinction between the withdrawal schedule and the withdrawal record can also be made by making the color or shape of the icons or character strings different.

Also in FIG. 3, the mark "Salary" indicates the deposit schedule according to which a salary is deposited, or a "deposited" deposit record. The icon (plus sign in a square frame) of this deposit schedule or deposit record mark signifies a deposit. This deposit mark is pasted in the space for the date scheduled for making this deposit or for the date on which this deposit is made. A distinction between the deposit schedule and the deposit record can also be made by making the color or shape of the icons or character strings different.

FIG. 4 shows an example of a weekly calendar screen which is displayed by the buyer system 3.

The weekly calendar screen shown in FIG. 4 can be displayed by using a pointing device to click on "This week" and/or "Week display" within the menu region 35a of the monthly calendar screen shown in FIG. 3. As shown in FIG. 4, the main window 37 of the weekly calendar screen has the calendar for the week designated by the buyer displayed therein, and the spaces for each date in this calendar have a day/date space 37a, and a deposit/withdrawal schedule and record space 37b. Displayed in the deposit/withdrawal schedule and record space 37b for each date are icons and character strings which indicate invoices received on this date, a schedule for a deposit/withdrawal scheduled for this date or a record of a deposit/withdrawal that is performed on this date.

FIG. 5 shows an example of a daily calendar screen which is displayed by the buyer system 3.

The daily calendar screen shown in FIG. 5 can be displayed by using a pointing device to click on the "Day display" menu within the menu region 35a of the calendar screen shown in FIG. 3 or 4. As shown in FIG. 5, the main window 37 of the daily calendar screen has the detailed statement of the deposit/withdrawal performed on the day designated by the buyer, and a summary of the invoice received on this day displayed therein. When, with respect to the displayed invoice, the buyer clicks the "Details" button, the detailed statement of this invoice are displayed, and hence the buyer opens the invoice, and the status of the invoice managed by the calendar server 25 is updated to "opened". When, with respect to a displayed invoice (only an unsettled invoice), the buyer clicks on the "Payment" button, the buyer approves the invoice, and an account transfer telegraphic message for payment of this invoice is automatically created and sent to the banking system 13 such that account transfer processing is automatically performed.

FIG. 6 shows an example of an invoice list screen which is displayed by the buyer system 3.

The invoice list screen shown in FIG. 6 can be displayed by using a pointing device to click on the "Invoice list" menu within the menu region 35a of the screen shown in FIG. 3, 4, or 5. As shown in FIG. 6, the main window 37 of the invoice list screen has a list that has summaries for all of the invoices received in the month designated by the buyer displayed therein. When, with respect to a displayed invoice, the buyer clicks the "Details" button, the detailed statement of this invoice are displayed, and hence the buyer opens the invoice, and the status of the invoice managed by the calendar server 25 is updated to "opened". When, with respect to a displayed invoice (only an unsettled invoice), the buyer clicks on the "Payment" button, the buyer approves the invoice, and an account transfer telegraphic message for payment of this invoice is automatically created and sent to the banking system 13 such that account transfer processing is automatically performed.

FIG. 7 shows an example of the invoice detailed statement screen which is displayed by the buyer system 3.

The invoice detailed statement screen shown in FIG. 7 can be displayed by using a pointing device to click on the "Details" button with respect to a certain invoice in the screen shown in FIG. 5 or FIG. 6. This screen has detailed information on the invoice displayed therein. When this invoice detailed statement screen is displayed, the buyer opens the invoice, and the status of the invoice managed by the calendar server 25 is updated to "opened". When, with respect to a displayed invoice (only an unsettled invoice) the buyer clicks on the "Payment" button 449, the buyer approves the invoice, and an account transfer telegraphic message for payment of this invoice is automatically created and sent to the banking system 13 such that account transfer processing is automatically performed.

FIG. 8 shows an example of a bank account electronic passbook screen which is displayed by the buyer system 3.

The electronic passbook screen shown in FIG. 8 can be displayed by using a pointing device to click on the "electronic passbook display" menu within the menu region 35a of the screens displayed in FIGS. 3 to 6. As shown in FIG. 8, the electronic passbook screen has detailed statement of deposits and withdrawals to and from the buyer's deposit account which are performed in the period designated by the buyer displayed therein so as to be arranged in the order of the deposit/withdrawal date (such as the deposit/withdrawal date, the item, the payment amount, the deposit amount, the outstanding balance, and any remarks). In short, those items which are the same as the content of the deposit passbook are displayed. In a case where there is a disparity between the corresponding preset deposit/withdrawal schedule and the actual deposit/withdrawal record, this disparity is displayed in the remarks field 63. For example, in the example of FIG. 8, because, with respect to cellular telephone charges, there is a disparity between the scheduled amount and the record amount, "scheduled amount disparity" is displayed. Clicking on "scheduled amount disparity" causes the box 65 to open, in which a more detailed explanation for this disparity is displayed.

FIG. 9 shows an example of a deposit/withdrawal schedule setting screen which is displayed by the buyer system 3.

The deposit/withdrawal schedule setting screen shown in FIG. 9 can be displayed by using a pointing device to click on the "schedule input" menu within the menu region 35a of the screen displayed in FIGS. 3 to 6, and by the buyer then selecting an arbitrary deposit/withdrawal schedule from among those automatically created by the calendar server 25 on the basis of past deposit/withdrawal detailed statement (or selecting a new schedule). The deposit/withdrawal schedule setting screen shown in FIG. 9 is an example of a case where a withdrawal schedule for cellular telephone charges which has already been set automatically is selected. Data for a withdrawal schedule automatically set by the calendar server 25 from past cellular telephone charges withdrawal records is automatically displayed in fields such as those for the item name 39, the transaction type 41, the item group 43, the transaction date (date scheduled for a given type of withdrawal) 45, and the amount 47, in the deposit/withdrawal schedule setting screen shown in FIG. 9. The buyer can also manually change these automatically set items.

The buyer can also use a field for automatic notification 49 to set conditions for performing such automatic notification, in cases where a desire exists to issue an automatic notification from the calendar server 25 to the buyer system 3 with regard to a deposit/withdrawal schedule set via this screen. In other words, if, in the [option] field for advance notification 49a, "Perform" is selected and "On the day", "the day before" or "two days before" is chosen, automatic notification with respect to this deposit/withdrawal schedule is issued from the calendar server 25 to the buyer system 3 on the day of the transaction date of this deposit/withdrawal schedule, or on the day before or two days before. Further, if, in the [option] field for subsequent notification 49b, "Perform" is selected and "notification when amounts match" or "notification when amounts do not match" in "scheduled transaction successful" is selected, in a case where deposit/withdrawal information corresponding to this deposit/withdrawal schedule is sent by the banking system 13, automatic notification of an amount match or mismatch is issued from the calendar server 25 to the buyer system 3 when the amount matches or does not match, respectively, the amount scheduled (when the amount does not match, this fact is also displayed in the electronic passbook screen, as shown in FIG. 8). Furthermore, if, in the [option] field for subsequent notification 49b, "Perform" is selected, and "display deposit/withdrawal detailed statement amount and current outstanding balance" or "notification regarding scheduled transaction" in "scheduled transaction not successful" are selected, in a case where the deposit/withdrawal corresponding to the deposit/withdrawal schedule cannot be executed due to the fact that there are insufficient funds remaining in the buyer's bank account, automatic notification is issued from the calendar server 25 to the buyer system 3 with respect to the items thus selected. Further, if, in the [option] field for subsequent notification 49b, "Perform" is selected, and "notification when an unscheduled transaction is present" is chosen, when deposit/withdrawal information that does not correspond to any deposit/withdrawal schedule is sent by the banking system, automatic notification is issued from the calendar server 25 to the buyer system 3 with respect to the deposit/withdrawal detailed statement.

FIG. 10 shows an example of an invoice list screen which the calendar server 25 supplies to the supplier system 7.

When the supplier system 7 issues a request to the calendar server 25 to conduct a search for an electronic invoice by designating an issue period and status, the calendar server 25 searches among the electronic invoices from the supplier system 7 managed by the calendar server 25 for those invoices whose issue dates lie within the designated issue period and which currently have the designated status, and sends an invoice list screen as in FIG. 10 displaying the aforementioned invoices in the form of a list, to the supplier system 7 such that these invoices are displayed thereby. The invoice list screen shown in FIG. 10 displays, for each electronic invoice, the customer's name, the invoice number, the customer's bank account number, the invoice amount, the status, the status update time, the payment deadline, the inquiry number, EDI identification information, and so forth. The supplier is thus able to determine the latest status of each electronic invoice ("notified", "opened", "payment request in progress", or payment request made", and so forth). In this screen, when the supplier enters a check mark in the cancellation box 41 for each invoice (only those invoices which have not yet assumed a payment request made" status) and a pointing device is used to click on the "cancellation processing" button 42, the calendar server 25 cancels this invoice.

FIG. 11 shows an example of an invoice list screen which the calendar server 25 supplies to the banking system 13 or 15.

When the banking system 13 or 15 issues a request to the calendar server 25 to conduct a search for an electronic invoice by designating an issue period and status, the calendar server 25 then retrieves those electronic invoices which designate the deposit account handled by the banking system 13 or 15 as the account to which the deposit is to be made, whose issue date lies within the designated issue period, and which currently have the designated status. The calendar server 25 then sends an invoice list screen of the kind shown in FIG. 11 that displays the aforementioned electronic invoices in the form of a list to the banking system 13 or 15 such that this list is displayed thereby. The invoice list screen shown in FIG. 11 displays, for each electronic invoice, the name of the invoicing company (supplier), the company code, the customer's (buyer's) name, the customer's bank account, the invoice amount, the status, the issue date, and the invoice (payment) deadline, and so forth. The financial institution is thus able to determine the latest status of each electronic invoice ("notified", "opened", "payment request in progress", or "paid", and so forth).

Figure 12:
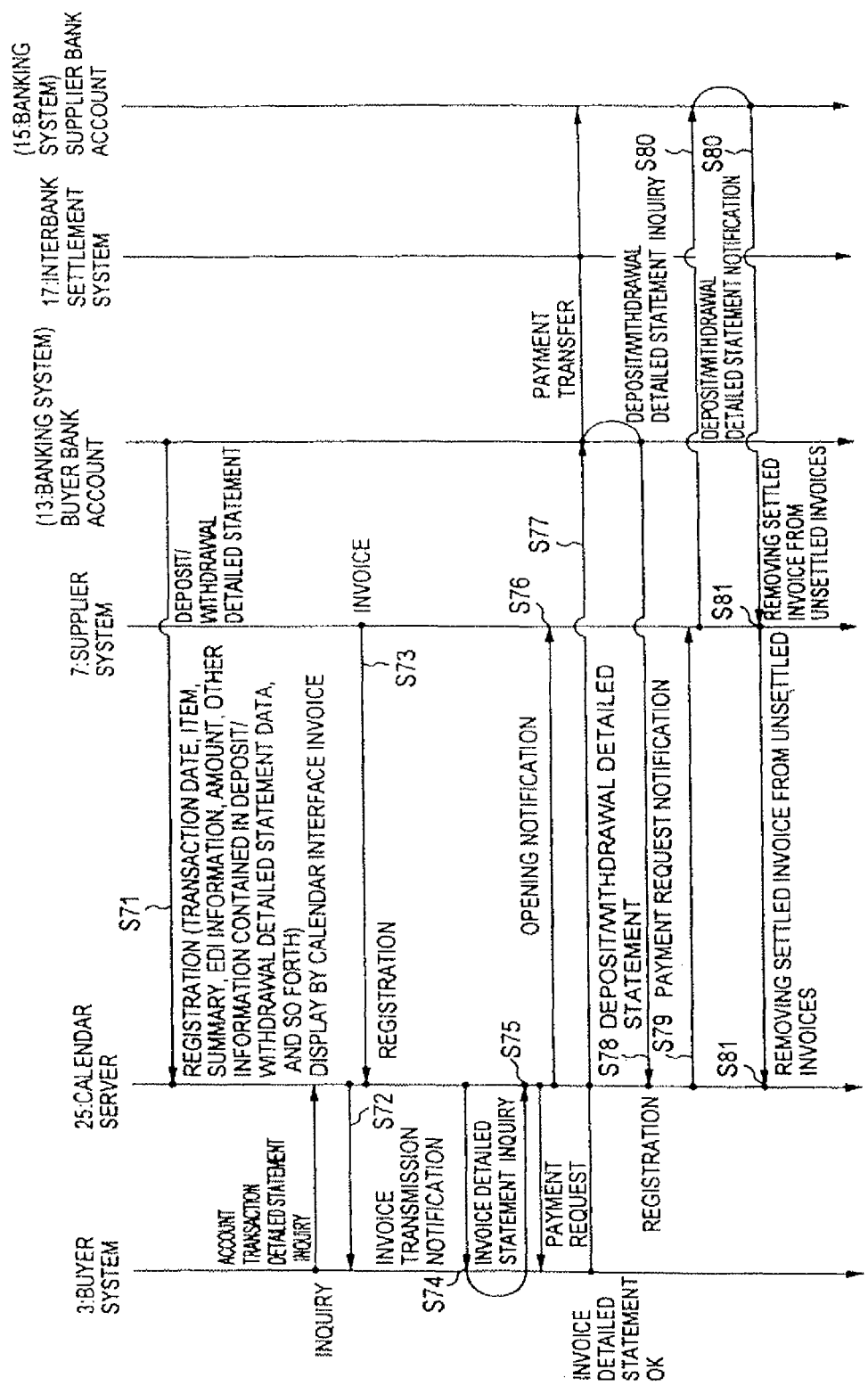
FIG. 12 is a flowchart: showing a process flow that summarizes the overall process flow of the system according to this embodiment.

FIG. 12 is a flowchart showing a process flow that summarizes the overall process flow of the system according to this embodiment.

In FIG. 12, the deposit/withdrawal detailed statement from the banking system 13 are sent to the calendar server 25 and then registered in the database of the calendar server 25 (step S71). Next, when the calendar server 25 receives a request for an inquiry regarding the account transaction details from the buyer system 3, a calendar screen (See FIGS. 3 and 4) on which deposit/withdrawal detailed statement and invoices received thus far are pasted is sent to the calendar server 25 so as to be displayed thereby, whereupon access by the buyer system 3 to this calendar screen is granted (step S72).

Invoices from the supplier system 7 which are for the buyer 1 are sent to the calendar server 25 via the communication network. The calendar server 25 acquires deposit/withdrawal schedule data from these invoices, registers this deposit/withdrawal schedule data in the database (step S73), and transfers these invoices to the electronic banking system. The calendar server 25 then notifies the buyer system 3 that the invoices have been transmitted by the supplier system 7 (step S74).

When a request for an inquiry with regard to the detailed statement of a specific invoice is transmitted by the buyer system 3 (step S75), the calendar server 25 sends an invoice detailed statement screen, which displays the detailed statement of an invoice registered on the electronic banking system, to the buyer system 3 such this screen is displayed thereby. This signifies an opening of the invoice by the buyer 1. The calendar server 25 notifies the supplier system 7 that the invoice has been opened by the buyer 1 (step S76).

Next, when the invoice is approved by the buyer 1 on the display screen of the buyer system 3, a payment request telegraphic message is automatically created with respect to this invoice and is sent to the banking system 13 via the electronic banking system, whereby the banking system 13 is requested to perform a procedure to transfer the invoice amount from the bank account of the buyer 1 to the bank account of the supplier 5. An account transfer procedure is thus executed between the banking systems 13, 15 via the interbank settlement system 17 (step S77). Next, withdrawal detailed statement are transmitted from the banking system 13 to the calendar server 25 (step S78), which forms the basis for transmitting a payment request notification from the calendar server 25 to the supplier system 7 (step S79).

Thereafter, when an inquiry relating to the supplier account deposit/withdrawal detailed statement is transmitted by the supplier system 7 to the banking system 15, the banking system 15 transmits the supplier account deposit/withdrawal detailed statement to the supplier system 7 and the calendar server 25 (step S80). Upon receiving these deposit/withdrawal detailed statement, the supplier system 7 and calendar server 25 both execute removal of the settled invoice from unsettled invoices list on the basis of the received deposit/withdrawal detailed statement, as described earlier (step S81).

Figure 13:
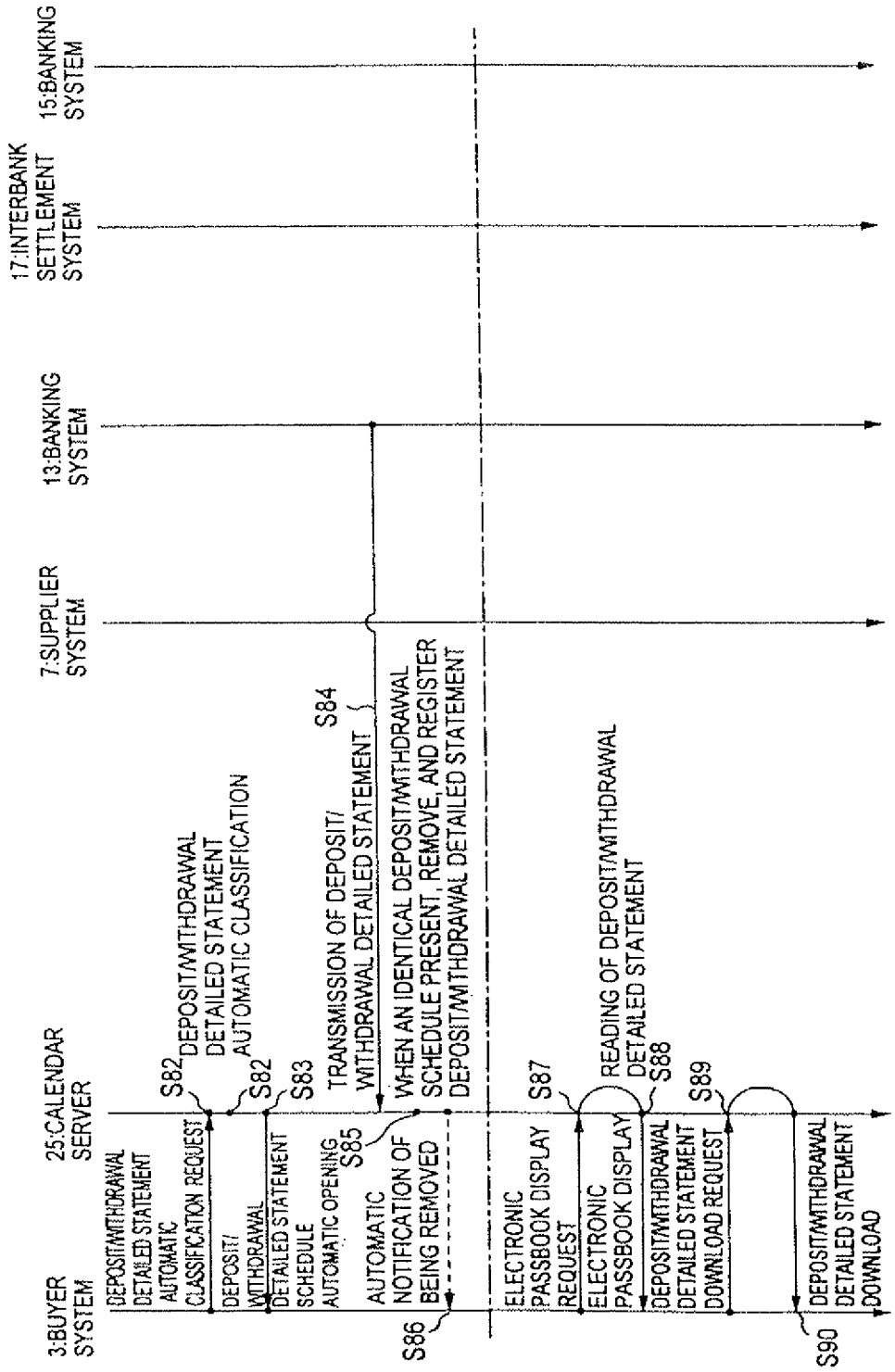
FIG. 13 is a flowchart showing a process flow that summarizes (7) deposit/withdrawal detailed statement automatic classification processing, (8) deposit/withdrawal schedule automatic setting processing, (9) deposit/withdrawal detailed statement automatic removal processing, (10) deposit/withdrawal detailed statement automatic notification processing, and (11) bank account electronic passbook processing, which are performed by the calendar server 25.

FIG. 13 shows a process flow that summarizes (7) deposit/withdrawal detailed statement automatic classification processing, (8) deposit/withdrawal schedule automatic setting processing, (9) deposit/withdrawal detailed statement automatic removal processing, (10) deposit/withdrawal detailed statement automatic notification processing, and (11) bank account electronic passbook processing, which were described above and which are performed by the calendar server 25.

In FIG. 13, when there is a request from the buyer system 3 for deposit/withdrawal detailed statement automatic classification, the calendar server 25 extracts and classifies past deposit/withdrawal detailed statement pertaining to the buyer from the database (step S82), determines future deposit/withdrawal schedules on the basis of the classification results, and automatically opens the deposit/withdrawal schedules on a calendar screen for the following month and subsequent months (step S83). Thereafter, when the buyer's account deposit/withdrawal detailed statement are transmitted by the banking system 13 (step S84), the calendar server 25 searches for and extracts the deposit/withdrawal schedules which correspond to the received deposit/withdrawal detailed statement from the database, removes the thus located deposit/withdrawal schedules from the other deposit/withdrawal schedules in the database (step S85), and automatically notifies the buyer system 3 of the removing (step S86).

Upon receiving a request from the buyer system 3 to display an electronic passbook, the calendar server 25 reads out the deposit/withdrawal detailed statement of the buyer's bank account from the database (step S87), presents these detailed statements on the electronic passbook screen (See FIG. 8), and transmits this electronic passbook screen to the buyer system 3 such that this screen is displayed thereby (step S88).

Further, upon receiving a request from the buyer system 3 to download deposit/withdrawal detailed statement (step S89), the calendar server 25 reads out the deposit/withdrawal detailed statement of the buyer's bank account from the database, creates a file of a predetermined format from these detailed statements, and sends this file to the buyer system 3 (step S90).

Figure 14:
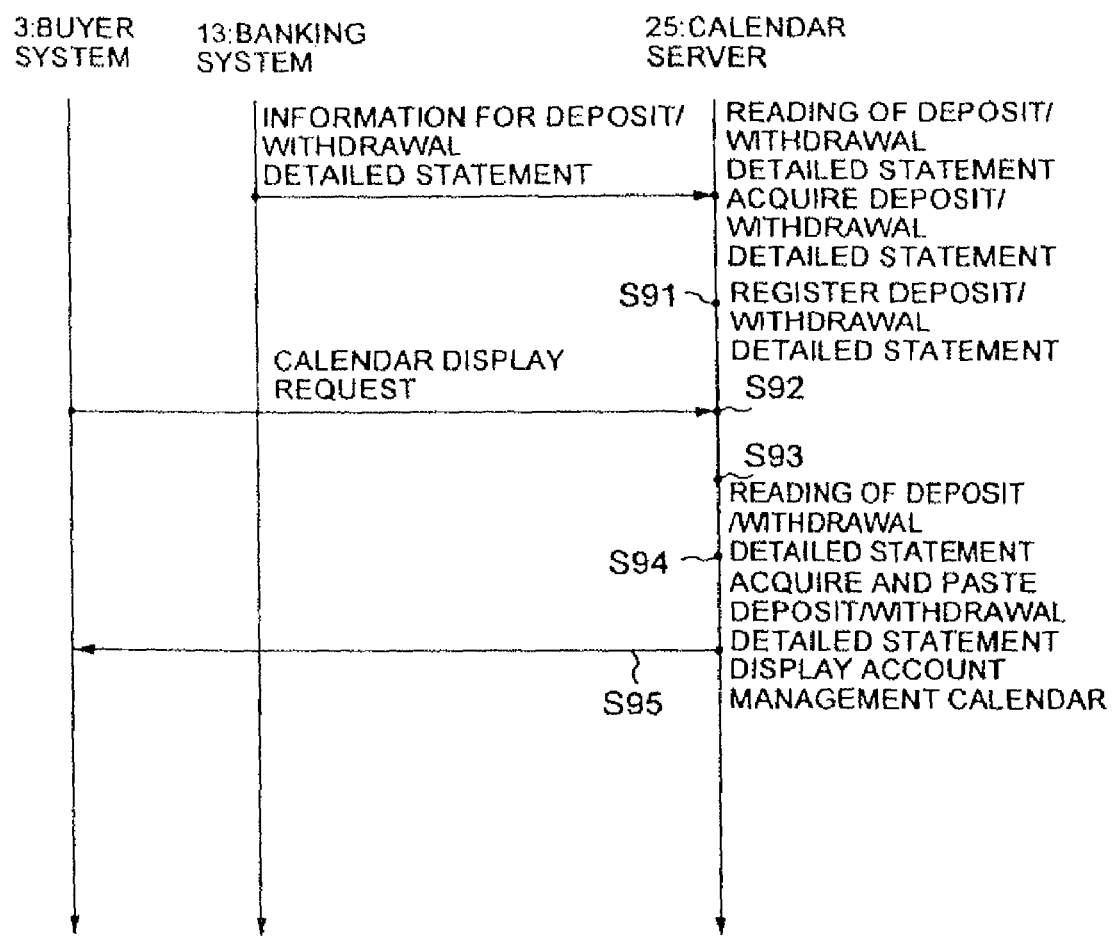
FIG. 14 is a flowchart showing the flow of (4) deposit/withdrawal detailed statement automatic pasting processing performed by the calendar server 25, which processing constitutes one part of the overall processing shown in FIG. 13.

FIG. 14 shows the flow of (4) deposit/withdrawal detailed statement automatic pasting processing performed by the calendar server 25, which processing constitutes one part of the overall processing shown in FIG. 13.

Figure 15:
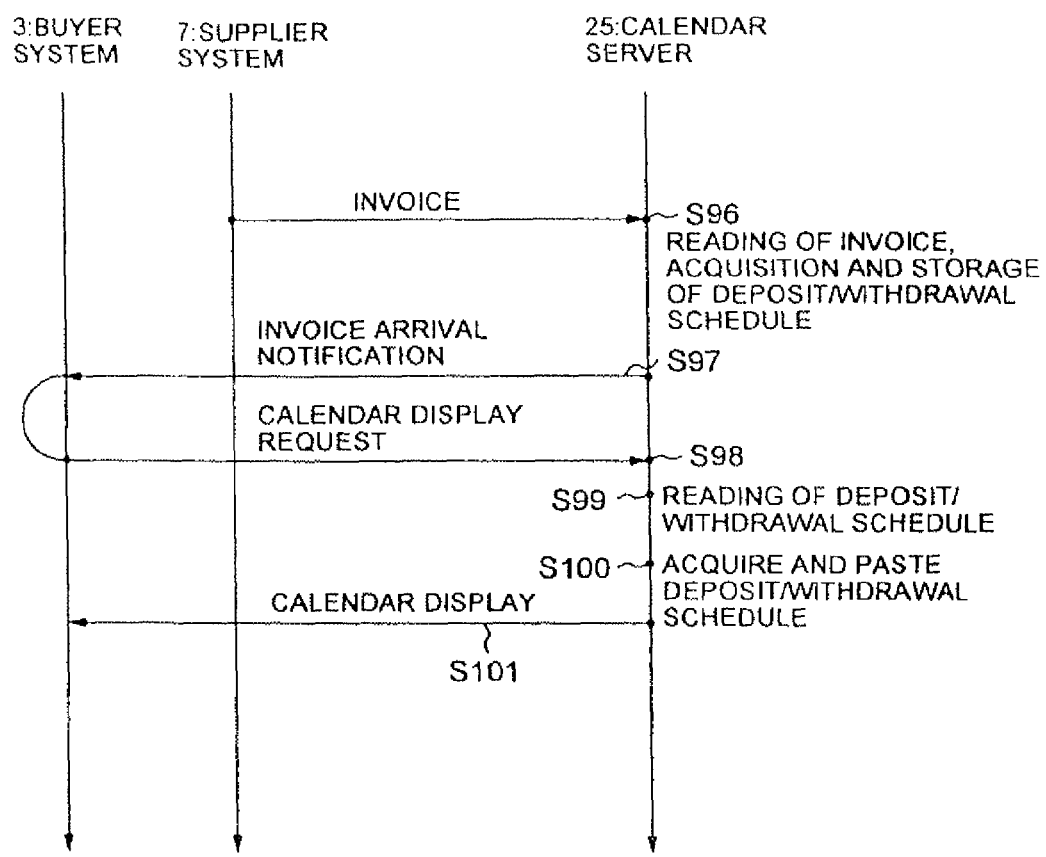
FIG. 15 is a flowchart showing the flow of (1) invoice registration processing and (5) invoice automatic pasting processing performed by the calendar server 25, which processing constitutes one part of the overall processing shown in FIG. 13.

In FIG. 14, upon receiving the deposit/withdrawal detailed statement of the buyer's bank account from the banking system 13, the calendar server 25 saves these detailed statements in the database (step S91). Thereafter, upon receiving a request to display a calendar screen for a certain month or week from the buyer system 3 (step S92), the calendar server 25 reads out the deposit/withdrawal detailed statement of this month or week from the database (step S93) and pastes these detailed statements on the calendar screen of this month or week (step S94). (As shown in FIG. 15, the calendar server 25 also pastes invoices received in this month or week on this calendar screen). The calendar server 25 then transmits this calendar screen (See FIGS. 3 and 4) to the buyer system 3 such that this screen is displayed thereby (step S95).

FIG. 15 shows the flow of (1) invoice registration processing and (5) invoice automatic paste processing performed by the calendar server 25, which processing constitutes one part of the overall processing shown in FIG. 13.

In FIG. 15, upon receiving an invoice addressed to the buyer, from the supplier system 7 the calendar server 25 acquires deposit/withdrawal schedule data from the invoice and saves this data in the database (step S96). Thereafter, the calendar server 25 notifies the buyer system 3 that this invoice has been received (step S97).

Upon receiving a request from the buyer system 3 to display a calendar for a certain month or week (step 998), the calendar server 25 reads out the deposit/withdrawal schedule data on the basis of the invoices received in that month or week, from the database (step S99) and pastes this data on the calendar screen for that month or week (step S100). (As shown in FIG. 14, the calendar server 25 also pastes deposit/withdrawal detailed statement for that month or week on this calendar screen). The calendar server 25 then transmits this calendar screen (See FIGS. 3 and 4) to the buyer system 3 such that this screen is displayed thereby (step S101).

Figure 16:
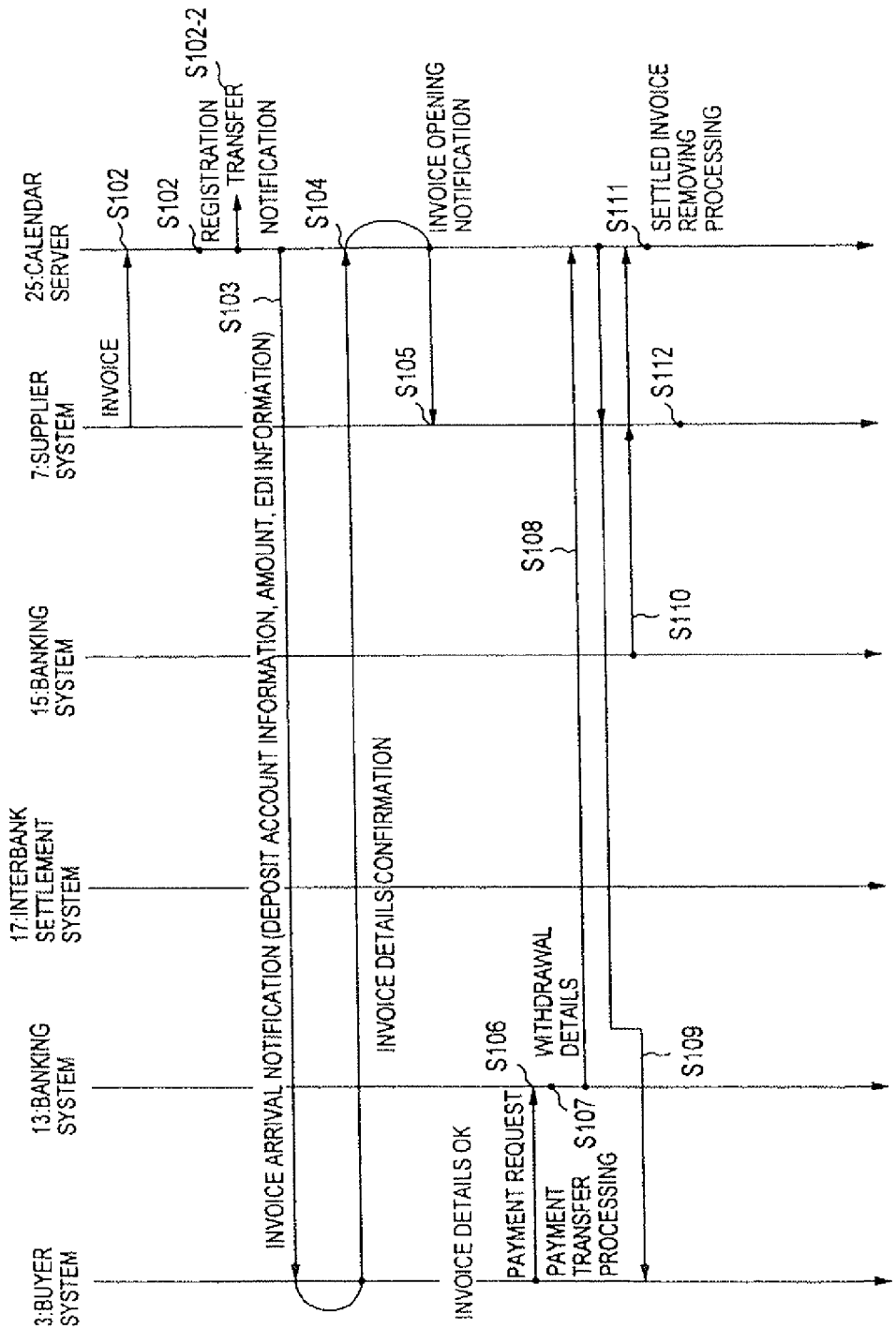
FIG. 16 is a flowchart showing the flow of (2) and (6), which are namely invoice opening processing and payment request notification processing respectively, as well as (3) settlement invoice removal processing, which are performed by the calendar server 25, which processing constitutes one part of the overall processing shown in FIG. 13.

FIG. 16 shows the flow of (2) and (6), which are namely invoice opening processing and payment request notification processing respectively, as well as (3) settlement invoice removal processing, which are performed by the calendar server 25, which processing constitutes one part of the overall processing shown in FIG. 13.

In FIG. 16, upon receiving an invoice addressed to the buyer, from the supplier system 7, the calendar server 25 acquires deposit/withdrawal schedule data from the invoice and saves this data in the database (step S102). The calendar server 25 also transfers this invoice to the electronic banking system (step S102-2). The calendar server 25 then sends notification that this invoice has been received to the buyer system 3 (step S103). This notification contains deposit account information, invoice amount information, EDI information, and so forth.

When a request is made by the buyer system 3 for confirmation of the detailed statement of an invoice, the detailed statement of the invoice, which are stored by the electronic banking system, are sent to the buyer system 3 and displayed thereby, whereupon the calendar server 25 receives notification regarding this confirmation of invoice detailed statement (step S104). The calendar server 25 then sends notification regarding the opening of the invoice to the supplier system 7 (step S105).

Further, when the buyer 1 inputs his or her approval of the invoice to the buyer system 3, a payment (account transfer) telegraphic message is transmitted from the buyer system 3 to the banking system 13 (step S106), and the banking system 13 performs processing for a transfer from the buyer's bank account to the supplier's bank account using the interbank settlement system 17 (step S107) (the processing of steps S106 and S107 can also be carried out via the calendar server 25). The banking system 13 transmits withdrawal detailed statement of the buyer's bank account for this account transfer to the calendar server 25 (step S108). Upon receiving these withdrawal detailed statement, the calendar server 25 changes the status of the invoice to "payment request in progress", and notifies the supplier system 7 and the buyer system 3 of this status change (the buyer system 3 pastes an icon indicating that the payment request is in progress to the mark for this invoice on the calendar screen) (step S109).

When the supplier system 7 issues a request to the banking system 15 to confirm the detailed statement of the deposit to the supplier's bank account for payment of a certain invoice, the banking system 15 sends these deposit detailed statement to the supplier system 7 and the calendar server 25 (step S110). Then, on the basis of the deposit detailed statement from the banking system 15, the calendar server 25 removes the settled invoice from unsettled invoices (step S111), and the supplier system 7 also removes the settled invoice (step S112).

Figure 17:
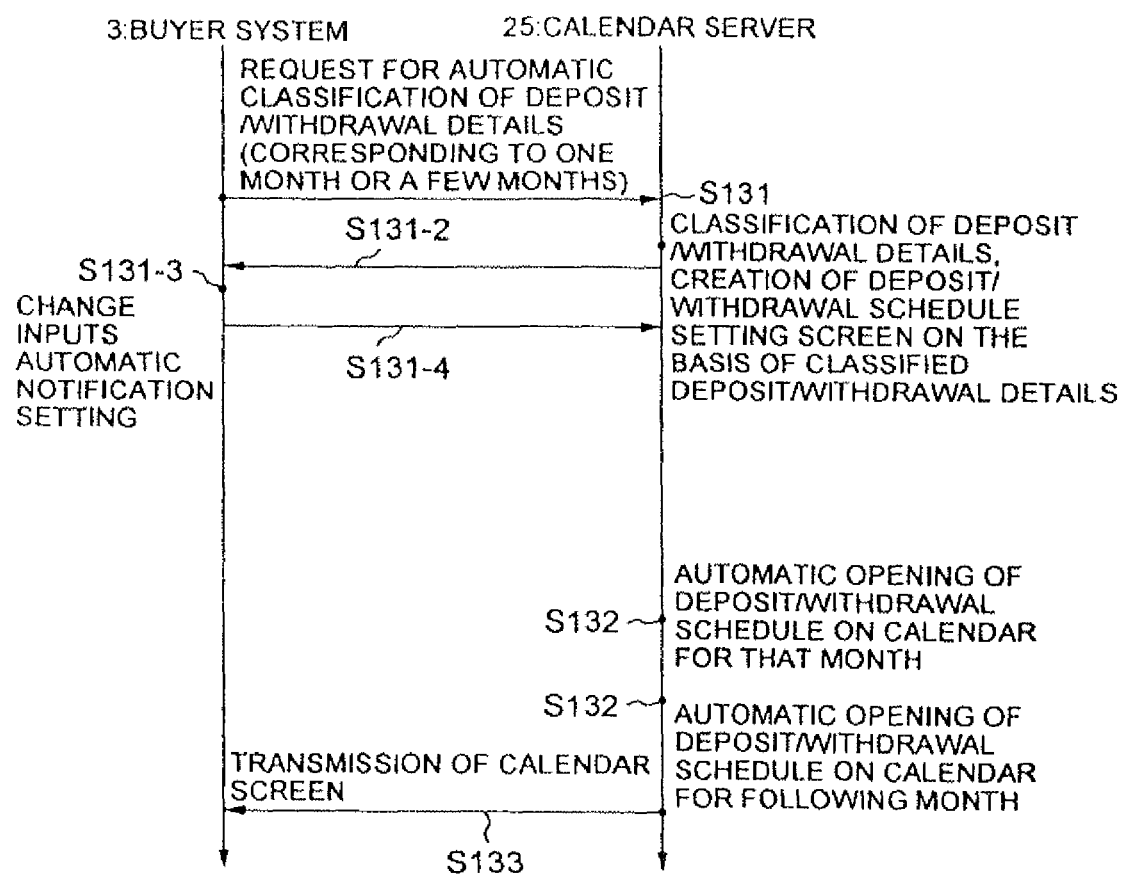
FIG. 17 is a flowchart showing the flow of (7) deposit/withdrawal detailed statement automatic classification processing and (8) deposit/withdrawal schedule automatic setting processing, which are performed by the calendar server 25, which processing constitutes one part of the processing shown in FIG. 14.

FIG. 17 shows the flow of (7) deposit/withdrawal detailed statement automatic classification processing and (8) deposit/withdrawal schedule automatic setting processing, which are performed by the calendar server 25, which processing constitutes one part of the processing shown in FIG. 14.

In FIG. 17, upon receiving a request from the buyer system 3 for automatic classification of deposit/withdrawal detailed statement of a past period (corresponding to one month or a number of months) which is designated by the buyer, the calendar server 25 classifies the deposit/withdrawal detailed statement of the buyer's bank account pertaining to this designated past period, which are in the database, on the basis of items such as the item, the transaction type, and the transaction date, and determines future deposit/withdrawal schedules on the basis of the classified deposit/withdrawal detailed statement. The calendar server 25 then creates a deposit/withdrawal schedule setting screen as shown in FIG. 9 with respect to each deposit/withdrawal schedule (step S131), and sends the deposit/withdrawal schedule setting screen to the buyer system 3 such that this screen is displayed thereby (steps S131-2).

The buyer changes the detailed statement of deposit/withdrawal schedules according to requirements, and/or performs automatic notification setting according to requirements (steps S131-3), and so forth, via the deposit/withdrawal schedule setting screen, whereupon the deposit/withdrawal schedules which have been confirmed by the buyer are sent from the buyer system 3 to the calendar server 25 (steps S131-4).

The calendar server 25 pastes the confirmed deposit/withdrawal schedules onto the calendar screens for this month and the following month (See FIGS. 3 and 4) (step S132). The calendar server 25 transmits this calendar screen for that month or the following month to the buyer system 3 (step S133).

Figure 18:
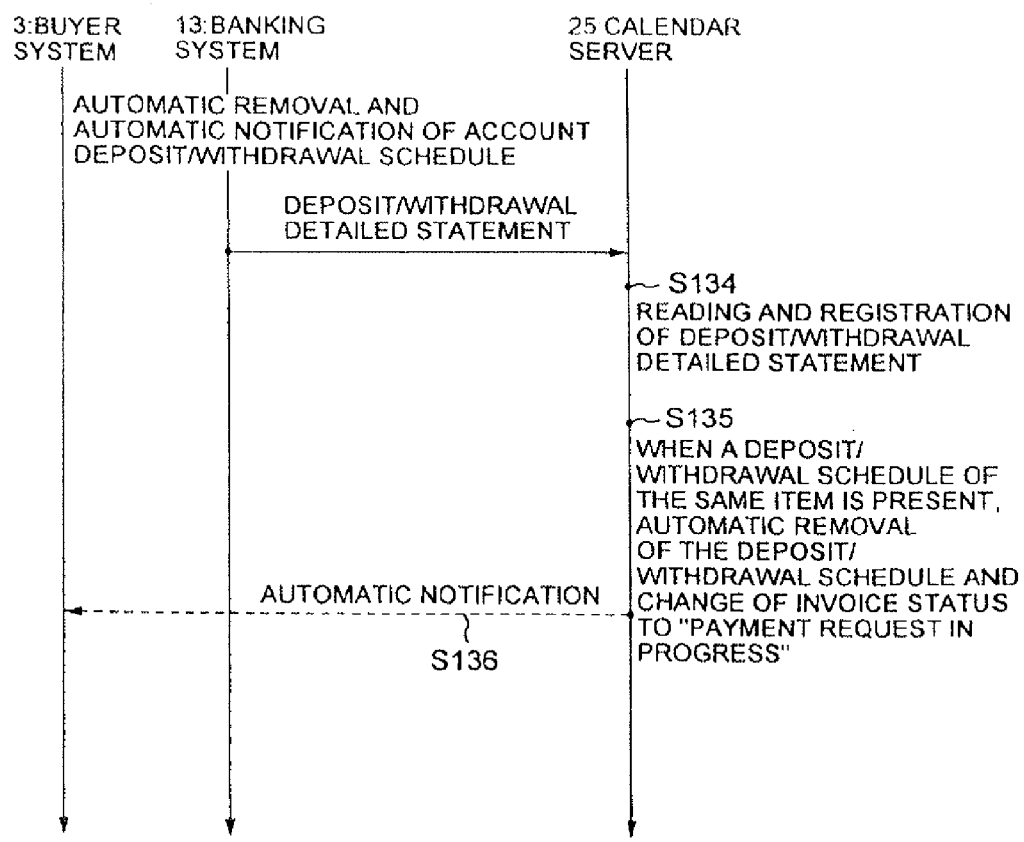
FIG. 18 is a flowchart showing the flow of (9) deposit/withdrawal schedule removal processing, and (10) deposit/withdrawal detailed statement automatic notification processing, which are performed by the calendar server 25, which processing constitutes one part of the processing shown in FIG. 14.

FIG. 18 shows the flow of (9) deposit/withdrawal schedule removal processing, and (10) deposit/withdrawal detailed statement automatic notification processing, which are performed by the calendar server 25, which processing constitutes one part of the processing shown in FIG. 14.

In FIG. 18, upon receiving the deposit/withdrawal detailed statement of the buyer's bank account from the banking system 13, the calendar server 25 stores these detailed statements in the database (step S134). Thereafter, the calendar server 25 searches for and extracts the deposit/withdrawal schedules which correspond to the received deposit/withdrawal detailed statement from the database, removes the corresponding deposit/withdrawal schedules thus located, and updates the status of the invoices which correspond to these deposit/withdrawal schedules to "payment request in progress" (step S135). The calendar server 25 then automatically notifies the buyer system 3 of the result of step S135 (step S136).

Figure 19:
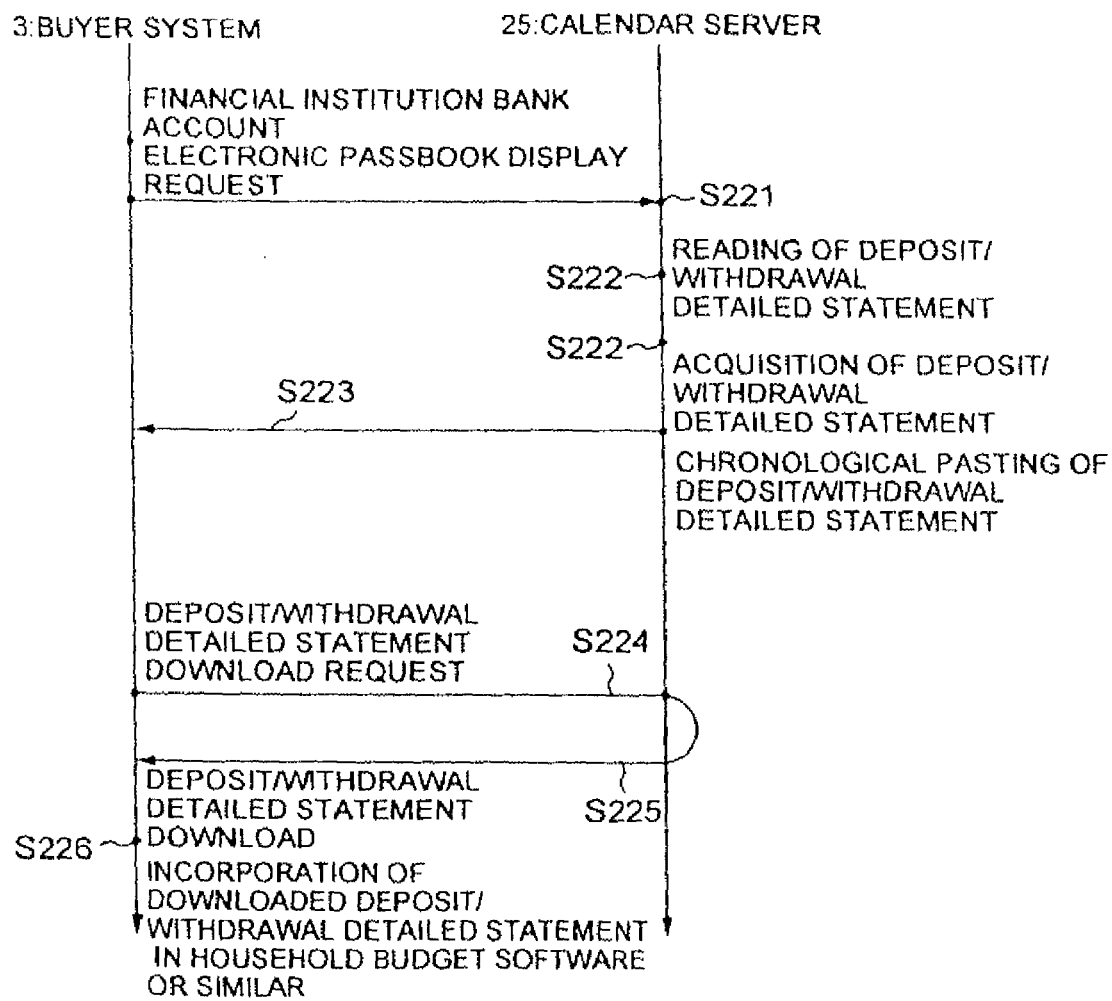
FIG. 19 is a flowchart showing the flow of (11) bank account electronic passbook processing, which is performed by the calendar server 25, which processing constitutes one part of the processing shown in FIG. 14.

FIG. 19 shows the flow of (11) bank account electronic passbook processing, which is performed by the calendar server 25, which processing constitutes one part of the processing shown in FIG. 14.

In FIG. 19, the buyer 1 makes a request to the calendar server 25 via the buyer system 3 to display a bank account electronic passbook (step S221), whereupon the calendar server 25 reads out the deposit/withdrawal detailed statement of the buyer's bank account from the database (step S222), presents these deposit/withdrawal detailed statement in date order on the electronic passbook screen, as shown in FIG. 8, and transmits this electronic passbook screen to the buyer system 3 (step S223).

Further, upon receiving a request from the buyer system 3 to download deposit/withdrawal detailed statement (step S224), the calendar server 25 reads out information of the deposit/withdrawal detailed statement of the buyer's bank account from the database, creates a file of a predetermined format from these detailed statements, and downloads this file to the buyer system 3 (step S225). Upon receiving this file of the deposit/withdrawal detailed statement, the buyer system 3 is capable of incorporating this deposit/withdrawal detailed statement file into household budget application software or similar in the buyer system 3 (step S226).

The operation of the system according to the present embodiment was described above. The operation described hereinabove can basically be applied irrespective of what kind of company or government administration office the supplier is. However, in cases where the supplier is a securities company, a loans company, or a factoring company, it is also possible to perform an operation, as described below, which is slightly different from that described above.

Figure 20:
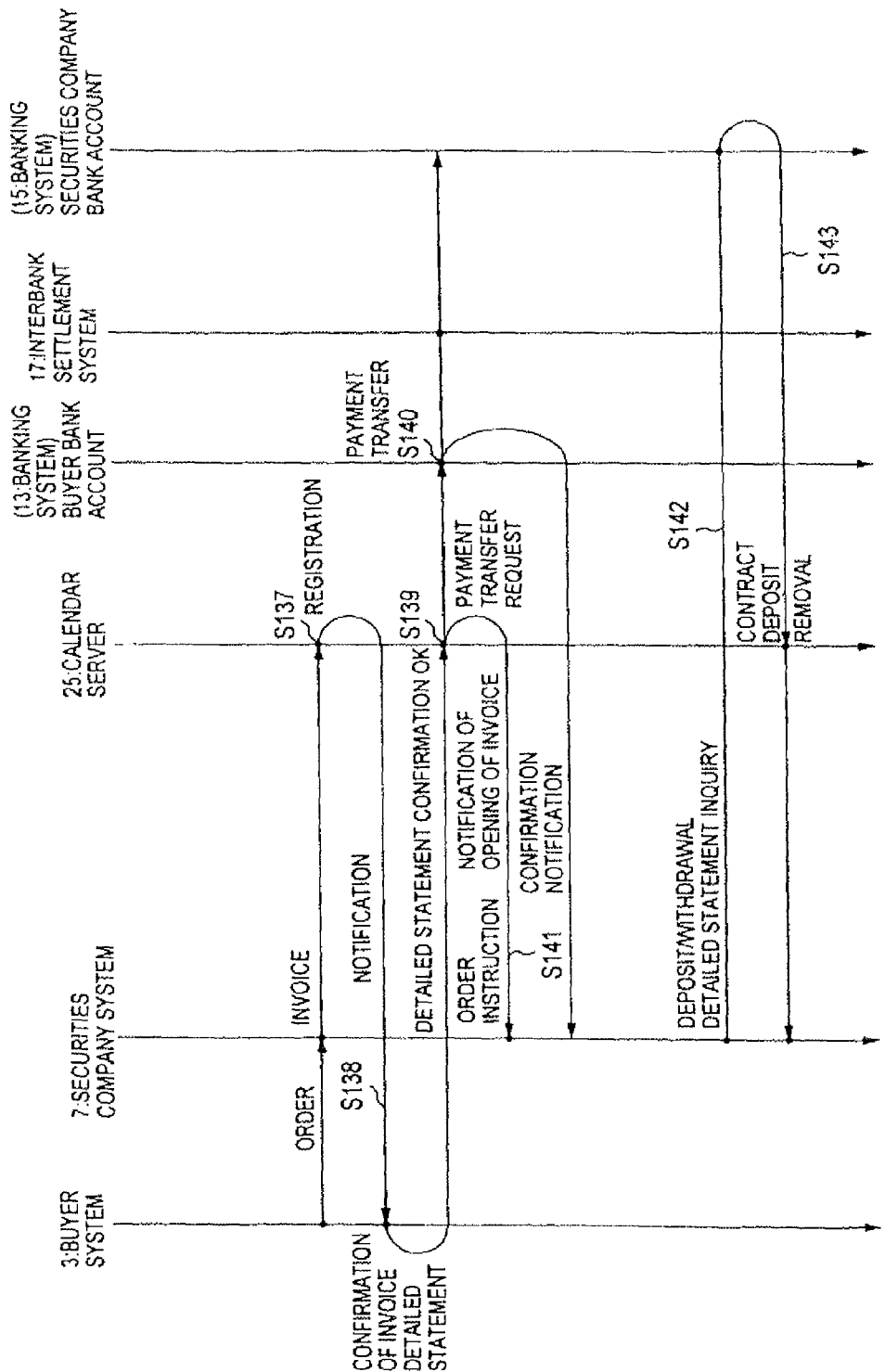
FIG. 20 is a flowchart showing a process flow that summarizes another overall operation which the system of this embodiment is capable of performing when the supplier is a securities company.

FIG. 20 shows a process flow that summarizes another overall operation which the system of this embodiment is capable of performing when the supplier is a securities company.

In FIG. 20, when an order to purchase share certificates, or securities of a public bonds company, is inputted by the buyer to the supplier (securities company) system 7 (directly or via the calendar server 25), the calendar server 25 receives an invoice relating to this securities purchase from the securities company system 7, and stores deposit/withdrawal schedule data based on this invoice in the database (step S137). The calendar server 25 then registers this invoice in the electronic banking system. The calendar server 25 then notifies the buyer system 3 of the detailed statement of this invoice (step S138). Upon receiving notification from the buyer system 3 that the detailed statement of this invoice have been confirmed and acknowledged, the calendar server 25 sends a telegraphic message to the banking system 13 requesting the transfer of the invoice amount from the buyer's bank account to the bank account of the securities company (step S139), and, at the same time, transmits notification to the securities company system 7 that the invoice has been opened by the buyer 1 (step S141).

After receiving the account transfer request telegraphic message, the banking system 13 uses the interbank settlement system 17 to perform the account transfer processing (step S140). Further, upon receiving this opening notification, the securities company system 7 puts the securities purchase order from the buyer on the securities market.

The above processing from the time the buyer makes an order until the time when this order is put on the securities market is executed electronically in an extremely short time, meaning that there is no risk of the buyer missing out on an opportunity to purchase securities as a result of fluctuations in the market.

When the above account transfer processing is performed, the banking system 13 transmits the withdrawal detailed statement of the buyer's bank account, which result from this account transfer, to the calendar server 25, whereupon the calendar server 25 transmits a payment request notification with regard to this invoice to the securities company system 7.

Thereafter, when a request for a deposit detailed statement inquiry regarding this invoice is issued by the securities company system 7 to the banking system 15 (step S142), the banking system 15 sends the deposit detailed statement to the calendar server 25 and the securities company system 7, and the calendar server 25 and securities company system 7 then remove this invoice on the basis of the deposit detailed statement (step S143).

Figure 21:
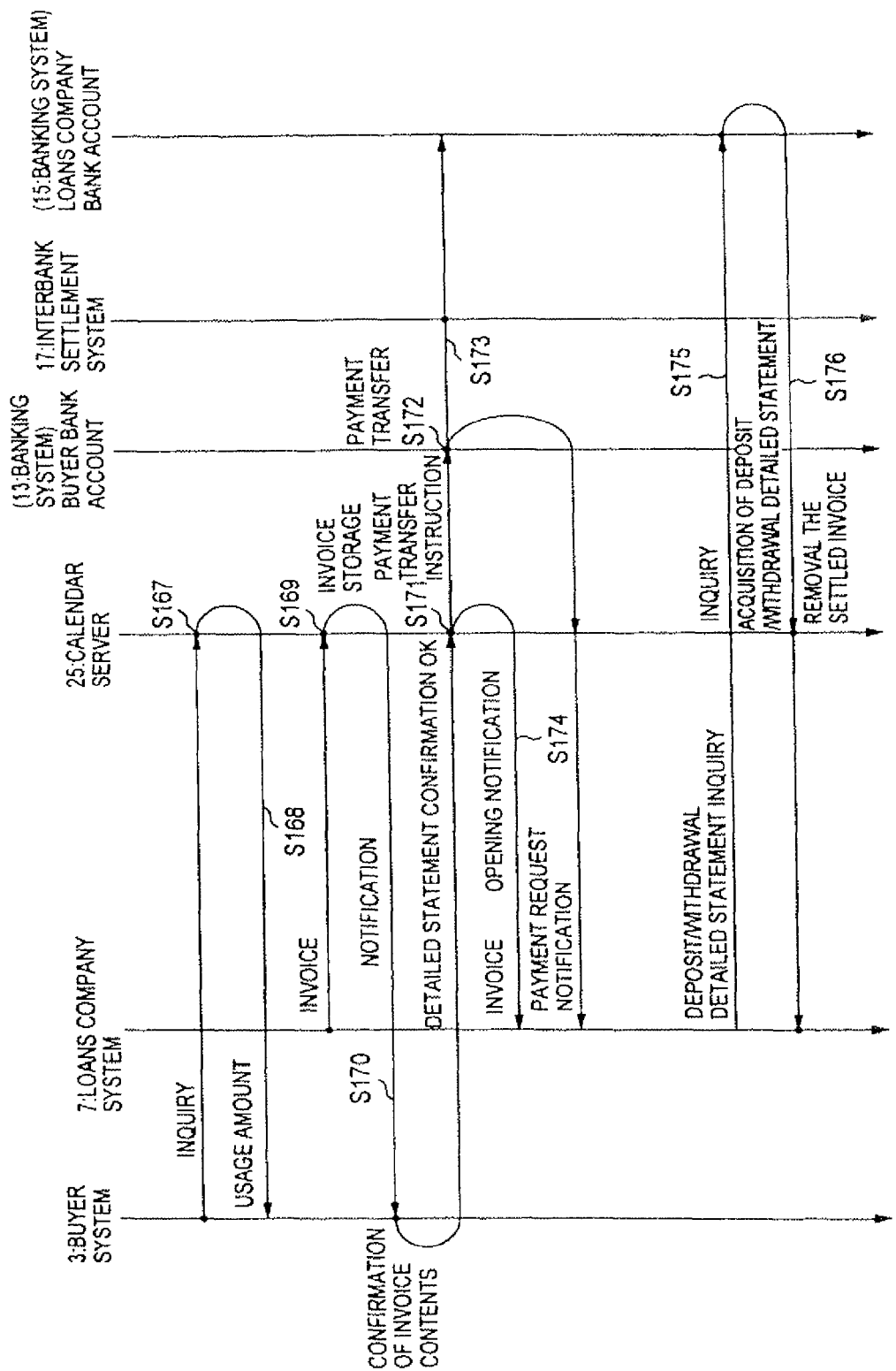
FIG. 21 is a flowchart showing a process flow that summarizes yet another overall operation which the system of this embodiment is capable of performing when the supplier is a loans company.

FIG. 21 shows a process flow that summarizes yet another overall operation which the system of this embodiment is capable of performing when the supplier is a loans company.

In FIG. 21, upon receiving an inquiry from the buyer with regard to a buyer loan via the buyer system 3 (step S167), the calendar server 25 transmits the detailed statement of the loan transaction, such as the amount of money loaned, and the repayment schedule, to the buyer system 3 (step S168).

Further, the calendar server 25 receives an invoice relating to repayment of the loan, from the supplier (loans company) system 7, stores this invoice (step S169), and notifies the buyer system 3 that this invoice has arrived (step S170). When the buyer confirms the invoice detailed statement on the buyer system 3, the calendar server 25 receives notification from the buyer system 3 regarding confirmation and approval of the invoice detailed statement (step S171). The calendar server 25 then transmits a transfer request telegraphic message for repayments from the buyer's bank account to the loan company's bank account, to the banking system 13 (step S172), and transmits notification that this invoice has been opened by the buyer to the loans company system 7 (step S174).

Upon receiving the transfer request telegraphic message, the banking system 13 performs this transfer processing using the interbank settlement system 17 (step S173). When this transfer processing is performed, the banking system 13 transmits withdrawal detailed statement of the buyer's bank account which result from this account transfer to the calendar server 25, and, by way of response, the calendar server 25 transmits a payment request notification to the loans company system 7.

Thereafter, when a request for a deposit detailed statement inquiry regarding this invoice is issued by the loans company system 7 to the banking system 15 (step S175), the banking system 15 sends the deposit detailed statement to the calendar server 25 and the loans company system 7, and the calendar server 25 and loans company system 7 then remove this invoice on the basis of the deposit detailed statement (step S176).

Figure 22:
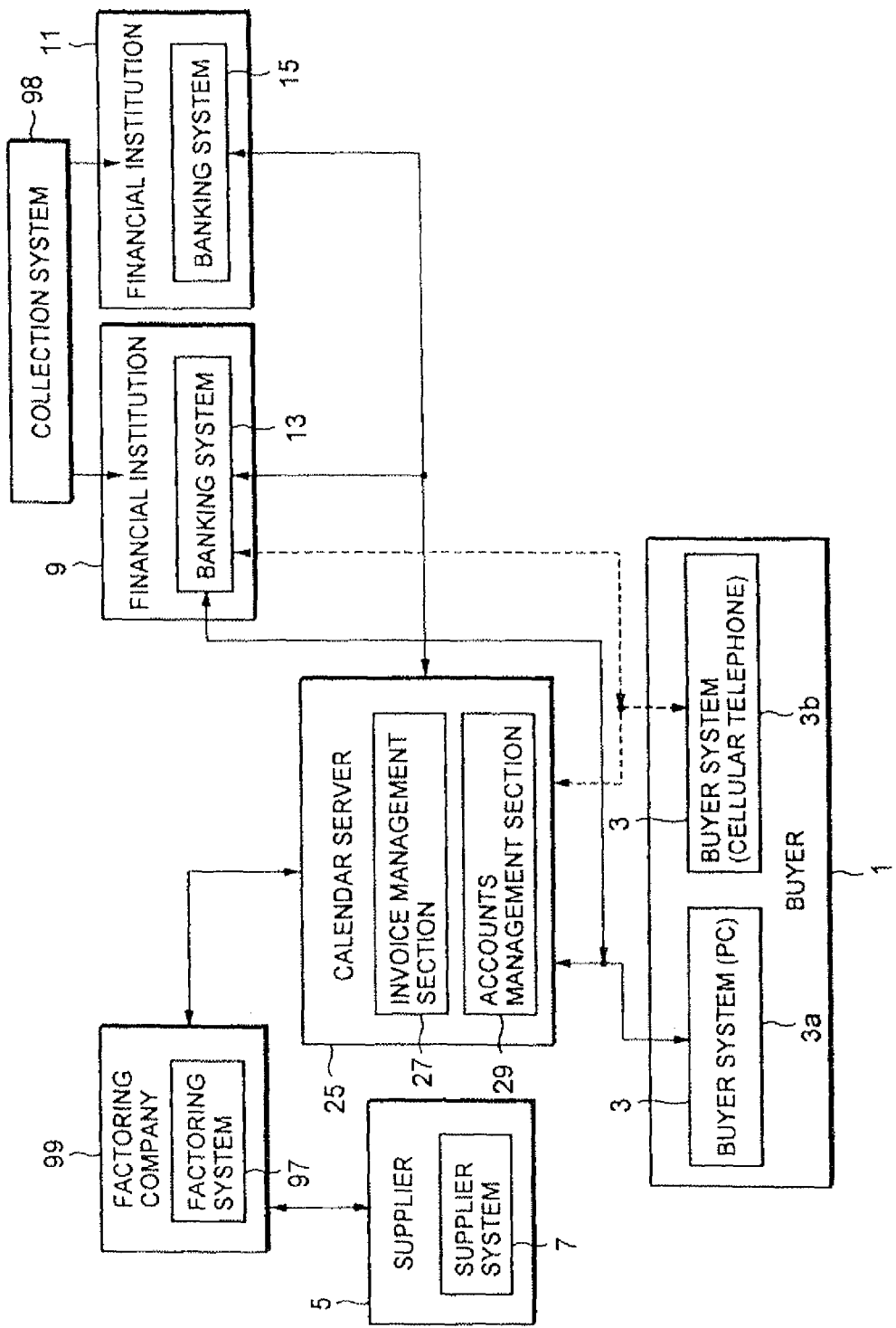
FIG. 22 is a block diagram showing the constitution of the transaction and settlement management system according to the present invention in a case where a factoring company is present as one kind of supplier.

FIG. 22 showing the constitution of the transaction and settlement management system according to the present invention in a case where a factoring company is present as one kind of supplier.

The factoring company 99 purchases accounts obligation rights from a certain supplier 5 that owns accounts obligation rights with respect to the buyer 1 and uses the calendar server 25 to collect the accounts charges from the buyer 1. A computer system (factoring system) 97 of the factoring company 99 is capable of communicating with the supplier system 7 and the calendar server 25 via a predetermined communication network. A collection system 98 is capable of communicating with the banking system 13 that takes charge of the buyer's bank account and the banking system 15 that takes charge of the bank account of the factoring company 99.

Figure 23:
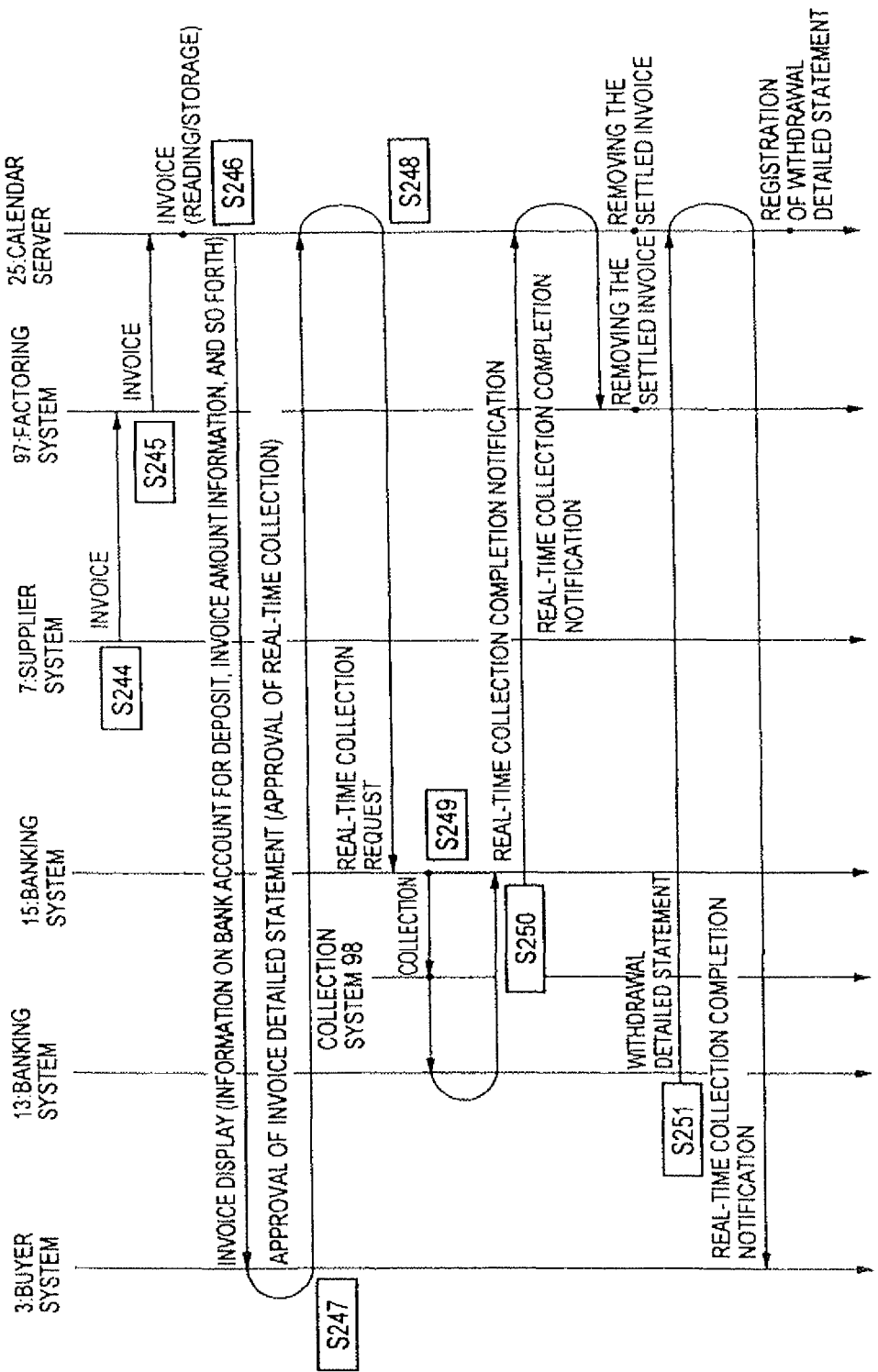
FIG. 23 is a flowchart showing a process flow that summarizes the overall processing of the system of FIG. 22.

FIG. 23 shows a process flow that summarizes the overall processing of the system of FIG. 22.

In FIG. 23, the supplier system 7 transmits an electronic invoice that is addressed to the buyer 1 to the factoring system 97, and issues a collection request to the factoring system 97 (step S244). The factoring system 97 transmits this invoice to the calendar server 25 in real time or with predetermined timing (step S245). The calendar server 25 stores the invoice received from the factoring system 97 in the database, and transmits the invoice detailed statement to the buyer system 3 such that the detailed statement are displayed thereby (step S246). The invoice detailed statement which are thus sent to the buyer system 3 include information on the bank account to which the deposit is made, and information on the invoice amount.

When the buyer 1 confirms and approves the detailed statement of the invoice displayed on the buyer system 3 (step S247), the calendar server 25 transmits a collection request for payment of this invoice to the banking system 15, which handles the bank account of the factoring company 99 (step S248). The banking system 15 uses the collection system 98 to perform collection processing which involves transferring the invoice amount from the buyer's bank account of the banking system 13 to the factoring company's bank account of the banking system 15 (step S249).

When the above-mentioned collection processing is complete, the banking system 15 transmits a collection completion notification in real time or with predetermined timing to the calendar server 25. Upon receiving this collection completion notification, the calendar server 25 removes this invoice in the database (that is, updates the status of this invoice to "paid"), and sends this collection completion notification to the factoring system 97 (step S250).

Furthermore, the calendar server 25 receives withdrawal detailed statement(s) of the buyer's bank account which result from the collection processing from the banking system 13, registers these withdrawal detailed statements in the database, and sends a collection completion notification on the basis of these withdrawal detailed statements to the buyer system 3 in real time or with predetermined timing (step S251).

The system of the embodiment described above is an illustrative example serving to describe the present invention. The transaction and settlement management system according to the present invention can also be used for a variety of applications other than the above embodiment. For example, the transaction and settlement management system according to the present invention can also be applied to the management of funds not only in a deposit account provided at a bank but also a deposit account provided in an insurance company, a deposit account provided in a securities company, and so forth. Further, the detailed statement of an electronic invoice can be stored not only by the electronic banking system 21 but also by the calendar server 25. The calendar server 25 or another system can automatically create a payment transfer telegraphic message on the basis of the above electronic invoice (when electronic data for performing the payment transfer such as the payment transfer amount, for example, is entered via a screen displaying the electronic data, a payment transfer is automatically performed from a desired bank account to another desired bank account). Also, the supplier system 7 acquires an electronic invoice, and is able to use this electronic invoice (data indicating the payment deadline which is contained in the invoice, for example) to infer the scheduled deposit date (for example, if the payment deadline is Jan. 10, 2001, the scheduled deposit date is determined as being Jan. 10, 2001, or a date that is based on the past deposit/withdrawal history for the buyer 1 (Jan. 8, 2001, which is two days before the payment deadline, for example) can be determined as being the scheduled deposit date). Further, the buyer system 3 acquires the electronic invoice and is able to use the electronic invoice (data indicating the payment deadline which is contained in the invoice, for example) to infer the scheduled withdrawal date (for example, if the payment deadline is Jan. 10, 2001, the scheduled withdrawal date is determined as being Jan. 10, 2001, or a date that is based on the past deposit/withdrawal history for the buyer 1 (Jan. 8, 2001, which is two days before the payment deadline, for example) can be determined as being the scheduled withdrawal date). In other words, the supplier 5 and the buyer 1 are able to easily establish an estimate for the cash flow.

A description follows for a transaction, settlement and news management system according to yet another embodiment of the present invention.

FIG. 24 is a block diagram showing the overall constitution of the transaction, settlement, and news management system according to this embodiment.

As shown in FIG. 24, a supplier system 301, an electronic mall 303, a banking system 305, buyer system 307, and a calendar server 309 are all connected so as to be capable of communicating with one another via the Internet or similar. In reality, there is a multiplicity of supplier systems, electronic malls, banking systems, and buyer systems, but only one of each is shown representatively in FIG. 24.

The supplier system 301 transmits an electronic invoice addressed to the buyer (containing, for example, personal information on the buyer (name, address, telephone number, date of birth, and so forth), an invoice number, the date for an automatic debit or the payment deadline, the invoice amount, the buyer's bank account number, the supplier's bank account number, and EDI information, and so forth) to the banking system 305 and the calendar server 309. The supplier system 301 also transmits information (referred to as "news" hereinbelow) which the supplier wishes to relay to the buyer, such as advertisements for services, products, and the like, which are provided by the supplier, and the URL of the supplier's home page or non-commercial advertisements, to the calendar server 309. The news contains the content of the news, the time conditions for communicating the news to the buyer (fixed display date), buyer conditions for communicating the news (target), as well as information such as the area and type of the content of this news.

The electronic mall 303 is a system for supplying the buyer with so-called "on-line shopping services" in relation to a variety of products (this signifies services as well as goods). When the buyer purchases a product by shopping on-line, the electronic mall 303 transmits an electronic invoice (containing, for example, personal information on the buyer (the buyer's name, address, telephone number, date of birth, and so forth), an invoice number, the date for an automatic debit or the payment deadline, the invoice amount, the buyer's bank account number, the supplier's bank account number, and so forth) to the banking system 305 and the calendar server 309. Further, when order, settlement, or dispatch processing is complete, the electronic mall 303 transmits an electronic mail to that effect to the calendar server 309, such that when the buyer accesses the calendar server 309, the fact that the order, settlement or dispatch processing is complete is communicated to the buyer in the form of a message from the calendar server 309 to the buyer.

The banking system 305 manages the buyer's deposit account. The banking system 305 performs deposit/withdrawal processing with respect to the buyer's bank account on the basis of a request telegraphic message from the supplier system 301 or the electronic mall 303, and transmits electronic deposit/withdrawal detailed statement (including, for example, the item, the deposit/withdrawal date, the deposit/withdrawal amount, the outstanding balance, a summary, EDI information, and so forth) to the calendar server 309. The banking system 305 transmits information which the bank wishes to relay to the buyer (also referred to as "news" hereinafter), such as advertisements for various financial products, financial services, and the like, provided by the bank, the URL of the bank's home page, or non-commercial advertisements, to the calendar server 309. The news contains the content of the news, the time conditions for communicating the news to the buyer (fixed display date), buyer conditions for communicating the news (target), as well as information such as the area and type of the content of this news.

Furthermore, the banking system 305 is connected to an electronic banking system such as an Internet banking system and is capable of supplying on-line banking services such as an outstanding balance inquiry, a deposit/withdrawal detailed statement inquiry, and an account transfer, to the buyer system 7. The banking system 305 also provides a button which is for access (a jump) to the calendar server 309 and which is on a GUI screen with which the buyer system 307 using the electronic banking system is provided. Thus, when the buyer uses a pointing device to click on this button on the GUI screen of the banking system 305 which is displayed by the buyer system 307, the buyer system 307 is connected to the calendar server 309.

The buyer system 307 is, for example, a personal computer, a cellular telephone, a PDA, or the like, which has a function permitting access to various servers on the Internet (typically containing an Internet connection function and a WWW browser), but the buyer system 307 is not limited to or by this illustrative example. By using the buyer system 307, the buyer is capable of accessing the electronic mall 303 to shop online or of accessing the banking system 305 via the electronic banking system to make an outstanding balance inquiry, a deposit/withdrawal detailed statement inquiry, or an account transfer, or similar.

As will be described in detail subsequently, as a result of using the buyer system 307 to thereby access the calendar server 309, the buyer is also capable of reading invoices sent by the supplier system 301 and the electronic mall 303, as well as deposit/withdrawal information on the buyer's bank account sent by the banking system 305, of sending requests for payment of these invoices to the banking system 305, and also of reading a variety of news sent from the supplier system 301, the electronic mall 303, and the banking system 305.

A variety of methods can be adopted as the method permitting the buyer to access the calendar server 309 by using the buyer system 307, such as a method for making a jump to the calendar server 309 from the GUI screen displayed at the time of logging on to the electronic banking system of the banking system 305, a method for directly accessing the calendar server 309, and a method for making a jump from the home page of the supplier to the calendar server 309, and so forth.

The calendar server 309 supplies the buyer system 307 with two calendar screens which are exclusive to the buyer (See FIGS. 25, 26, 32, 33, and 34). One of these calendar screens (See FIGS. 25 and 26) is called the "Account management calendar", and the second calendar screen (See FIGS. 32, 33, and 34) is called the "News calendar".

Figure 32:
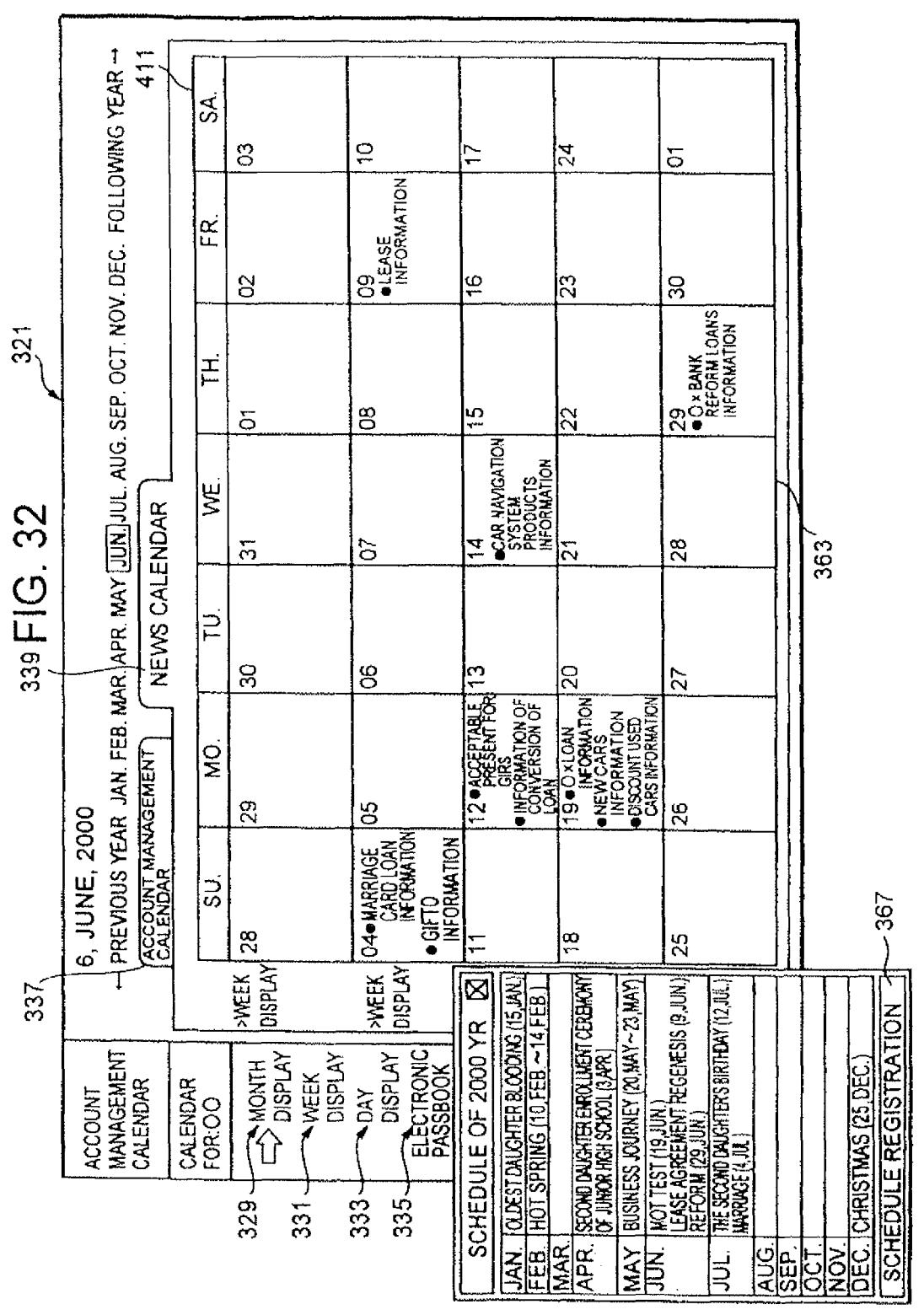
Figure 33:
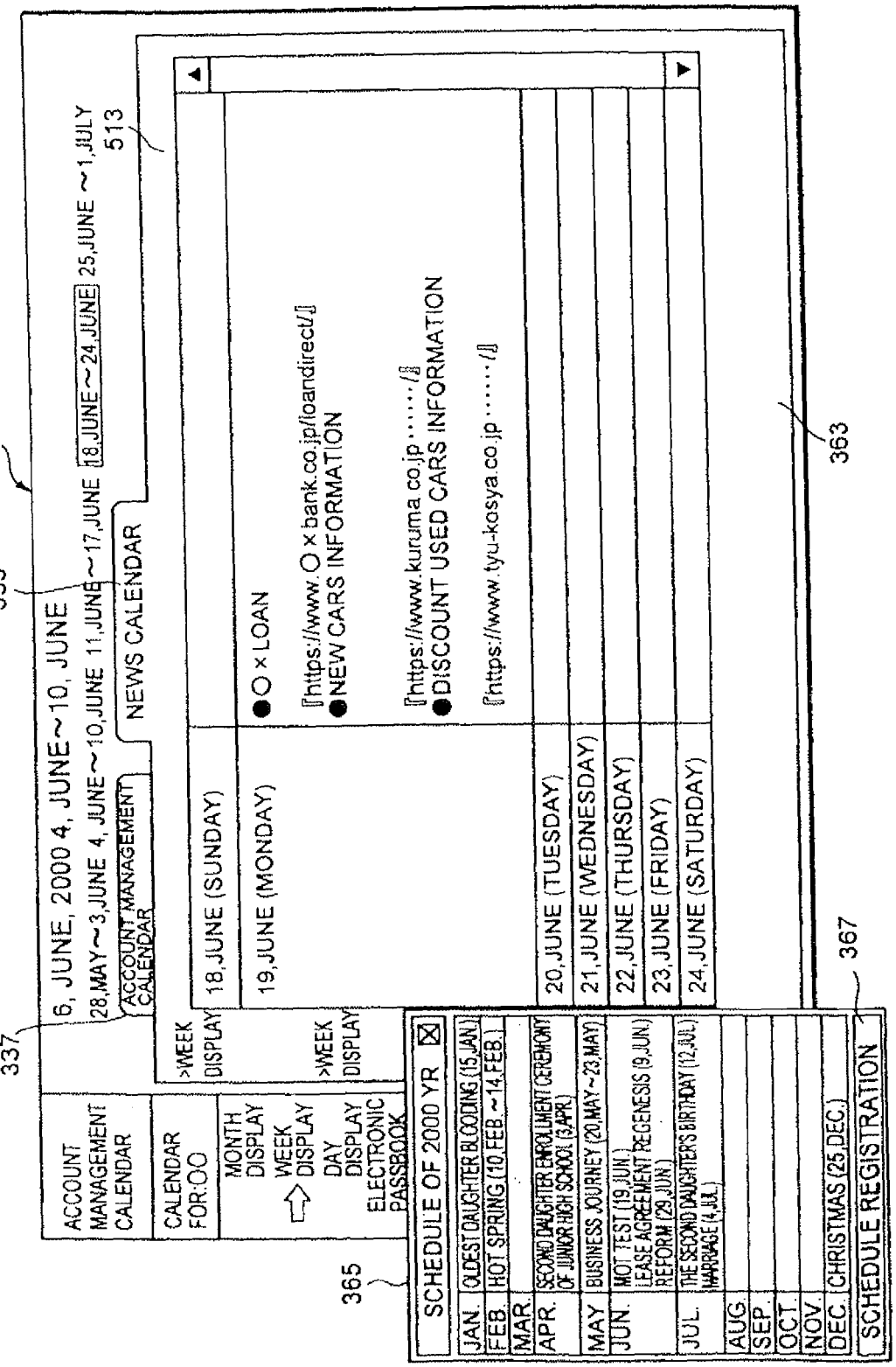
FIG. 33 shows an example of a main screen displaying a weekly news calendar.

The supplier system 301 pastes electronic invoices addressed to the buyer, and deposit/withdrawal detailed statement on the buyer's bank account, which are sent by the electronic mall 303 and the banking system 305 respectively, on the account management calendar (FIGS. 25 and 26). The supplier system 301 pastes news selected by the calendar server 309 in accordance with the consumption trends of the buyer from the news which is sent by the electronic mall 303 and the banking system 305, on the news calendar (FIGS. 32, 33, and 34).

The calendar server 309 infers the schedules which have an impact on the consumption trends of the buyer from the invoices addressed to the buyer and the deposit/withdrawal detailed statement on the buyer's bank account thus received (such as the account balance, future deposit/withdrawal schedules, time deposit maturity schedules, for example) (referred to hereinafter as "buyer schedules"), and stores these schedules in the database. The calendar server 309 also stores schedules for the habitual events of the company or for seasonal events (such as Christmas, national holidays, consecutive holidays, vacation periods, for example), as buyer schedules that have an impact on the buyer's consumption trends (such as presents, travel, product purchasing, for example) in the database. The calendar server 309 further accepts inputs from the buyer of schedules for the personal events of the buyer (such as birthdays, vehicle safety inspections, celebrations, familial ceremonial occasions, insurance maturity, contract renewals, travel, for example) via the buyer system 307, and also stores these personal event schedules inputted by the buyer as buyer schedules that have an impact on the buyer's consumption trends.

The calendar server 309 also selects news related to the above-mentioned buyer schedules from a variety of news which is stored on the database (such as advertisements for gift products with respect to present schedules, advertisements for travel services with respect to travel schedules, advertisements for vehicles with respect to vehicle safety inspections, or advertisements for more favorable loans with respect to scheduled loan repayment dates for example), or, stated otherwise, news following the buyer's consumption trends. The calendar server 309 also optimally determines the respective notification dates for the selected news (the dates on which this news is communicated to the buyer) on the basis of the above buyer schedules. For example, the notification date for each news item is determined as being a date that precedes the buyer schedule corresponding to this news by an appropriate period (such as a date that is one month before a scheduled present date, two months before a scheduled travel date, the day of a scheduled vehicle safety inspection date, or two months before a scheduled loan repayment date, for example). The calendar server 309 then supplies this selected news to the buyer system 307 by pasting this news in the spaces for the notification dates of this news, on the above-mentioned news calendar (FIGS. 32, 33, and 34).

In order to perform the processing described above, the calendar server 309 comprises a deposit/withdrawal detailed statement storage section 311, an invoice storage section 312, a news storage section 313, a buyer schedule storage section 315, an information storage processing control section 317, and a calendar display control section 319, as shown in FIG. 24. These components 311 to 319 of the calendar server 309 are typically implemented by a computer program.

The deposit/withdrawal detailed statement storage section 311 stores deposit/withdrawal detailed statement of the buyer's bank account which are received from the banking system 305. The invoice storage section 312 stores invoices addressed to the buyer which are received from the supplier system 301 and the electronic mall 303. The news storage section 313 stores a variety of news received from the supplier system 301, electronic mall 303 and banking system 305. The buyer schedule storage section 315 stores the variety of buyer schedules described above.

The information storage processing control section 317 discriminates between the invoices, deposit/withdrawal detailed statement, and news received from the supplier system 301, electronic mall 303 and banking system 305 to thereby store the invoices, deposit/withdrawal detailed statement, and news in the invoice storage section 312, the deposit/withdrawal detailed statement storage section 311, and the news storage section 313 respectively.

The calendar display control section 319 supplies the buyer system 307 with the above-described account management calendar and news calendar, as well as a few other GUI screens. When displaying the account management calendar on the buyer system 307, the calendar display control section 319 reads out related deposit/withdrawal detailed statement from the deposit/withdrawal detailed statement storage section 311 and related invoices from the invoice storage section 312, and pastes these deposit/withdrawal detailed statement and invoices in the corresponding date spaces on the account management calendar. Also, when displaying the news calendar, the calendar display control section 319 reads out buyer schedules from the buyer schedule storage section 315 (such as scheduled loan repayment dates, time deposit maturity dates, birthdays, scheduled vehicle safety inspection dates, scheduled celebration dates, scheduled travel dates, Christmas, scheduled vacation periods, for example), extracts news related to these buyer schedules from the news storage section 313, optimally determines notification dates for the extracted news on the basis of the corresponding buyer schedule dates, and then inserts the extracted news in notification date spaces on the news calendar.

Furthermore, in accordance with a request from the buyer system 307, the calendar display control section 319 provides the buyer system 307 with a screen for inputting the personal event schedules of the buyer, and stores those event schedules which are entered by the buyer in this screen in the buyer schedule storage section 315.

In addition, upon receiving an invoice addressed to the buyer in the form of an electronic mail or the like from the supplier system 301 or electronic mall 303, the calendar display control section 319 displays this fact on the GUI screen of the buyer system 307.

A description follows for a variety of GUI screens which the calendar display control section 319 supplies to the buyer system 307.

FIG. 25 shows the constitution of a main screen which the calendar display control section 319 supplies to the buyer system 307.

The main screen 321 comprises a menu area 323 and a calendar area 325.

Displayed by the menu area 323 are: a "Month display" menu 329, a "Week display" menu 331, a "Day display" menu 333, and an "Electronic passbook" menu 335, and arrows that indicate which display method has been selected. When a pointing device such as a mouse or a pen tablet is used to click on the "Month display" menu 329 on the main screen 321, the monthly account management calendar or news calendar is displayed. Further, clicking on the "Week display" menu 331 displays the weekly account management calendar or news calendar, and clicking on the "Day display" menu 333 displays the invoices and deposit/withdrawal information pertaining to the day designated on the account management calendar or news calendar with a certain degree of detail. Also, the act of clicking on the "Electronic passbook" menu 335 displays the contents of the deposit passbook for the buyer's bank account on the main screen 321.

Provided in the calendar area 325 are an account management calendar tab 337, a news calendar tab 339, and a date display area 341. The act of clicking on the account management calendar tab 337 displays the account management calendar 400 of the account management calendar area 326 in the foreground, and clicking on the news calendar tab 339 displays the news calendar 411 of the news calendar area 363 in the foreground (See FIG. 32). As will be described subsequently, the date display area 341 displays the date in the form that corresponds to the display method which is selected by the buyer, that is, that corresponds to the month display, week display, or day display.

Clicking on the account management calendar tab 337 and the "Month display" menu 329 on the main screen 321 causes the calendar display control section 319 to display the date in the date display area 341 in the form which corresponds to the month display, and to display the account management calendar 400 for the current month or the month designated by the buyer in the account management calendar area 326, as shown in FIG. 25.

Selecting "Month display" causes the current date (this is "Jun. 26, 2000" here) or the date designated by the buyer, as well as a year and month designation menu 343 allowing the buyer to designate the desired year and month, to be displayed in the date display area 341. The year and month designation menu 343 displays a "January" to "December" menu, which is for designating the desired month in the year being currently displayed, a "Previous year" menu, which is for designating the year which immediately precedes the year being currently displayed, and a "Following year" menu for designating the year which follows the year being currently displayed. The fact that the characters "June" of the year and month designation menu 343 are framed by a square indicates that June is the month being displayed currently.

Marks (icons and character strings) that indicate deposit/withdrawal detailed statement and deposit/withdrawal schedules of the buyer's bank account, as well as invoices addressed to the buyer, for June 2000, are all pasted in spaces for deposit/withdrawal dates and invoice receipt dates, in the monthly account management calendar, such as the account management calendar 400 for June 2000 which is illustrated, for example. The marks are constituted by icons and character strings. For example, the icon "- (minus sign)" is pasted on marks for withdrawal detailed statement such as those of an automatic debit, a cash withdrawal, and the like, and the icon "+ (plus sign)" is pasted on marks for deposit detailed statement such as those of a salary payment transfer. Further, the icon "!" is attached to invoices for which a withdrawal schedule has failed due to an insufficient outstanding balance and to invoices whose payment deadline has passed, the icon "paid" is attached to those invoices which have been paid, and the icon "unpaid" is attached to those invoices whose payment deadline has not passed and to invoices which are unpaid, for example.

The buyer is able to attain an overview of his or her own deposit/withdrawal detailed statement status or invoice status in June 2000 from this account management calendar 400 at a glance. For example, the buyer is able to grasp at a glance that: on June 1 (Thursday), automatic debits for water supply charges and electricity charges were made; on June 2 (Friday), a cash withdrawal was made; on June 5 (Monday), a gas charge automatic debit and a payment transfer to the buyer's own bank account were performed; June 6 (Tuesday) is a payment deadline and a payment for cellular telephone charges has not yet been made, and, on June 6 (Tuesday), an automatic debit for a paid TV (PTV) license fee was made; on June 7 (Wednesday), a cash withdrawal was made; on June 9 (Friday), a salary payment transfer was performed; on June 12 (Monday), an ABC card loan automatic debit was made; June 21 (Wednesday) was the payment deadline for an invoice amount for a T-shirt purchased at the electronic mall 303 and that the corresponding payment transfer has already been made; and June 28 (Wednesday) was the payment deadline for an invoice amount for sneakers purchased at the electronic mall 303 but that the payment transfer for this amount has not yet been made (the field for June 26 in the account management calendar 400 in the figure is displayed with oblique lines to indicate that this is the current date).

As detailed above, bank account (electronic passbook) information and invoices are displayed on the calendar, and, from the buyer's point of view, the cash flow can be easily managed not only on a daily basis but also on a monthly and a weekly basis, and more easily seen than when displayed simply as a list, as in an electronic passbook.

Although not illustrated, when invoices are sent to the calendar server 309 by electronic mail or similar from the supplier system 301 or the electronic mall 303, a message to that effect (such as "an invoice has been inserted in the account management calendar for July" for example) is displayed in real time or with predetermined timing in a predetermined location on the main screen 321. This is convenient on account of saving the buyer the trouble of searching for mail relating to an invoice or itemized statement of usage among a wide variety of information received by electronic mail (information from friends, acquaintances, and family, company- and work-related information, direct mail, and so forth).

If the buyer performs a predetermined operation in the main screen 321 which is displayed by the monthly account management calendar 400 shown in FIG. 25, bank account (passbook) information and invoices can be displayed in more detail. For example, clicking on the "Week display" menu 331 after designating any of the fields June 4 to June 10 in the account management calendar 400, in the main screen 321 shown in FIG. 25 (or clicking on the "Week display" menu 334 to the left of the June 4 field in the account management calendar 400) displays the account management calendar relating to the week June 4 to June 10 in the account management calendar area 326.

FIG. 26 shows an example of a main screen displayed by the weekly account management calendar.

In FIG. 26, the date is displayed in the date display area 341 in the form that corresponds to the week display. For example, as illustrated in this figure, the week June 4 to June 10 designated by the buyer, and a week select menu 345, are displayed. All the weeks May 28 to June 3, June 4 to June 10, June 18 to June 24, and June 25 to July 1 in "June", which is the month relating to the week designated by the buyer, are displayed in the week select menu 345, for example. If the buyer designates (clicks on) a desired week from among these weeks, the bank account information and invoices which related to the desired week are displayed in the account management calendar area 326.

The deposit/withdrawal detailed statement and invoices relating to the week June 4 to June 10 designated by the buyer are displayed in the account management calendar area 326 in more detail than in a month display. For example, "Date and Day" "Item (summary) name", and "transaction amount/invoice amount" of the deposit/withdrawal detailed statement and invoices relating to that week are displayed.

When the buyer clicks on the space for a desired date (June 6, for example) and then clicks on the day display menu 333 (or double-clicks on the space for June 6 in the weekly account management calendar), in the weekly account management calendar shown in FIG. 26, the daily (namely June 6) account management calendar is displayed in the account management calendar area 326 (the daily account management calendar can also be displayed by designating the desired date space in the monthly account management calendar and then clicking on the day display menu 333).

FIG. 27 shows an example of a main screen displayed by the daily account management calendar.

As shown in FIG. 27, deposit/withdrawal detailed statement and invoices for the date (Jun. 6, 2000, for example) designated by the buyer are displayed with a certain degree of detail in the account management calendar area 326. For example, where a "PTV license fee" for which an automatic debit has been completed is concerned, the "deposit/withdrawal detailed statement" information displayed includes bank account (passbook) information for when the corresponding automatic debit is performed ("[empty circle] [cross] bank, Yoyosu branch, ordinary deposit account, account number: 0123456", for example), the "item name (PTV license fee)" of the transaction, the "transaction amount (2640 yen)", and the "outstanding balance (348240 yen, for example)" after the transaction (automatic debit). Further, with regard to "cellular telephone charges" for which invoice notification is performed because an automatic debit cannot be made, the "company name (the AA mobile communications network, for example)", the "service name (abcd, for example)", the "invoice number (012345, for example)", the "invoice deadline (Jun. 30, 2000, for example)", the "invoice amount (11915 yen)" for example, for this invoice, are displayed along with a payment button 347.

When the buyer clicks on the payment button 347, the main screen 321 switches to the screen shown in FIG. 28.

FIG. 28 shows an example of a main screen that appears when a switch between screens is made upon clicking on the payment button 347 for a certain invoice in the daily account management calendar shown in FIG. 27, which main screen shows the detailed statement of this invoice.

As shown in FIG. 28, the contents of this invoice are shown in the most detail (to include a breakdown of the invoice amount, and so forth, for example) in the account management calendar area 326, along with a payment button 349. When the buyer clicks on the payment button 349, the main screen 321 switches to the screen shown in FIG. 29.

FIG. 29 shows an example of a main screen that appears when a switch between screens is made upon clicking on the payment button 349 on the main screen in FIG. 28 and that is for the selection of a payment account.

As shown in FIG. 29, a "payment transfer bank account selection" menu 350 is displayed in the account management calendar area 326 along with a payment button 351. The "branch name", "item", "bank account number", "outstanding balance", and the "outstanding balance determination date and time", are displayed in the payment transfer bank account selection menu 350 in the form of a list, for all the buyer's deposit accounts which are pre-registered in the calendar 309. A radiobutton is appended to the display for each bank account.

The buyer selects a desired bank account whose outstanding balance is equal to or more than the invoice amount by clicking on the corresponding radiobutton (353, for example), and then clicks on the payment button 351. The main screen 321 shown in FIG. 29 then switches to the payment condition confirmation screen shown in FIG. 30.

Figure 30:
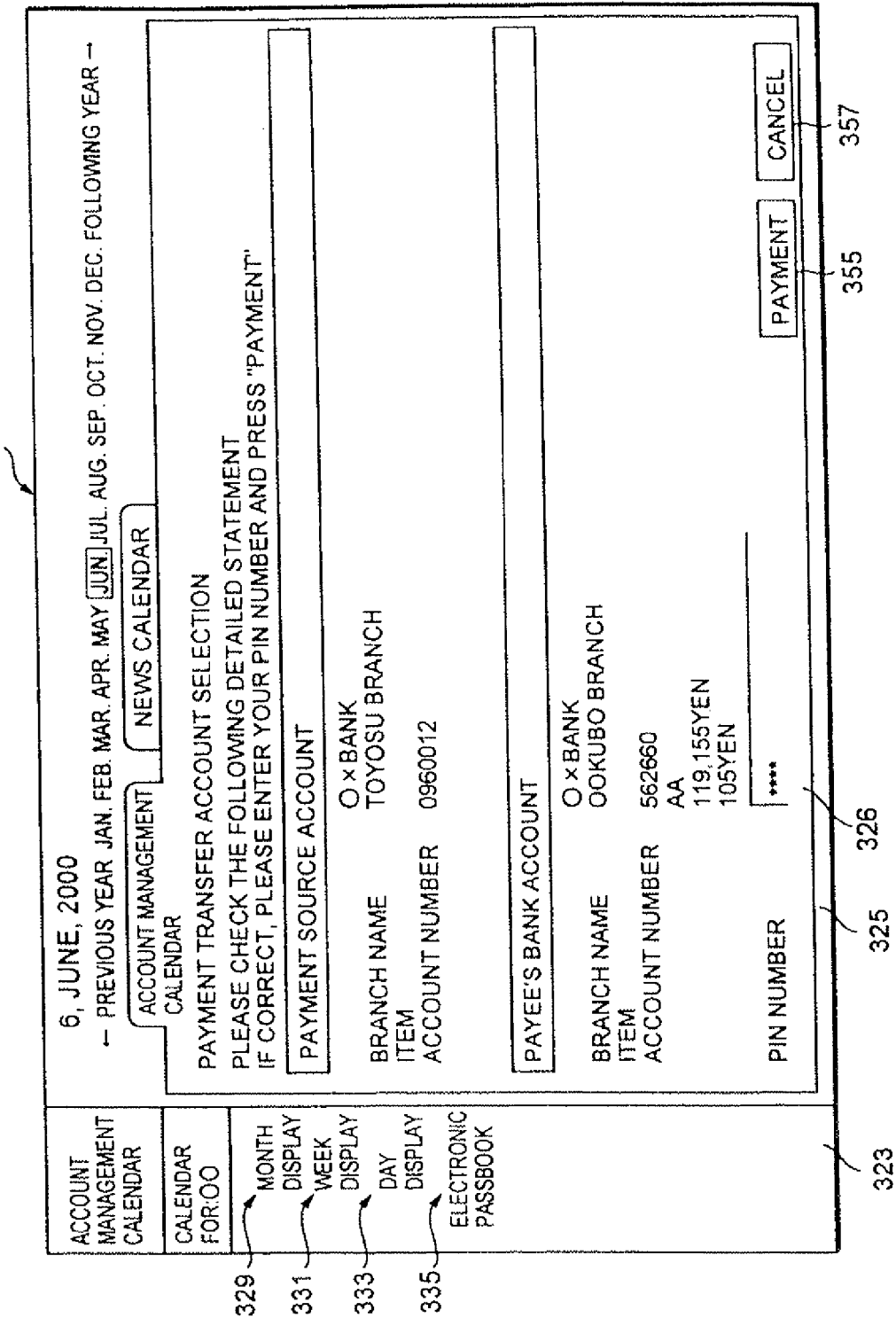
FIG. 30 shows an example of a main screen for confirming the payment conditions.

As shown in FIG. 30, the account management calendar area 326 displays information on the buyer's bank account which is the source of the payment, information on the supplier's bank account to which the payment is to be made, and the payment conditions such as the payment amount. The account management calendar area 326 also displays an input area for the PIN number of the buyer's bank account, and a payment button 355.

Once these payment conditions have been confirmed by the buyer, the buyer enters the PIN number of the buyer's bank account and then clicks on the payment button 355. This operation results in a payment (account transfer) request telegraphic message being automatically sent to the bank 305 and in the execution of payment processing.

According to the account management calendar described above, the buyer deposit/withdrawal detailed statement and an invoice summary, as well as the status of the invoice ("unpaid", "paid", "deadline passed", and the like), are displayed in corresponding date spaces. Furthermore, unpaid invoices can be paid by means of an exceedingly simple operation such as by clicking with a pointing device.

Figure 31:
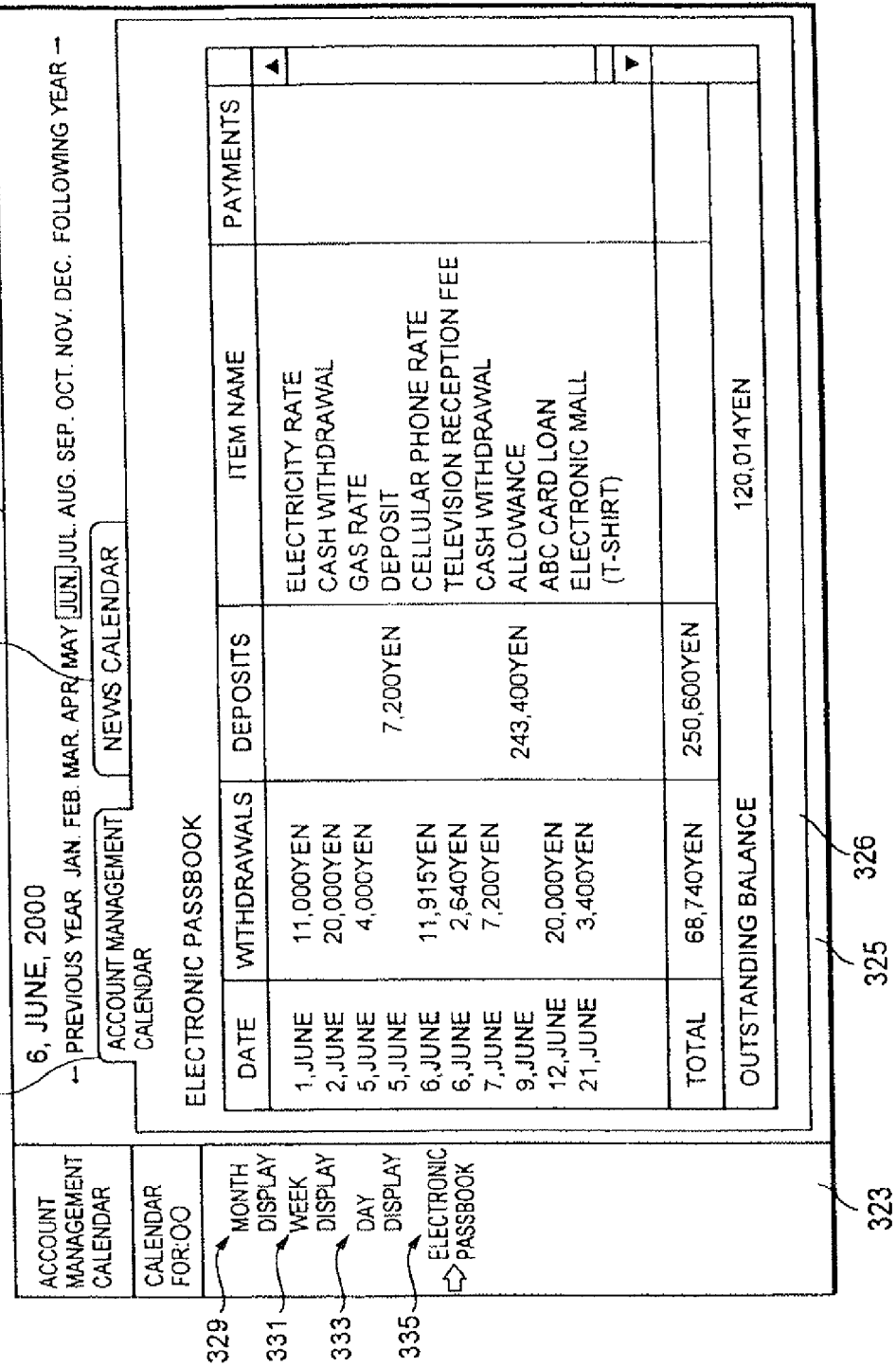
FIG. 31 shows an example of a main screen displaying an electronic passbook.

If the buyer clicks on the "electronic passbook" menu 335 displayed in the display method selection menu area 323, in the main screen 321 illustrated by way of example in FIGS. 25 to 30, an electronic passbook in which past deposit/withdrawal detailed statement of the buyer's bank account are displayed as a list in date order is displayed as shown in FIG. 31.

Further, when the buyer clicks on the news calendar tab 339 in the main screen 321 shown by way of example in FIGS. 25 to 30, the news calendar 411 shown by way of example in FIG. 32 is displayed in the foreground.

FIG. 32 shows an example of a main screen displaying a monthly news calendar.

As shown in FIG. 32, the news calendar area 363 is placed in the foreground, and the monthly news calendar 411 is displayed therein.

When a buyer schedule window 365 is opened, buyer schedules, which are read out from the buyer schedule storage section 315, are displayed therein as a list in date order. For example, "eldest daughter's Coming of Age ceremony (January 15)" is displayed in the field for January, "hot spring (February 10 to February 14)" is displayed in the field for February, "second daughter's junior high school entrance ceremony (April 3)" is displayed in the field for April, "business trip (May 20 to May 23)" is displayed in the field for May, "vehicle safety inspection (June 19), "lease renewal (June 9), and "refurbishment (June 29)" are displayed in the field for June, "second daughter's birthday (July 12)" and "wedding ceremony (July 4)" are displayed in the field for July, and "Christmas (December 25)" is displayed in the field for December.

The buyer schedule window 365 also displays a schedule registration button 367. If the buyer clicks on the schedule registration button 367, the event schedule registration screen shown by way of example in FIG. 35 is displayed. The buyer is then able to freely input his or her own event schedule via this event schedule registration screen. This process will be described subsequently.

News related to buyer schedules, which is extracted by the calendar display control section 319 from the news storage section 313 is pasted on the news calendar 411 shown in FIG. 32, and marks indicating each news item (character strings that provide a summary of this news, for example) are displayed in the date spaces in which each news item is pasted. The dates to which the news items are pasted are dates that precede the respective dates of buyer schedules corresponding to each news item by a predetermined period (such as 0 days before, one day before, one week before, one month before, or two months before, for example). This predetermined period is a value which is contained as the above-described period condition (display period) in the news data which the calendar server 309 receives from the supplier system 301, the electronic mall 303, or the banking system 305.

For example, as shown in FIG. 32, for the buyer schedule "wedding ceremony (July 4)", the news "wedding ceremony card loan information" and "gift information" related to the wedding ceremony is inserted in the space for June 4 in the news calendar which precedes the date June 4 by one month. This period condition for a display one month before is a value that is contained in the data of "wedding ceremony card loan information" and "gift information". Furthermore, for the buyer schedule "second daughter's birthday (July 12)", the news "Presents girls like" is inserted in the space for June 12 in the news calendar which precedes July 12 by one month. This period condition for a display one month before is a value that is contained in the data "Presents girls like". For a buyer event based on the deposit/withdrawal detailed statement that a loan repayment automatic debit from the buyer's bank account is to be made on the twelfth of each month, the news "loan conversion information" is inserted in the field for June 12 in the news calendar. Also, for the buyer event "vehicle safety inspection (June 19)", news such as "[Empty circle] [cross] loan information", "new vehicle information", and "reasonably priced secondhand vehicle information", which serves to support major expenses incurred by vehicle safety inspections, is inserted in the field for June 19 in the news calendar of the same day. This period condition for a display the same day is a value that is contained in "[Empty circle] [cross] loan information", "new vehicle information", and "reasonably priced secondhand vehicle information".

When the buyer wishes to learn more details about the news inserted in this news calendar 411, the buyer is able to switch the monthly news calendar to a weekly or daily news calendar.

FIG. 33 shows an example of a main screen displaying a weekly news calendar.

The weekly news calendar 413 shown in FIG. 33 relates to the week June 18 (Sunday) to June 24 (Saturday). In addition to a news summary ("[Empty circle] [cross] loan information", "new vehicle information", and "reasonably priced secondhand vehicle information", for example), a simple description of each news item, the URL of a home page related to each news item, and so forth, are inserted in the field for June 19 (Monday) in this news calendar 413. If the buyer clicks on a desired URL among these inserted URLs, the home page of this URL can be displayed.

For example, clicking on the URL "https://www.[Empty-circle][cross]bank.co.jp/loandirect/" of "[Empty circle] [cross] loan information", in FIG. 33, displays the home page 471 that contains information relating to the [Empty circle] [cross] loan, as shown in FIG. 34.

As described above, the news is inserted in spaces for dates on the news calendar that are determined on the basis of buyer schedules. The timing for displaying this news can also be suitably established. For example, the news "wedding ceremony card loan information", which is displayed in the field for June 4 in the news calendar 411 of FIG. 32, can also be displayed first when it is June 4, or can be displayed on an earlier date (immediately after an event, namely that of the wedding ceremony on July 4, is inputted, for example).

FIGS. 35 and 36 both show an example of the event schedule registration screen.

As stated earlier, this event schedule registration screen is displayed as a result of the buyer clicking on the schedule registration button 367 in the buyer schedule window 365 shown in FIG. 33 or 34.

The event attributes, such as the "date" "title", "persons concerned", "event area", and the "event type", for example, can be entered in this event schedule registration screen 373.

In other words, the buyer enters dates for the start and end of this event as "dates" An arbitrary character string such as the name of this event or a summary thereof can be entered as the "title" (the character strings inputted as "titles" can be displayed as a list in the buyer schedule window 365). As the "persons concerned", the attributes of the people associated with the event (such as a person's relationship with the buyer, gender, age, for example) can be entered. A broad category to which the event belongs (such as "business", "leisure", "sport", "interests", "travel", "car/motorbike", "residence" or "celebration", for example) can be entered as the "event area".

Clicking on the OK button 375 after making the inputs from "date" to "event area" described above displays a list of more detailed categories (event types) that fall under the broad category selected in "event area", along with a keyword input field 377, in an event type area 374. It is possible to select an arbitrary detailed category or enter an arbitrary keyword as the "event type" in this event type area 374.

After the inputting of all of the items for the event attributes is complete, the buyer clicks on the registration button 379. An event thus inputted in the event schedule registration screen 373 is stored in the buyer schedule storage section 315 as one buyer schedule.

Figure 37:
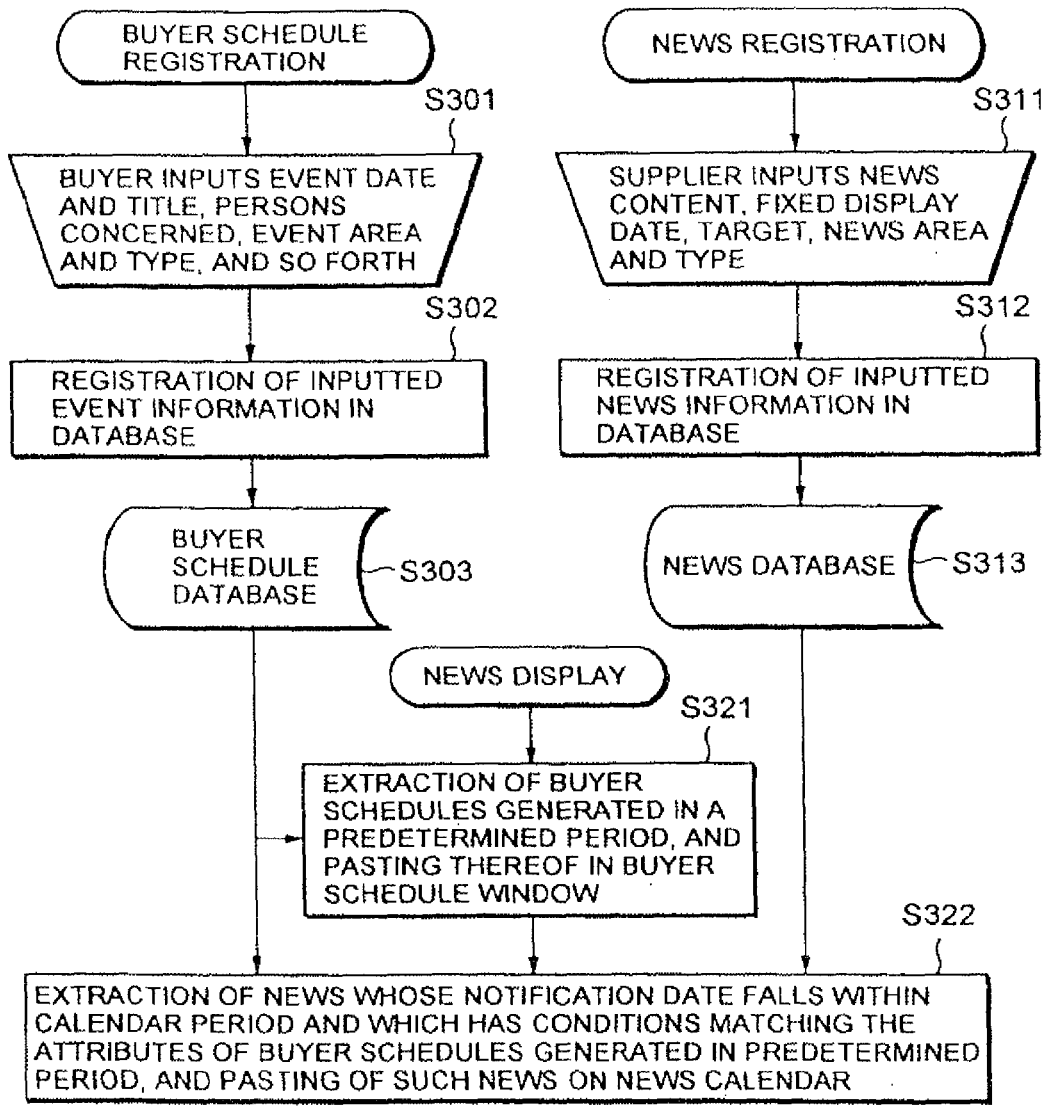
FIG. 37 is a flowchart showing the flow of processing performed by a calendar server 309 to select and display news following buyer consumption trends.

FIG. 37 shows the flow of processing performed by the calendar server 309 to select and display news following buyer consumption trends as described above.

In the buyer schedule registration processing shown in FIG. 37, the calendar server 309 displays an event schedule registration screen as shown by way of example in FIGS. 35 and 36 on the buyer system 307 and accepts inputs by the buyer of attributes such as the event date and title, the persons concerned, and the event area and type (step S301). The calendar server 309 then registers the event attributes inputted by the buyer in the database (the buyer schedule storage section 315) as a buyer schedule (steps S302 and S303). Further, although not shown in FIG. 37, the calendar server 309 infers a time deposit/withdrawal schedule on the basis of the received deposit/withdrawal detailed statement of the buyer's bank account, this schedule also being registered as a buyer schedule in the database (buyer schedule storage section 315). Moreover, though not shown in FIG. 37, the calendar server 309 also registers the habitual practices of the company in the database as buyer schedules (buyer schedule storage section 315).

Also in the news registration processing shown in FIG. 37, the calendar server 309 receives news data from the supplier system 301, the electronic mall 303 and the banking system 305 (step S311), and registers the received news data in the database (news storage section 313) (steps S312 and S313). The data of each news item contains the news content, the fixed display date (that is, the period condition that designates by what period the notification date is to precede the event date), the target, the event area and type, and the like).

In the news display processing shown in FIG. 37, the calendar server 309 reads out buyer schedules generated in a predetermined period (one year from the current year, for example) from the database (buyer schedule storage section 315) and displays these schedules as a list in the buyer schedule calendar server 309 then reads out the news which possesses conditions matching the attributes of these buyer schedules from the database (news storage section 313) and determines the dates for the notification of each news item from the dates in the buyer schedules that match each news item and the period conditions for each news item. The calendar server 309 then pastes the news which possesses notification dates that fall within the period (such as a specific month, week, or day, for example) according to which the news calendar is to be displayed, in the spaces for the notification dates of the news calendar, and displays this news calendar on the buyer system 307 (step S322).

As described hereinabove, according to the news calendar 411 of this embodiment, the buyer is provided with news that follows the buyer's consumption trends at an appropriate time before the consumption actually occurs. The buyer is thus able to utilize the news effectively. The supplier can effectively link the provision of this news with the sale of a product or service.

The preferred embodiments of the present invention were described hereinabove, but such embodiments are illustrations that serve to explain the present invention and are not intended to limit the scope of the present invention to these embodiments. The present invention can also be implemented in a variety of other forms without departing from the spirit of the present invention.

What is claimed is:

1. A method for use in a system that includes a server, a supplier system, a buyer system, a first account management system, and a second account management system, wherein the supplier system is used by a supplier, the buyer system is used by a buyer, the first account management system manages an account of the buyer, and the second account management system manages an account of the supplier, the method comprising:
    the server receiving an electronic invoice from the supplier system,
        wherein the electronic invoice relates to a transaction between the supplier and the buyer, and
        wherein the electronic invoice includes an identification code,
        wherein the identification code uniquely identifies the electronic invoice from a plurality of electronic invoices issued to the buyer by the supplier, and
        wherein the identification code is generated by the supplier system;
    the server registering the electronic invoice in a database;
    the server transmitting information that defines a Graphical User Interface (GUI) screen to the buyer system,
        wherein the GUI screen is for showing contents of the electronic invoice registered in the database and for allowing the buyer to approve the contents of the electronic invoice;
    the server, in response to an approval of the electronic invoice performed by the buyer using the GUI screen, creating a transfer request message,
        wherein the transfer request message includes the identification code included in the electronic invoice; and
    the server transmitting the transfer request message to the first account management system, such that, following reception of the transfer request message at the first account management system:
        the first account management system and the second account management system are able, using the identification code, to perform a deposit of the amount of the electronic invoice from the account of the buyer into the account of the supplier;
        the second account management system is able, using the identification code, to send an electronic deposit/withdrawal statement to the server or the supplier system,
            wherein the electronic deposit/withdrawal statement describes that the deposit from the account of the buyer into the account of the supplier has been made, and
            wherein the electronic deposit/withdrawal statement includes the identification code; and
        at least one of the supplier system and the server is able to settle the electronic invoice using the identification code.

2. The method of claim 1, further comprising:
    the server receiving the electronic deposit/withdrawal statement from the second account management system, and
    the server settling the electronic invoice using the identification code included in the electronic deposit/withdrawal statement.

3. The method of claim 2, wherein the server settling the electronic invoice is performed using only the identification code included in the electronic deposit/withdrawal statement.

4. The method of claim 1, wherein the at least one of the supplier system and the server is able to settle the electronic invoice using only the identification code.

5. A server configured for operation in a system that includes the server, a supplier system, a buyer system, a first account management system, and a second account management system, wherein the supplier system is used by a supplier, the buyer system is used by a buyer, the first account management system manages an account of the buyer, and the second account management system manages an account of the supplier, the server comprising:
    circuitry configured to receive an electronic invoice from the supplier system,
        wherein the electronic invoice relates to a transaction between the supplier and the buyer,
        wherein the electronic invoice includes an identification code,
        wherein the identification code uniquely identifies the electronic invoice from a plurality of electronic invoices issued to the buyer by the supplier, and
        wherein the identification code is generated by the supplier system;
    circuitry configured to register the electronic invoice in a database;

circuitry configured to transmit information that defines a Graphical User Interface (GUI) screen to the buyer system,
  wherein the GUI screen is configured to show contents of the electronic invoice registered in the database and to allow allowing the buyer to approve the contents of the electronic invoice;
circuitry configured to create, in response to an approval of the electronic invoice performed by the buyer using the GUI screen, a transfer request message,
  wherein the transfer request message includes the identification code included in the electronic invoice; and
circuitry configured to transmit the transfer request message to the first account management system, such that, following reception of the transfer request message at the first account management system:
  the first account management system and the second account management system are able, using the identification code, to perform a deposit of the amount of the electronic invoice from the account of the buyer into the account of the supplier;
  the second account management system is able, using the identification code, to send an electronic deposit/withdrawal statement to the server or the supplier system,
    wherein the electronic deposit/withdrawal statement describes that the deposit from the account of the buyer into the account of the supplier has been made, and
    wherein the electronic deposit/withdrawal statement includes the identification code; and
  at least one of the supplier system and the server is able to settle the electronic invoice using the identification code.

6. The server of claim 5, further comprising:
circuitry configured to receive the electronic deposit/withdrawal statement from the second account management system, and
circuitry configured to settle the electronic invoice using the identification code included in the electronic deposit/withdrawal statement.

7. The server of claim 6, wherein the circuitry configured to settle the electronic invoice is further configured to settle the electronic invoice using only the identification code included in the electronic deposit/withdrawal statement.

8. The server of claim 5, wherein the at least one of the supplier system and the server is able to settle the electronic invoice using only the identification code.

9. A server configured for operation in a system that includes the server, a supplier system, a buyer system, a first account management system, and a second account management system, wherein
the supplier system is used by a supplier,
the buyer system is used by a buyer,
the first account management system manages an account of the buyer, and
the second account management system manages an account of the supplier,
wherein the server comprises:
a network interface configured to receive an electronic invoice from the supplier system,
  wherein the electronic invoice relates to a transaction between the supplier and the buyer,
  wherein the electronic invoice includes an identification code,
  wherein the identification code uniquely identifies the electronic invoice from a plurality of electronic invoices issued to the buyer by the supplier, and
  wherein the identification code is generated by the supplier system; and
a processor configured to register the electronic invoice in a database;
wherein the network interface is further configured to transmit information that defines a Graphical User Interface (GUI) screen to the buyer system,
  wherein the GUI screen is for showing contents of the electronic invoice registered in the database and for allowing the buyer to approve the contents of the electronic invoice;
wherein the processor is further configured to create, in response to an approval of the electronic invoice performed by the buyer using the GUI screen, a transfer request message,
  wherein the transfer request message includes the identification code included in the electronic invoice; and
wherein the network interface is further configured to transmit the transfer request message to the first account management system, such that, following reception of the transfer request message at the first system:
  the first account management system and the second system are able, using the identification code, to perform a deposit of the amount of the electronic invoice from the account of the buyer into the account of the supplier;
  the second account management system is able, using the identification code, to send an electronic deposit/withdrawal statement to the server or the supplier system,
    wherein the electronic deposit/withdrawal statement describes that the deposit from the account of the buyer into the account of the supplier has been made, and
    wherein the electronic deposit/withdrawal statement includes the identification code; and
  at least one of the supplier system and the server is able to settle the electronic invoice using the identification code.

10. The server of claim 9,
wherein the network interface is further configured to receive the electronic deposit/withdrawal statement from the second account management system, and
wherein the processor is further configured to settle the electronic invoice using the identification code included in the electronic deposit/withdrawal statement.

11. The server of claim 10 wherein the processor is further configured to settle the electronic invoice using only the identification code included in the electronic deposit/withdrawal statement.

12. The server of claim 9, wherein the at least one of the supplier system and the server is able to settle the electronic invoice using only the identification code.

13. A non-transitory computer-readable storage medium having stored thereon instructions which, when executed by a processor in a server, cause the server to perform a method for processing an electronic invoice,
wherein the server is configured for operation in a system that includes the server, a supplier system, a buyer system, a first account management system, and a second account management system, wherein
the supplier system is used by a supplier,
the buyer system is used by a buyer, the first account management system manages an account of the buyer, and the second account management system manages an account of the supplier, wherein the method comprises:

receiving, at the server, the electronic invoice from the supplier system, wherein the electronic invoice relates to a transaction between the supplier and the buyer, and wherein the electronic invoice includes an identification code, wherein the identification code uniquely identifies the electronic invoice from a plurality of electronic invoices issued to the buyer by the supplier, and wherein the identification code is generated by the supplier system;

registering, at the server, the electronic invoice in a database;

transmitting, from the server, information that defines a Graphical User Interface (GUI) screen to the buyer system, wherein the GUI screen is for showing contents of the electronic invoice registered in the database and for allowing the buyer to approve the contents of the electronic invoice;

generating, at the server, a transfer request message in response to an approval of the electronic invoice performed by the buyer using the GUI screen, wherein the transfer request message includes the identification code included in the electronic invoice; and transmitting, from the server, the transfer request message to the first account management system, such that, following reception of the transfer request message at the first account management system:

the first account management system and the second account management system are able, using the identification code, to perform a deposit of the amount of the electronic invoice from the account of the buyer into the account of the supplier, the second account management system is able, using the identification code, to send an electronic deposit/withdrawal statement to the server or the supplier system, wherein the electronic deposit/withdrawal statement describes that the deposit from the account of the buyer into the account of the supplier has been made, and wherein the electronic deposit/withdrawal statement includes the identification code; and at least one of the supplier system and the server is able to settle the electronic invoice using the identification code.

14. The non-transitory computer-readable storage medium of claim 13, wherein the method further comprises:

receiving, at the server, the electronic deposit/withdrawal statement from the second account management system, and settling, at the server, the electronic invoice using the identification code included in the electronic deposit/withdrawal statement.

15. The non-transitory computer-readable storage medium of claim 14, wherein the settling the electronic invoice is performed using only the identification code included in the electronic deposit/withdrawal statement.

16. The non-transitory computer-readable storage medium of claim 13, wherein the at least one of the supplier system and the server is able to settle the electronic invoice using only the identification code.

* * * * *